United States Patent [19]

Taniguchi et al.

[11] Patent Number: 5,515,133
[45] Date of Patent: May 7, 1996

[54] FLASH APPARATUS

[75] Inventors: Nobuyuki Taniguchi, Nishinomiya; Hideo Kajita, Minamikawachi; Hiromu Mukai, Kawachinagano; Takeshi Hashimoto, Sakai; Yoshinobu Kudo, Osaka; Yujiro Mima, Nishinomiya; Takashi Kondo, Neyagawa, all of Japan

[73] Assignee: Minolta Camera Kabushiki Kaisha, Osaka, Japan

[21] Appl. No.: 383,706

[22] Filed: Feb. 1, 1995

Related U.S. Application Data

[63] Continuation of Ser. No. 122,137, Sep. 15, 1993, abandoned, which is a continuation of Ser. No. 695,002, May 2, 1991, abandoned.

[30] Foreign Application Priority Data

| May 7, 1990 | [JP] | Japan | 2-118100 |
| Jun. 5, 1990 | [JP] | Japan | 2-147589 |
| Jun. 5, 1990 | [JP] | Japan | 2-147590 |

[51] Int. Cl.$^6$ .............................. G03B 7/28; G03B 17/02
[52] U.S. Cl. ........................................ 354/432; 354/159
[58] Field of Search ........................ 354/432, 429, 354/431, 159, 106

[56] References Cited

U.S. PATENT DOCUMENTS

| 3,584,557 | 6/1971 | Haller | 354/111 |
| 4,100,554 | 7/1978 | Iijima | 354/145 |
| 4,357,102 | 11/1982 | Taren et al. | 355/77 |
| 4,394,078 | 7/1983 | Terashita | 354/31 |
| 4,445,778 | 5/1984 | Nakauchi | 356/222 |
| 4,549,800 | 10/1985 | Maeda | 354/400 |
| 4,583,831 | 4/1986 | Harvey | 354/106 |
| 4,666,280 | 5/1987 | Miyawaki | 354/414 |
| 4,682,273 | 7/1987 | Taniguchi | 362/18 |
| 4,710,005 | 12/1987 | Bennett | 354/126 |
| 4,908,646 | 3/1990 | Sato et al. | 354/402 |
| 4,963,913 | 10/1990 | Shindo et al. | 354/406 |
| 4,963,915 | 10/1990 | Ikemura et al. | 354/432 |
| 4,977,423 | 12/1990 | Yamano et al. | 354/402 |
| 5,021,818 | 6/1991 | Satoh et al. | 354/414 |
| 5,040,007 | 8/1991 | Hagiuda | 354/145.1 |
| 5,086,311 | 2/1992 | Noka et al. | 354/106 X |
| 5,138,460 | 8/1992 | Egawa | 354/224 |

FOREIGN PATENT DOCUMENTS

| 56-51728 | 5/1981 | Japan . |
| 56-102836 | 8/1981 | Japan . |
| 58-152624 | 10/1983 | Japan . |
| 59-158131 | 10/1984 | Japan . |
| 1-235929 | 9/1989 | Japan . |

*Primary Examiner*—W. B. Perkey
*Attorney, Agent, or Firm*—Willian Brinks Hofer Gilson & Lione

[57] ABSTRACT

A flash apparatus which allows flashlight photographing of various subjects in a photographing screen in appropriate exposure by simple operation without failure. The flash apparatus comprises a flashlight emitting section having a predetermined irradiation angle with respect to a light emission optical axis, and irradiating direction changing means for automatically changing the direction of the light emission optical axis of the flashlight emitting section in response to subject information such as distribution information of brightness values of or distances to subjects in a photographing screen. Also a camera is disclosed which assures photographing of a main subject with appropriate exposure even when the main subject is in a backlighted condition or when another body is positioned nearer to the camera than the main subject.

1 Claim, 28 Drawing Sheets

FIG. 20a
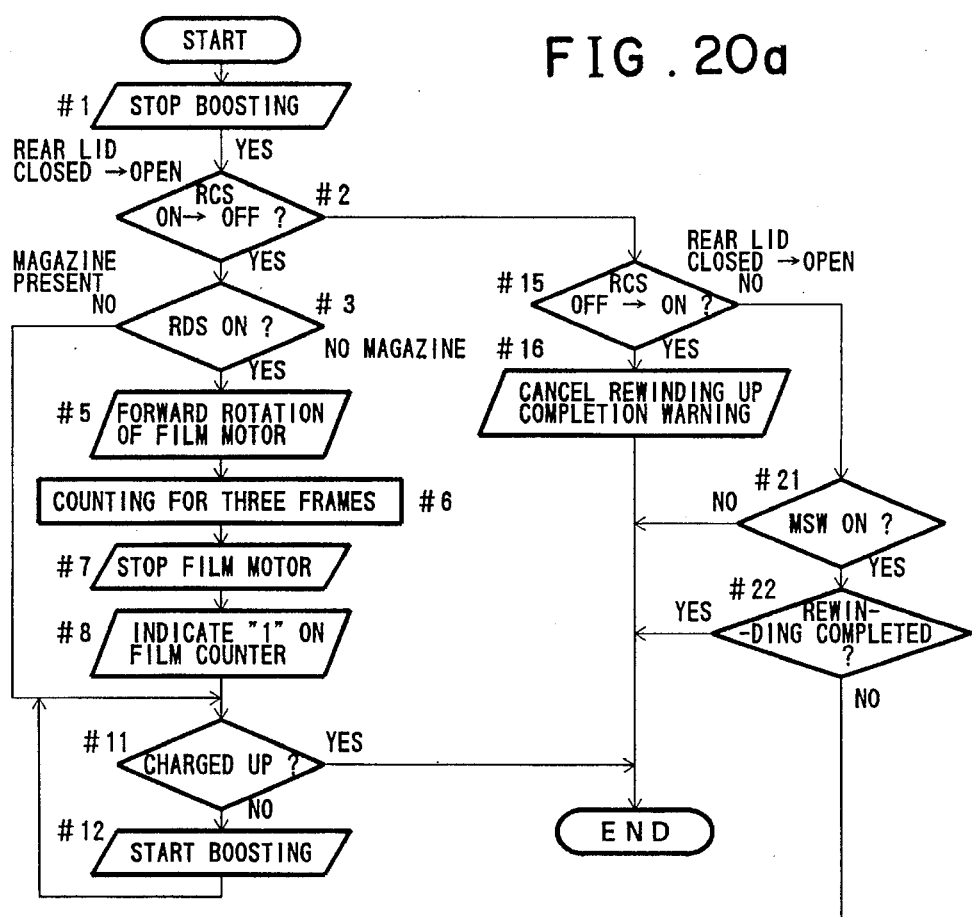
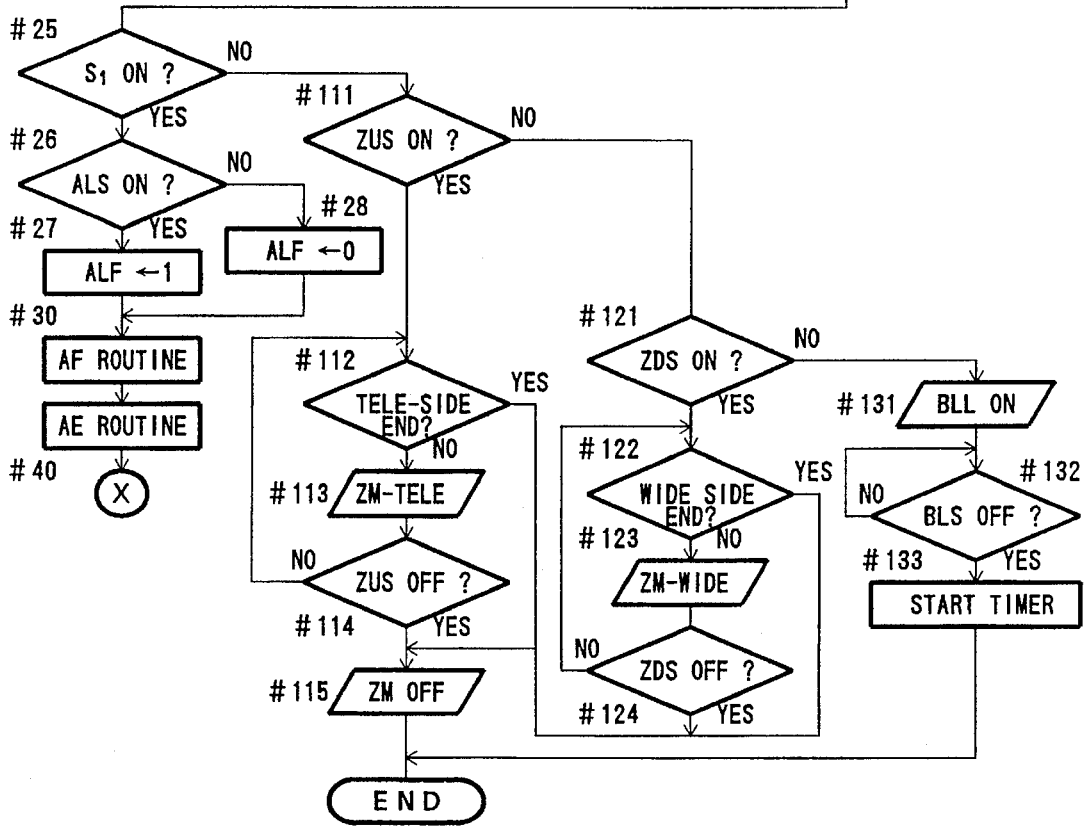

FLASH APPARATUS

This application is a continuation of application Ser. No. 08/122,137, filed Sep. 15, 1993, now abandoned, which, in turn, is a continuation of application Ser. No. 07/695,002, filed May 2, 1991, now abandoned.

BACKGROUND OF THE INVENTION

1. Field of the Invention

This invention relates to a flash apparatus of the type which includes a light emitting section having a predetermined irradiation angle and an irradiating direction changing mechanism for changing the irradiating direction of the light emitting section.

2. Description of the Prior Art

A flash apparatus is already known wherein the irradiating direction of a light emitting section is changed by an irradiating direction changing mechanism. In an exemplary one of conventional flash apparatus of the type mentioned, the light emitting section is mounted for pivotal motion around a vertical axis or a horizontal axis on a flash apparatus body. When such flash apparatus is used, an operator holds, for example, and pivots the light emitting section suitably to perform so-called bounce photographing wherein flashlight emitted from the flash apparatus is irradiated not directly upon a subject but reflected light from some other article is used or to arbitrarily change the light distribution characteristic of flashlight to a photographing screen.

The conventional flash apparatus, however, is disadvantageous in the following points.

In particular, it often takes place that, upon photographing with a camera with which such flash apparatus is used, a photographing area includes, in addition to an aimed subject, some other body which is positioned nearer to the camera than the aimed subject or that a photographing area includes some indoor subjects and some outdoor subjects. In such an instance, if the flash apparatus emits flashlight to an entire photographing area as an irradiation range, some of subjects may possibly be photographed in an over exposure or under exposure condition. Therefore, the irradiation range of the flash apparatus is preferably displaced with respect to a photographing area when necessary.

With such conventional flash apparatus as described above, however, while the light emitting section is mounted for pivotal motion on the flash apparatus body, a photographer must manually make such pivotal motion of the light emitting section. Thus, when the irradiation range of the flash apparatus must be displaced in such a photographing situation as described above, it is cumbersome to make such manual pivoting motion of the light emitting section, and besides, a shutter chance may be lost. In addition, the amount of such pivotal motion almost depends upon the sixth sense of a photographer, and accordingly, even if the light emitting section is pivoted, appropriate exposure may not always be achieved. Besides, when a proximate body is included at an end portion of a photographing area, a photographer may not be aware of such body and may perform flashlight photographing while keeping the light emitting section of the flash apparatus in an ordinary posture, which will lead to failure in photographing.

Such possible failure in photographing arising from the presence of an unexpected proximate body likely takes place when the flash apparatus is used together with a camera which includes a full size lens and employs an ordinary 35 mm size film but has a function of photographing in a special area such as, for example, a panorama area which is defined by sectioning at least part of an exposeable area of such film itself in a vertical direction so as to prevent exposure to light.

Meanwhile, in order to allow the light emitting section of the flash apparatus to be automatically pivoted or displaced to a suitable position eliminating such cumbersome manual operation by a photographer as described above, the camera must have an automatic focusing (AF) function of automatically focusing a photographing optical system in response to a position of a focus detected in accordance with, for example, a phase difference detecting method by TTL (through the lens) light measurement. An exemplary one of such AF apparatus is shown in FIG. 44.

Referring to FIG. 44, the AF apparatus shown includes a distance measuring module 223 for receiving light from a subject thereon. Light from a subject passes through a photographing lens (not shown) of a single lens reflex camera in which the AF apparatus is incorporated and then through a main mirror 221 and is then refracted by a sub mirror 222. The distance measuring module 223 includes a condenser lens 225 disposed in the proximity of a film equivalent plane (image plane) 224 on which an image of a subject is formed, a separator lens 226 for dividing such image, and an image pickup element 227 constituted from a CCD (charge coupled device) or the like for re-forming the image via the separator lens 226 and generating a focus position signal. It is to be noted that, in the arrangement shown in FIG. 44, a mirror 228 is interposed between the condenser lens 225 and the separator lens 226 to bend the optical axis of such image light.

In a region forwardly of and corresponding to an area defined by a pair of upper and lower edges of a standard screen frame 210 which partitions an area of a film F to be exposed to light, more particularly, as a location below an optical axis 311 of the photographing lens, in a region corresponding to an exposeable area (dimension C) of an ordinary film between the optical axis 311 and a parallel line 312 passing the lower edge of the standard screen frame 210, there is disposed no fixed member which may intercept light. This is because, otherwise if some fixed member which intercepts light is present in such region, a film will not be exposed partly to light. Accordingly, the distance measuring module 223 including the condenser lens 225 is not disposed at a location nearer to the optical axis 311 than the distance C.

On the other hand, if the film equivalent plane (image plane) 224 is located nearer to the condenser lens 225, then the diameter of the condenser lens 225 can be reduced as much (substantially to the size of the image plane). However, since light expands as the distance between the film equivalent plane 224 and the condenser lens 225 increases, the condenser lens 225 must have a greater diameter as much. Therefore, in order to minimize the diameter of the condenser lens 225 which must be located outside or below the line 312 spaced by the distance C from the optical axis 311 as described above, the film equivalent plane 224 is located as near as possible to the line 312.

By the way, the sub mirror 222 is disposed on the optical axis 311 of the photographing lens in front of a film F, and naturally the distance l between the sub mirror 222 and the film F is made equal to the distance l between the sub mirror 222 and the film equivalent plane 224. Accordingly, the sub mirror 222 cannot be disposed nearer to the film F than the distance C. This makes one of restrictions to minimization of dimensions of the camera in the depthwise direction and the vertical direction. As a result, it is difficult to eliminate from an upper face of the camera a projection in which a pentagonal prism is accommodated.

It is to be noted that a camera is also known which employs an ordinary 35 mm size film and can take a photograph of a special area, such as, for example, a panorama size having a generally horizontally elongated profile using a special screen frame which intercepts light to at least part of an exposeable area of a film itself in a vertical direction so as to prevent exposure to light. Such camera, however, does not pay special attention to miniaturization in construction and elimination of a projection for a pentagonal prism.

SUMMARY OF THE INVENTION

It is an object of the present invention to provide a flash apparatus which allows flashlight photographing of various subjects in a photographing area in appropriate exposure by simple operation without failure.

It is another object of the present invention to provide a camera which can take a good photograph of a subject in a backlighted condition.

It is a further object of the present invention to provide a camera which can take a photograph of a special area using an ordinary 35 mm size film and is minimized in depthwise dimension and/or in vertical dimension.

It is a still further object of the present invention to provide a compact single lens reflex camera which can take a photograph of a special screen using an ordinary 35 mm size film and has no projection for a pentagonal prism at an upper face thereof.

In order to attain the objects, according to the present invention, there is provided a flash apparatus, comprising a flashlight emitting section having a predetermined irradiation angle with respect to a light emission optical axis, and irradiating direction changing means for automatically changing the direction of the light emission optical axis of the flashlight emitting section in response to subject information. Such subject information may be, for example, distribution information of brightness values of or distances to subjects in a photographing area.

With the flash apparatus, when a photographing area includes, in addition to an aimed subject, some other body which is positioned in the proximity of the flash apparatus, the flash apparatus detects the presence of such proximate body in response to distribution information of distances to subjects in the photographing area and changes the irradiating direction of the flashlight emitting section such that it may be diverted from the body. Consequently, while a required amount of flashlight is irradiated upon the aimed subject, the irradiation amount of flashlight upon the proximate body is reduced to prevent possible over exposure. Further, when a photographing area includes, for example, an indoor subject and an outdoor subject, such photographing situation is recognized in accordance with distribution of brightness values of subjects in the photographing area and the irradiating direction of the light emitting section is changed so as to be displaced to the indoor subject side. Consequently, while the outdoor subject is prevented from presenting an over exposure condition, a required amount of flashlight can be irradiated as auxiliary light to the indoor subject.

Then, since such change of the irradiating direction of the flashlight emitting section is automatically performed in response to subject information of a photographing area such as distribution information of distances to subjects or distribution information of brightness values of subjects, flashlight photographing can be performed with appropriate exposure for various subjects very rapidly and accurately with certainty and simple operation without the possibility of failure in operation.

Particularly when also the irradiation angle is changed in response to changing of the irradiating direction, if the irradiation angle is reduced as the irradiating direction is changed so as to be diverted from the center of a photographing area in order to prevent the irradiation range of flashlight from coming out of the photographing range, then useless emission of flashlight can be prevented while the energy concentration to the thus reduced irradiation range can be increased.

According to another aspect of the present invention, there is provided a camera which comprises main subject detecting means for detecting which one of a plurality of areas into which a photographing area is divided includes a main subject, backlight detecting means for detecting backlighted conditions of the individual areas of the photographing area, judging means for judging, in response to results of detection of the backlight detecting means, a backlighted condition of one of the areas which is detected by the main subject detecting means, and exposure controlling means for correcting exposure of the main subject for which a backlighted condition is judged by the judging means. The exposure controlling means may include a flash apparatus.

With the camera, when a main subject is in a backlighted condition, it is detected by the backlight detecting means, and exposure of the main subject is corrected in response to such detection. Accordingly, the main subject can be photographed with appropriate exposure. When the amount of light to the main subject in such backlighted condition is insufficient, the flash apparatus may be rendered operative to irradiate flashlight as auxiliary light upon the main subject.

According to a further aspect of the present invention to provide a camera which comprises film feeding means for feeding a film in a horizontal direction, a special screen frame for sectioning an exposeable area of the film itself so as to prevent at least part of the exposeable area in a vertical direction from being exposed to light, an in-focus condition detecting device disposed below a lower edge of an exposure area defined by the special screen frame in a vertical direction of the camera but above a lower edge of the exposeable area of the film itself, and a lens driving device for driving a photographing lens to an in-focus position in response to an output of the in-focus condition detecting device.

With the camera, since the in-focus condition detecting device is disposed below the lower edge of the exposure area defined by the special screen frame in the vertical direction of the camera but above the lower edge of the exposeable area of a film itself, it can be disposed such that it may not interfere with exposure light to the film, and besides the overall height of the camera can be decreased.

According to a still further aspect of the present invention to provide a single lens reflex camera which comprises film feeding means for feeding a film in a horizontal direction, a special screen frame for sectioning an exposeable area of a film itself so as to prevent at least part of the exposeable area in a vertical direction from being exposed to light, and a focus plate disposed above an upper edge of an exposure area defined by the special screen frame in a vertical direction of the camera but below an upper edge of the exposeable area of the film itself.

With the single lens reflex camera, since the focus plate is disposed above the upper edge of the exposure area defined by the special screen frame in the vertical direction of the camera but below the upper edge of the exposeable area of a film itself, it can be disposed such that it may not interfere with exposure light to the film, and besides the overall height of the camera can be decreased.

According to a yet further aspect of the present invention, there is provided a camera wherein the aspect ratio a/c of a photographing area of a film is a/c÷3 where a is a horizontal dimension of an exposeable area of a film and c is a vertical vertical of such exposeable area, which comprises an eyepiece having a horizontal dimension L and a vertical dimension H which present a ratio L/H defined by 1.5<L/H<2.2

The above and other objects, features and advantages of the present invention will become apparent from the following description and the appended claims, taken in conjunction with the accompanying drawings in which like parts or elements are denoted by like reference characters.

BRIEF DESCRIPTION OR THE DRAWINGS

FIGS. 20a, 20b, 21, 22, 23, 24a, 24b, 25a, 25b and 26 are flow charts illustrating operation of the camera of FIG. 1;

DESCRIPTION OR THE PREFERRED EMBODIMENT

Figure 2:
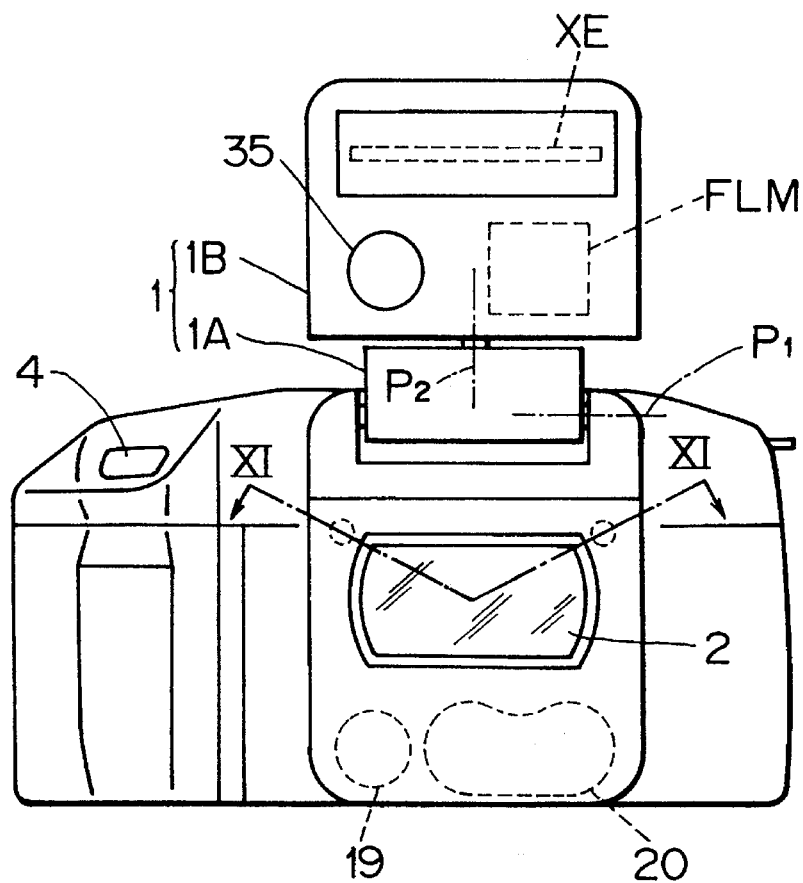
FIG. 2 is a front elevational view of the camera of FIG. 1.
Figure 3:
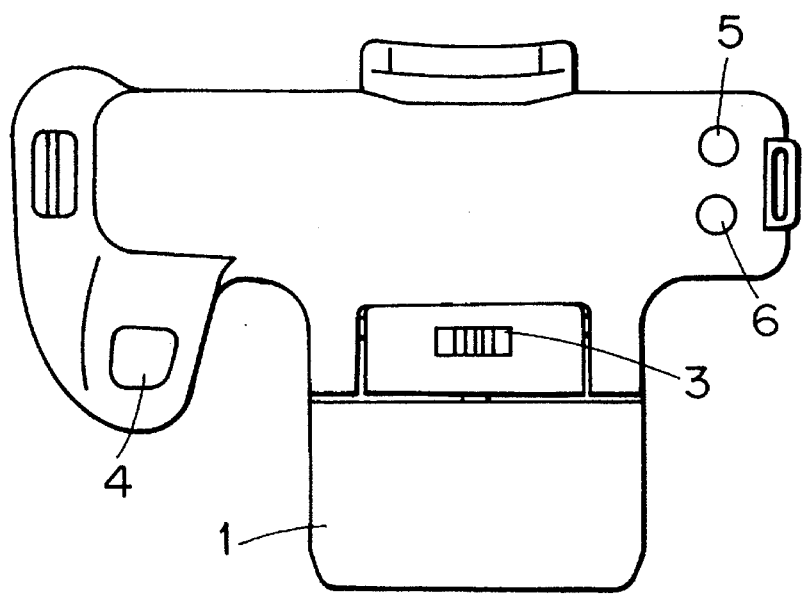
FIG. 3 is a top plan view of the camera of FIG. 1.
Figure 4:
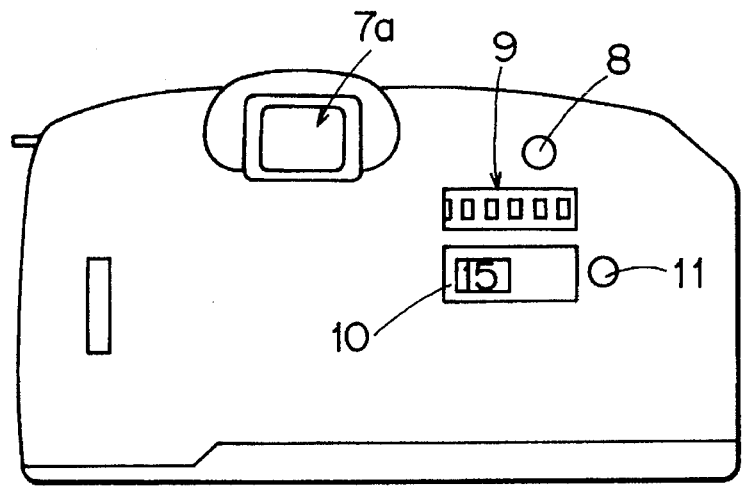
FIG. 4 is a rear elevational view of the camera of FIG. 1.
Figure 5:
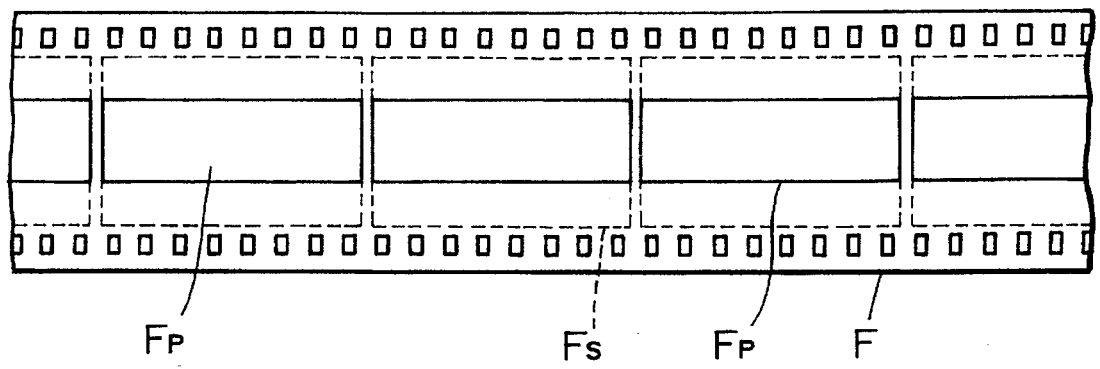
FIG. 5 is a front elevational view of a film.

Referring first to FIGS. 2 to 4, there is shown an entire camera in which a flash apparatus according to the present invention is incorporated. The camera shown includes a photographing optical system 2 having a zooming function. While details of a photographing operation of the camera will be hereinafter described, an outline is described first. With the camera, such a film F of the 35 mm version as shown in FIG. 5 is used, and for a standard area Fs of [24×36 mm] indicated by a broken line rectangular block which is a standard format of such film F, the camera takes a photograph on a photographing area Fp of a horizontally elongated panorama size of [13×36 mm] which is obtained by cutting upper and lower portions of the standard area Fs. Since photographing light need not be introduced to the portions above and below the photographing area Fp, the photographing optical system 2 is formed in a generally elliptical or rectangular shape having a small vertical dimension comparing with a horizontal dimension.

Incidentally, when printing is to be performed from a film F on which photographs have been taken on photographing areas Fp of the panorama size using the camera, the printing magnification is made higher than that of a film on which photographs are taken on standard areas Fs so that a laterally elongated print which has a same vertical dimension as a print on which a standard area Fs of the 35 mm version is printed may be obtained, but the other steps remain common to those for a standard area Fs. Thus, DPE processing can be performed almost commonly to that of a standard area Fs.

Figure 1:
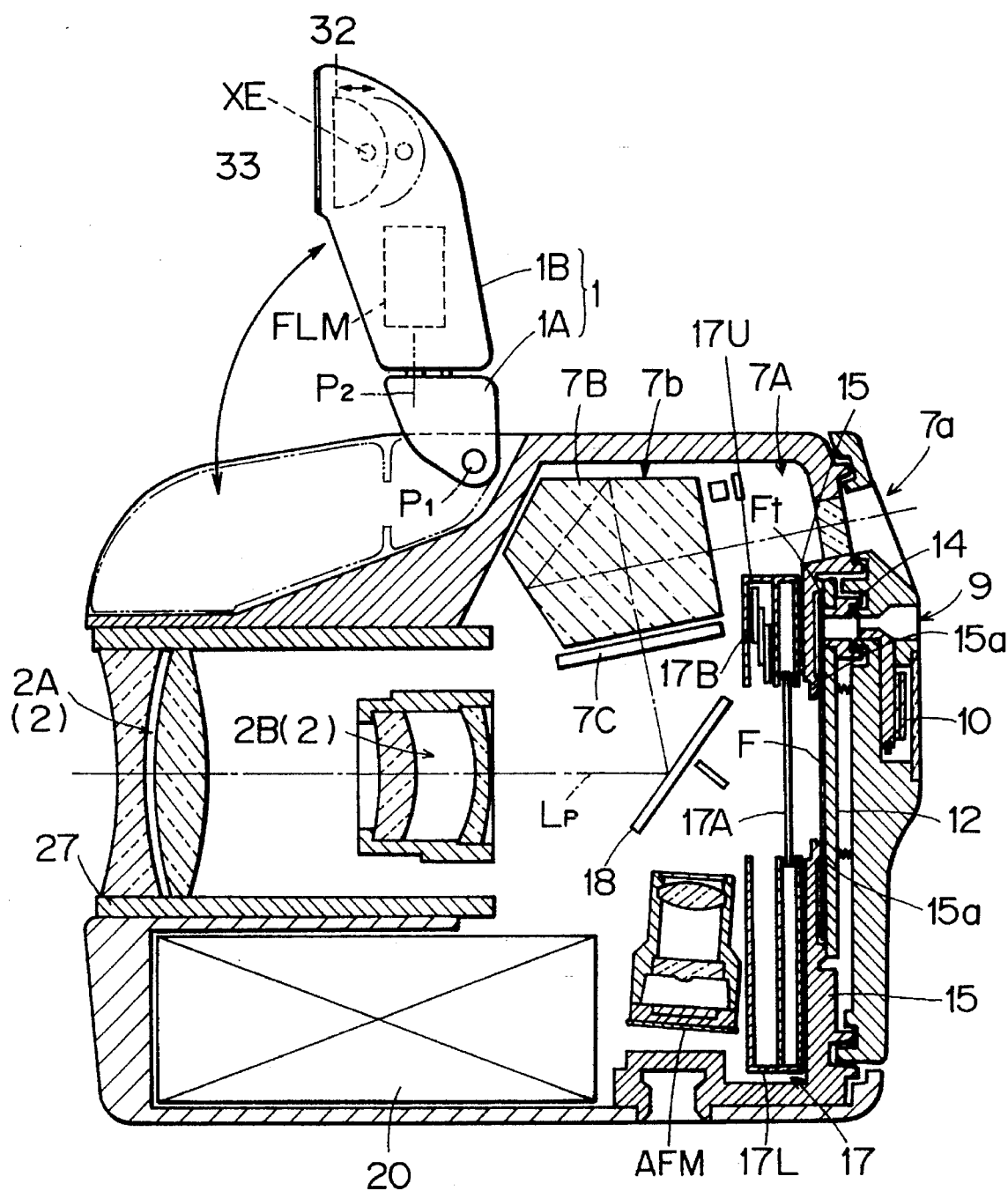
FIG. 1 is a vertical sectional view of a camera in which a flash apparatus according to the present invention is incorporated.

Referring to FIGS. 1 and 2, the flash apparatus 1 which is used with the camera described above is mounted for pivotal motion around a horizontal axis $P_1$ on the camera between an operative position in which it is erected uprightly as shown by solid lines in FIG. 1 and another inoperative position in which it lies horizontally on the camera as shown by broken lines such that a rear face thereof forms a face interconnecting an upper face to a front face of the camera. Meanwhile, though not shown, the camera has an arresting mechanism for arresting the flash apparatus 1 at the inoperative position and a spring for normally urging the flash apparatus 1 toward the operative position. Referring to FIG. 3, the camera further includes an operating member of the slide type mounted on the upper face thereof behind the flash apparatus 1 for releasing the flash apparatus 1 from the arrested condition by the arresting mechanism to allow the flash apparatus 1 to be pivoted from the inoperative to the operative position and also to make a power source for the entire camera available.

Referring to FIG. 3, further provided on the upper face of the camera are a release button 4 for starting a photographing operation and a zoom-up key 5 and a zoom-down key 6 for changing the focal length of the photographing optical system 2 to effect a zooming operation. Referring to FIG. 4, an eye-piece window 7a of a viewfinder optical system 7 into which light introduced into and branched from the photographing optical system is to be introduced is located on a rear face of the camera. Further provided on the rear face of the camera are an AE/AF locking button 8, a film confirming window 9 for confirming a film F in the camera therethrough, a liquid crystal display section 10 for displaying a frame number of a film F or the like thereon, and a backlight button 11 for lighting a backlight lamp (not shown) for the liquid crystal display section 10.

Referring back to FIG. 1, the film confirming window 9 includes a light intercepting tube 14 with a light shielding member which is located above a pressing plate 12 for pressing against a film F from behind and has an end exposed outwardly of the camera so that a portion of the film F at which perforations are formed can be observed directly therethrough from the outside of the camera. Thus, not only presence or absence of a film F but also whether or not a film F is fed regularly can be confirmed through the film confirming window 9. Besides, since a photographing area Fp of the camera only employs an area which is a vertical mid area of a standard area Fs and is equal to about one third the overall width of a film F as described hereinabove, while the camera employs such construction for the observation of a film as described just above, leakage light is prevented from entering any portion of a film F to be actually exposed to light.

A film pressing face of the pressing plate 12 must only have a vertical dimension which is a little greater than a vertical distance between a pair of upper and lower film guiding rails 15a formed on a rear portion of an opening frame 15 of [13 mm×36 mm] provided forwardly of a film F for defining the photographing area Fp. Thus, such effective utilization of a spacing is achieved that the light intercepting tube 14 for the observation of a film described above is provided above the pressing face of the pressing plate 12.

Figure 28:
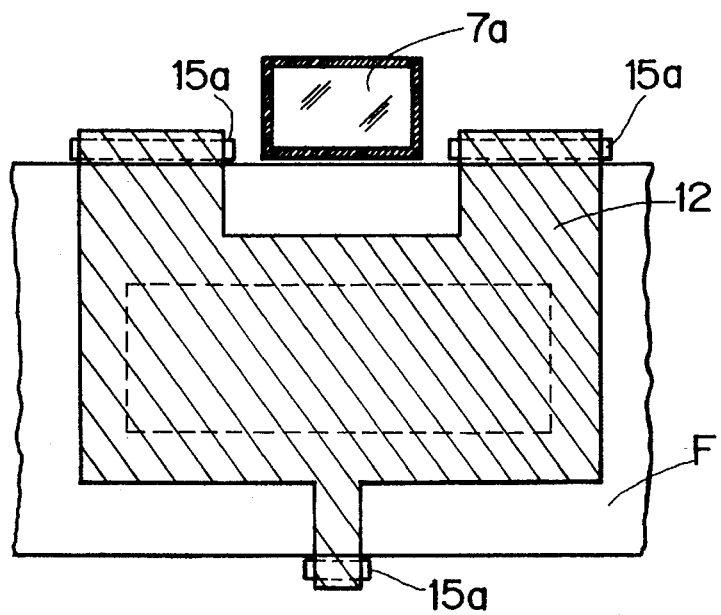
FIG. 28 is a rear elevational view showing another form of pressing plate.

It is to be noted that, since the pressing plate 12 must only be constructed such that it presses against a film F including and around the photographing area Fp of the panorama size, the pressing plate 12 may be attached in such a manner as shown in FIG. 28 wherein it is contacted at a pair of upper left and right portions and a lower portion thereof with contacting portions 15a formed on the opening frame 15 eliminating any other contacting portion to achieve reduction in weight and compaction in size of the pressing plate 12. Also with the construction, the location of the eye-piece window 7a of the viewfinder optical system 7 can be made near to a film F and compaction of the entire camera can be achieved.

Figure 6:
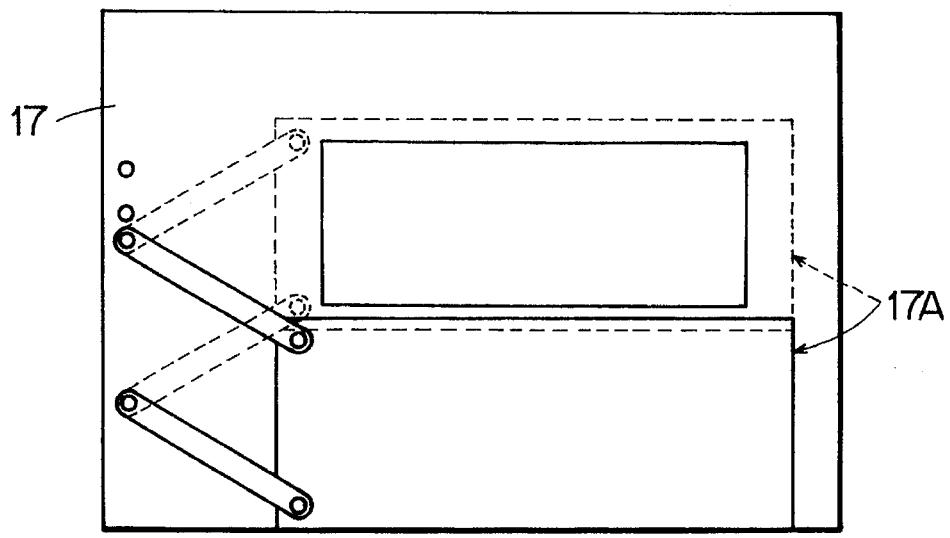
FIG. 6 is a front elevational view of a first blade of a shutter of the camera of FIG. 1.

Further, since the vertical dimension of the photographing area Fp is smaller than the vertical dimension of the standard area Fs and corresponds to a vertically mid portion of the standard area Fs, also a shutter 17 can be used wider at upper and lower portions other than a portion thereof corresponding to the photographing area Fp than that for the standard area Fs. Thus, the shutter 17 is constructed such that, as shown in FIGS. 1 and 6, a first blade 17A thereof which is positioned in a photographing light path before exposure is formed as a single plate such that it may be retracted, upon exposure, into a shutter case 17L therebelow. In short, even if the first blade 17A of the shutter 17 is formed as a single plate, it only requires a same vertical dimension of a blade of a two-part construction due to vertical motion with respect to the standard area Fs, and accordingly, the shutter unit does not require a great size. Besides, since the first blade is formed as a single plate, prevention of leakage light to a film F before exposure is facilitated. A manner of such vertical motion of the first blade 17A is illustrated in FIG. 6 wherein a position thereof before exposure is shown by broken lines and another position after it has been moved vertically downwardly is shown by solid lines.

Figure 7:
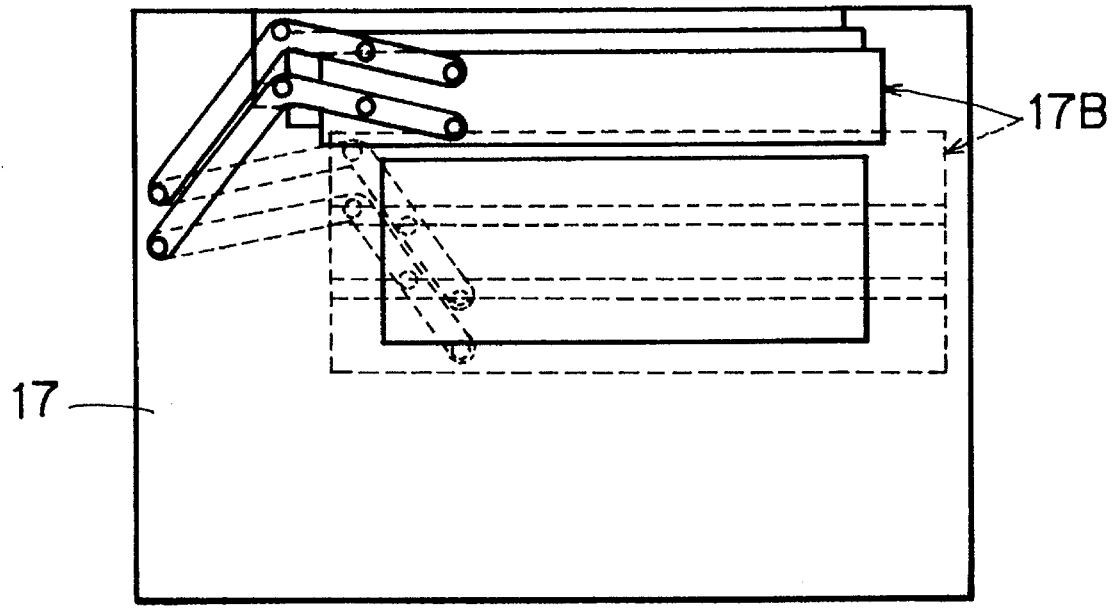
FIG. 7 is a front elevational view of a second blade of the shutter of the camera of FIG. 1.

On the other hand, a second blade 17B of the shutter 17 has such a three-part construction as shown in FIGS. 1 and 7 and is accommodated, before exposure. in a shutter case 17U above the photographing light path. Thus, the shutter 17 is made in a compact size which has a small dimension above a photographing optical axis Lp of the camera. It is to be noted that a position of the second mambrane 17B before exposure is shown by solid lines and another position after completion of exposure is shown by broken lines.

Since the shutter 17 has a reduced dimension above the photographing optical axis Lp as described above, a location above the shutter 17 is utilized as an installation spacing for the eye-piece portion 7A of the viewfinder optical system 7 as seen in FIG. 1 and a lower portion of a pentagonal prism 7B constituting the viewfinder optical system 7 and the focus plate 7C are provided such that they are fitted in a spacing below an upper end edge Ft of a film F in which they do not interfere with exposure light to the photographing area Fp of the panorama aide. Thus, the dimension an upper end of the viewfinder optical system 7 from the photographing optical axis LID is minimized thereby achieve compaction of the entire camera. Meanwhile, an AF module AFM for detecting an in-focus condition disposed such that it is partly received in a spacing above a lower end of the film F but lower than a lower end of an exposure area of the panorama size.

Further, the viewfinder optical system 7 has a viewfinder optical axis Lf inclined with respect to the photographing optical axis Lp such that a ridgeline 7b of the pentagonal prism 7B may be substantially in a horizontal posture. Thus, while the camera is a single lens reflex camera, it has no projection of a pentagonal prism portion from the upper face thereof and accordingly has a profile which is compact and easy to handle.

Figure 8:
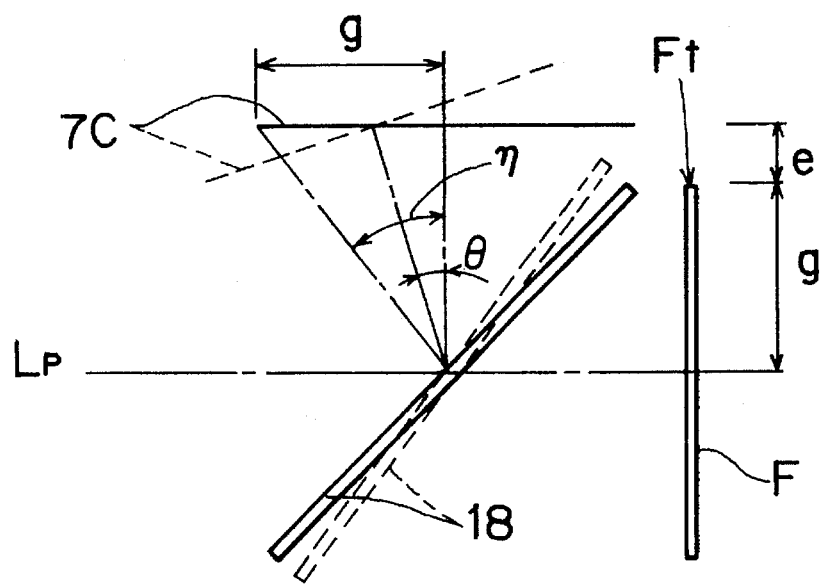
FIG. 8 is a diagrammatic representation illustrating a relationship between a mirror and a focus plate of the camera of FIG. 1.

Here, inclinations of the pentagonal prism 7B and the focus plate 7C described above will be described complementarily. When the focus plate 7C is disposed in an inclined relationship, it is necessary to eliminate a possible eclipse of photographing light to a face of a film F by the focus plate 7C and also to prevent possible interference of the focus plate 7C with a retracting movement upon exposure of a main mirror 18 which branches light introduced into the photographing optical system 2 to the viewfinder optical system 7. If the inclination limit θ of the focus plate 7C is calculated taking the two points as requirements, then where several parameters are defined as illustrated In FIG. 8, since they have such relationships as given by $$\eta = \tan^{-1}(g/e+g)$$

$$\kappa = g/\sin\eta$$

$$\eta + \theta = \cos^{-1}(g/k) \tag{1}$$

if calculations are performed in accordance with the expressions (1) above for the standard area Fs and the photographing area Fp of the panorama size In the camera of the present invention, then the following Table 1 is obtained where e=3 min.

TABLE 1

|   | Standard area (Fe) | Photographing area of Panorama Size (Fp) |
|---|---|---|
| g | 12 mm | 6 mm |
| η | 38.7° | 33.7° |
| κ | 19.2 mm | 10.8 mm |
| θ | 12.6° | 22.6° |

In particular, because the camera has the photographing area Fp having a reduced vertical dimension, the focus plate 7C and the pentagonal prism B can have a great inclination comparing with those of a camera for taking a photograph with the standard screen Fs, and accordingly, the pentagonal prism 7B can be inclined such that the ridgeline 7b thereof may have a horizontal posture as described hereinabove.

Figure 9:
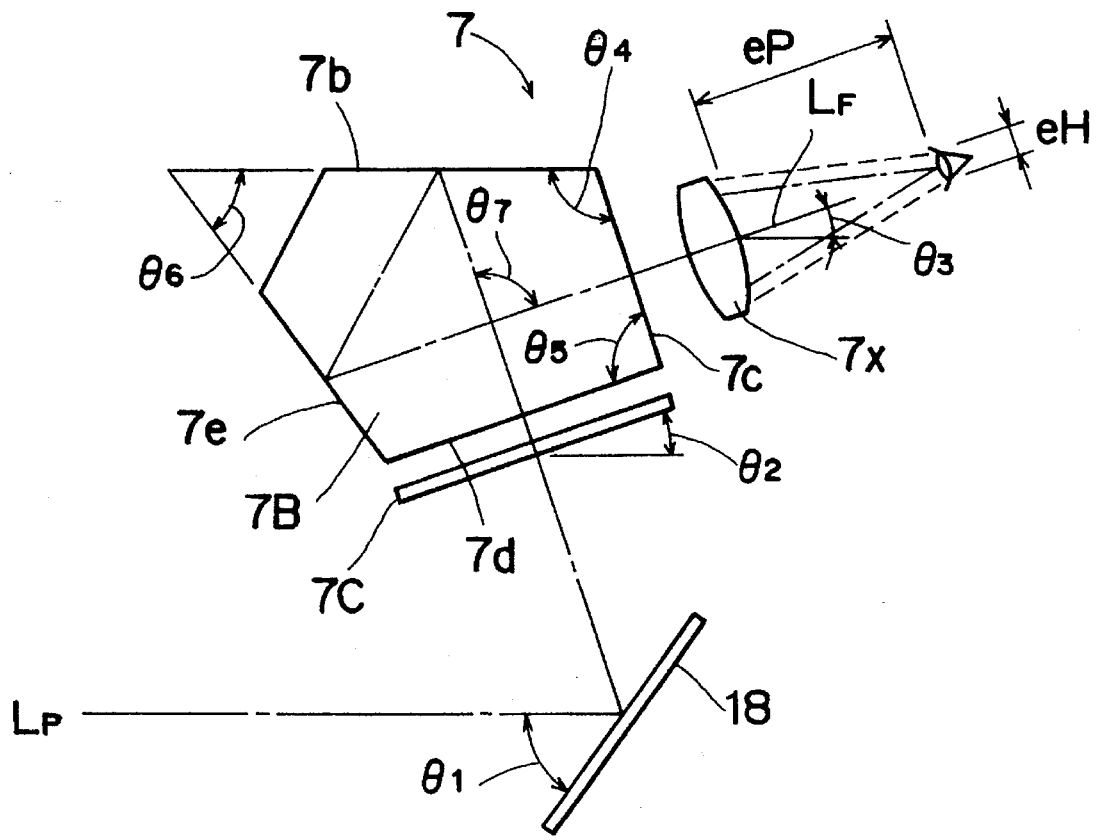
FIG. 9 is a diagrammatic representation of a viewfinder optical system of the camera of FIG. 1.
Figure 27:
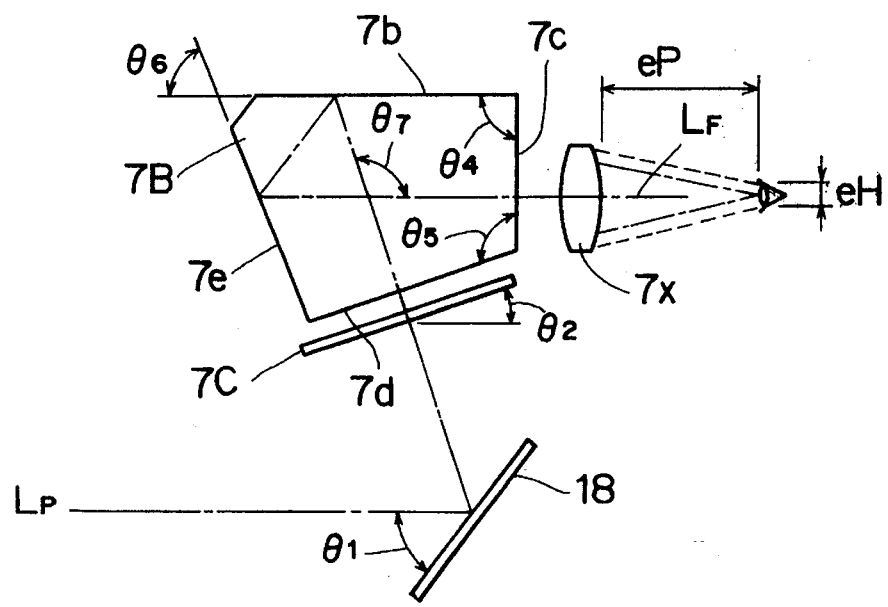
FIG. 27 is a diagrammatic representation similar to FIG. 9 but showing a modified viewfinder optical system.

Subsequently, description will be given of the inclination of the pentagonal prism 7B. Requirements for assuring a horizontal posture of the ridgeline 7b of the pentagonal prism 7B are given, taking it into consideration that light to an entire area of the photographing area Fp passes through the pentagonal prism 7B, by $$\theta_1 \times 45°$$

$$\theta_2 = 2\theta_1 - 90°$$

$$|\theta_4 - \theta_3 - 90°| \leq 5°$$

$$\theta_5 + 2\theta_6 = \theta_7 \tag{2}$$

where, as seen in FIG. 9, $\theta_1$ is an angle defined by the photographing optical axis Lp and the main mirror 18, $\theta_2$ is an inclination angle of the focus plate 7C, $\theta_3$ is an angle defined by the photographing optical axis Lp and the viewfinder optical axis Lf, $\theta_4$ is an angle defined by the ridgeline 7b and an emergence face 7c of the pentagonal prism 7B, $\theta_5$ is an angle defined between an incidence face 7d and the emergence face 7c of the pentagonal prism 7B. $\theta_6$ is an angle defined by the ridgeline 7b and a reflecting face 7e of the pentagonal prism 7B, and $\theta_7$ is an angle defined by incidence light and emergence light to and from the pentagonal prism Only if the relationships of the expressions are satisfied, the pentagonal prism 7B may have a different form from that shown in FIG. 9. For example, the pentagonal prism 7B may be constructed in such a manner as shown in FIG. 27 wherein also the viewfinder optical axis Lf has a substantially horizontal posture.

Referring to FIGS. 1 and 9, light emitted from the pentagonal prism 7B first passes through an eye-piece 7x at the eye-piece portion 7A and then reaches a pupil E of a photographer by way of the eye-piece window 7a. Here, the eye-piece 7x is dimensioned such that it may have an aspect ratio (L/H) ranging from 1.5 to 2.2 so that a subject in the photographing area Fp which is a horizontally elongated screen having another aspect ratio of about 3 may be visually observed.

Figure 10:
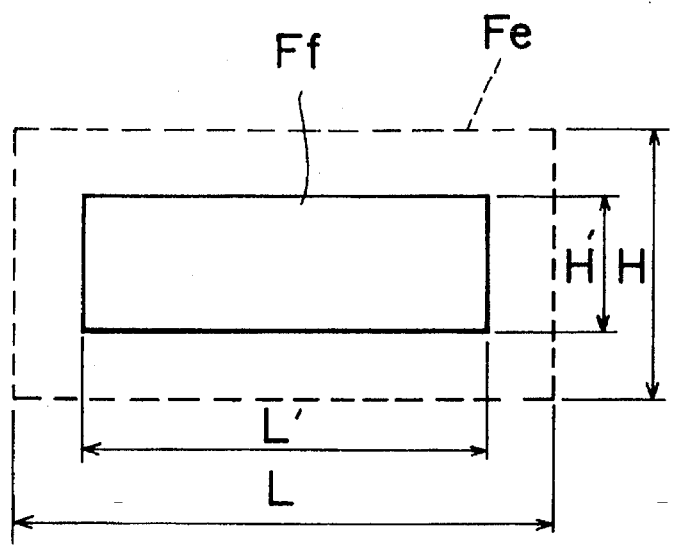
FIG. 10 is a diagrammatic representation of a viewfinder area of the camera of FIG. 1.

This will be described more in detail. Since the pupil E which looks at a viewfinder image by way of the eye-piece 7x as seen in FIG. 9 has a predetermined diameter, if light is introduced into the entire pupil E, then the entire viewfinder image can be visually observed. Accordingly, the eye-piece 7x must only have an effective field Fe of view which is greater by a dimension equal to the diameter of the pupil E around the viewfinder area Ff having the same aspect ratio as the photographing area Fp as seen in FIG. 10, and consequently, the effective field Fe of view need not have such a great aspect ratio as the photographing area Fp. Thus, an incidence beam of light is used effectively in the viewfinder optical system 7 so that the horizontal dimension of the eye-piece 7x may be made a comparatively small dimension to achieve compaction of the entire camera.

Further, complementarily describing the foregoing using actual dimensions, where a focal length of the photographing optical system 2 is represented by f, a horizontal dimension of the photographing area Fp is represented by a, and a vertical dimension is represented by c, angles of field of the photographing optical system 2 are given by

[minor side]$\Delta S = 2 \cdot \tan^{-1}(C/2f)$

[major side]$\Delta L = 2 \cdot \tan^{-1}(a/2f)$ (3)

and where a magnification of the viewfinder optical system 7 is represented by Γ and the eye relief is represented by ep, dimensions of the viewfinder screen Ff is given, by introducing the expressions (3) above, by

[minor side] $H' = 2 \cdot ep \cdot \Gamma \cdot \tan(\Delta S/2)$ (4)

$= ep \cdot c \cdot \Gamma/f$

[major side] $L' = 2 \cdot ep \cdot \Gamma \cdot \tan(\Delta L/2)$ $= ep \cdot a \cdot \Gamma/f$ Further, where the diameter of the pupil E is represented by eH, dimensions of the effective field Fe of view of the eye-piece 7x are calculated in accordance with expressions

[minor side]$H = ep \cdot c \cdot \Gamma/f + eH$

[major side]$L = ep \cdot a \cdot \Gamma/f + eH$ (5)

If the values ep=10 to 20 mm, Γ/f=0.012 to 0.024, a=36 mm, c=12 mm and eH=4 mm are substituted, as an example, into the expressions (5) above, then the following expressions are obtained:

5.44 mm ≤ H ≤ 9.76 mm 8.32 mm ≤ L ≤ 21.28 mm (6)

From the expressions (6), an expression 8.32/5.44 ≤ L/H ≤ 21.28/9.76 is obtained, and accordingly, it can be recognized that the eye-piece 7x should have an aspect ratio of 1.5<L/H<2.2 for the photographing area Fp having an aspect ratio of 1:3 as described hereinabove.

As described hereinabove, the photographing optical system 2 of the camera is formed such that it has a horizontally elongated generally elliptic shape having a small vertical dimension. Then, the flash apparatus 1 in the inoperative position is located just above the photographing optical system 2 as seen in FIG. 1, and a main capacitor 19 for accumulating light emission energy for the flash apparatus 1 therein and a lithium cell 20 serving as a power source are located just below the photographing optical system 2. Thus, locations in the camera above and below the photographing optical system 2 which do not contribute to exposure of the horizontally elongated photographing area Fp of the panorama size are utilized effectively as accommodating spacings for those elements in order to achieve compaction of the entire camera.

Figure 11:
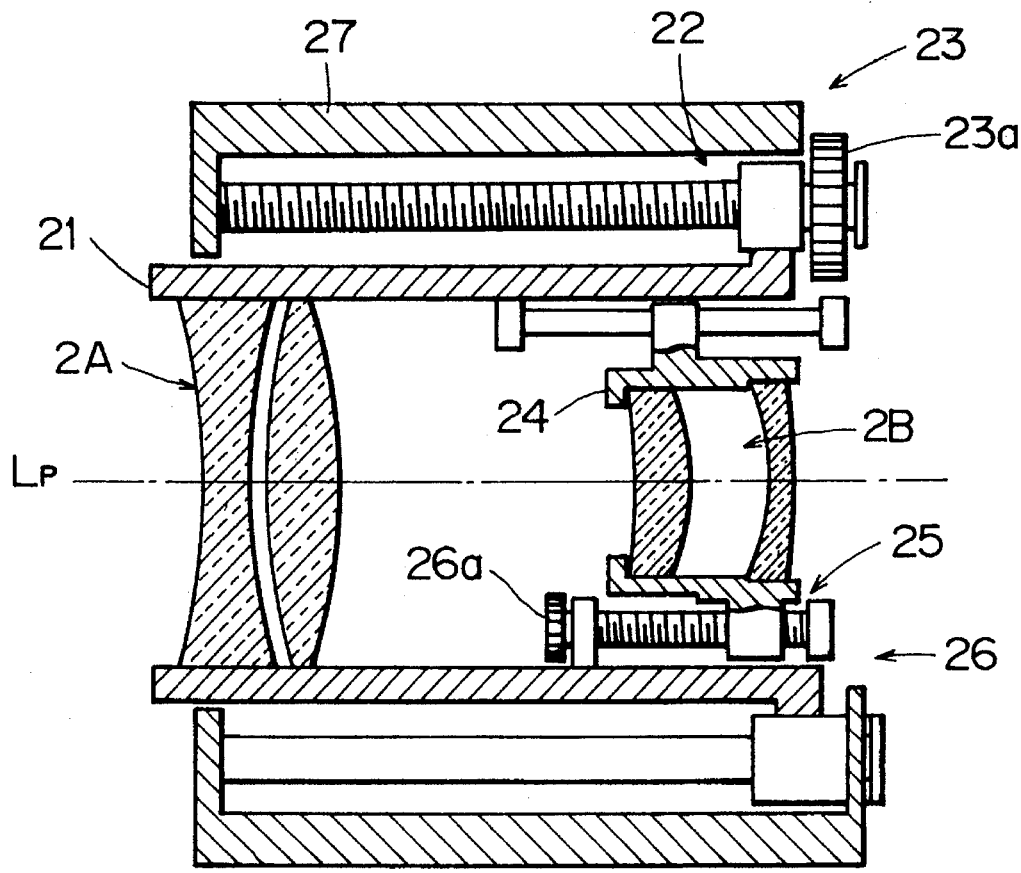
FIG. 11 is a sectional view taken along line XI—XI of FIG.

Referring now to FIGS. 1 and 11, the photographing optical system 2 includes four lenses in two groups including a front lens group 2A and a rear lens group 2B each including two lenses, and the camera includes a first driving mechanism 23 for moving a first lens frame 21, on which the front lens group 2A is mounted, forwardly or rearwardly along the photographing optical axis Lp by way of a screw feed mechanism 22, and a second driving mechanism 26 for moving a second lens frame 24, on which the rear lens group 2B is mounted, forwardly or rearwardly along the photographing optical axis Lp by way of another screw feed mechanism 25.

The first driving mechanism 23 includes a gear 23a connected to a zooming motor not shown by way of a motion transmitting mechanism not shown so that, when the zooming motor is energized, the first lens frame 21 is advanced or retracted in an outer frame 27 fixed to the camera and the second lens frame 24 is moved relative to the first lens frame 21 by way of a cam mechanism not shown in order to change the focal length of the photographing lens system 2, that is, to effect zooming.

Meanwhile, the second driving mechanism 26 includes another gear 26a connected to a focusing motor not shown by way of another motion transmitting mechanism not shown so that, when the focusing motor is energized, the second lens frame 24 is moved relative to the first lens frame 21 to effect a focusing operation of the photographing optical system 2.

Referring to FIG. 1, as described hereinabove, the flash apparatus 1 is mounted for pivotal motion around the horizontal axis $P_1$ so that it may stand uprightly or lie down on the camera. In addition, in the flash apparatus 1 itself, a light emitting portion 1B is mounted for pivotal motion around a vertical axis $P_2$ on a base portion 1A so that the irradiating direction of the light emitting portion 1B can be swung leftwardly or rightwardly with respect to the photographing optical axis Lp. Further, in the light emitting portion 1B, a discharge tube XE and a reflecting plate 32 are mounted for forward and rearward movement relative to a diffusing plate 33 on a front face of the light emitting portion 1B so that the irradiation angle of the light emitting portion 1B can be changed.

The light emitting portion 1B includes a driving motor (hereinafter referred to as flash motor) FLM for driving such an irradiating direction changing operation (hereinafter referred to as swinging operation) and an irradiation angle changing operation (hereinafter referred to as zooming operation) as described above. The light emitting portion 1B further includes an auxiliary light emitting portion 35 for irradiating auxiliary light for an in-focus condition detecting operation.

Figure 12:
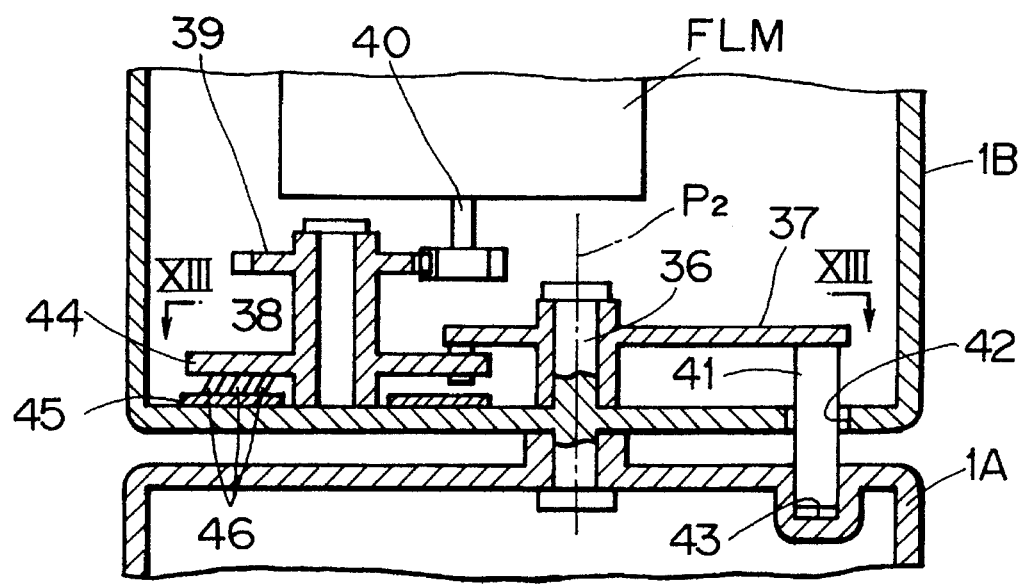
FIG. 12 is a sectional view showing a mechanism for changing an irradiating direction in the camera FIG. 1.
Figure 13:
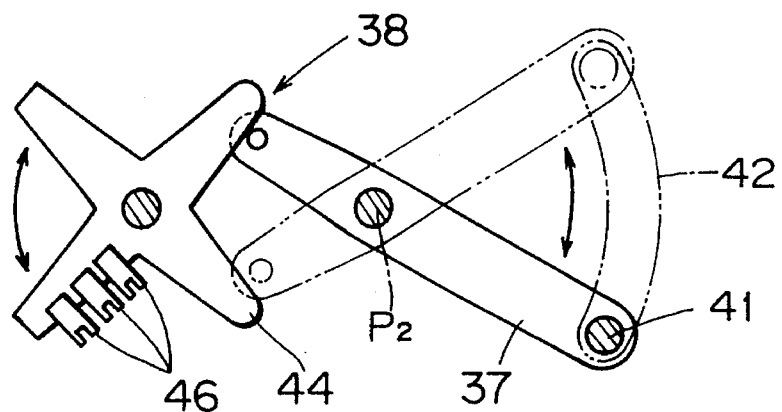
FIG. 13 is a view as viewed in a direction along lines XIII—XIII of FIG. 12.

First, an irradiating direction changing mechanism for a swinging operation will be described. Referring to FIGS. 12 and 13, a pin 36 is fixed to the light emitting portion 1B and is supported for rotation around an axis thereof on the base portion 1A, and an operating lever 37 is fitted around the pin 36. The operating lever 37 is operatively coupled to a drive shaft 40 of the flash motor FLM by way of a swinging cam mechanism 38 and a speed reducing gear 39. A guide pin 41 is mounted at the other end of the operating lever 37 and extends through an elongated hole 42 formed in the light emitting portion 1B so that it is loosely fitted in a fitting hole 43 formed in the base portion 1A. Then, when the flash motor FLM is driven to rotate reversely, the light emitting portion 1B is pivoted with respect to the base portion 1A around an an axis of the guide pin 41 loosely fitted in the fitting hole 43.

The swinging cam mechanism 38 includes a cam plate 44 on which a plurality of contacts 46 are provided for contacting with a swinging encoder board 45 securely mounted in the light emitting portion 1B so that an amount of pivotal motion of the light emitting portion 1B with respect to the base portion 1A, that is, an amount of swinging motion, can be detected by detecting a change of a contacting pattern of the contacts 46 with the swinging encoder board 45 which is caused by rotation of the cam plate 44 driven by the flash motor FLM.

Figure 14:
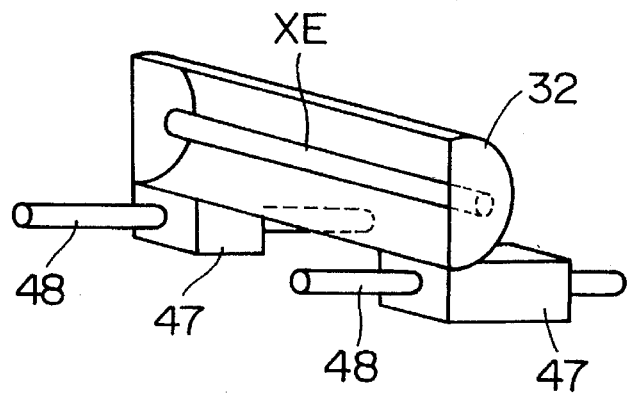
FIG. 14 is a schematic perspective view of a discharge tube of the camera of FIG. 1.
Figure 15:
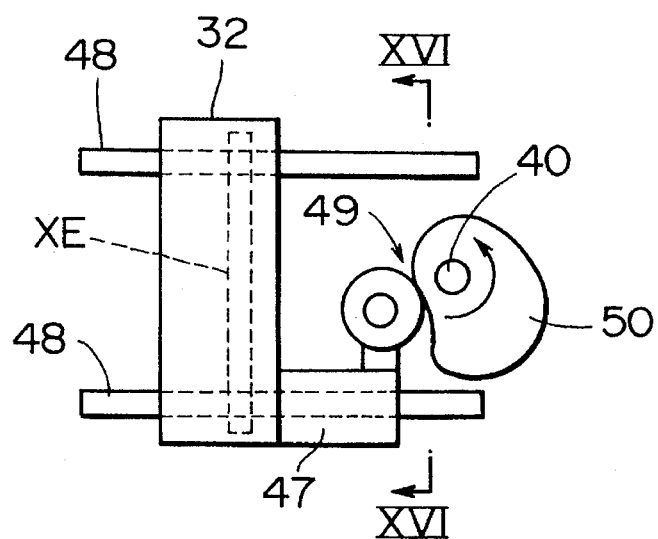
FIG. 15 is a schematic sectional view of the mechanism shown in FIG. 1.

Subsequently, an irradiation angle changing mechanism for a zooming operation will be described. Referring to FIGS. 14 and 15, a pair of supporting members 47 are provided contiguously on the reflecting plate 32 and individually fitted for sliding movement on a pair of guide shafts 48 extending in forward and rearward directions. One of the supporting members 47 is operatively coupled to the drive shaft 40 of the flash motor FLM by way of a zooming cam mechanism 49 while the reflecting plate 32 is normally urged rightwardly in FIG. 15, that is, in a rearward direction of the camera by a spring not shown.

Then, when the flash motor FLM is driven to rotate forwardly, the discharge tube XE and the reflecting plate 32 are moved forwardly against the urging force of the spring.

Figure 16:
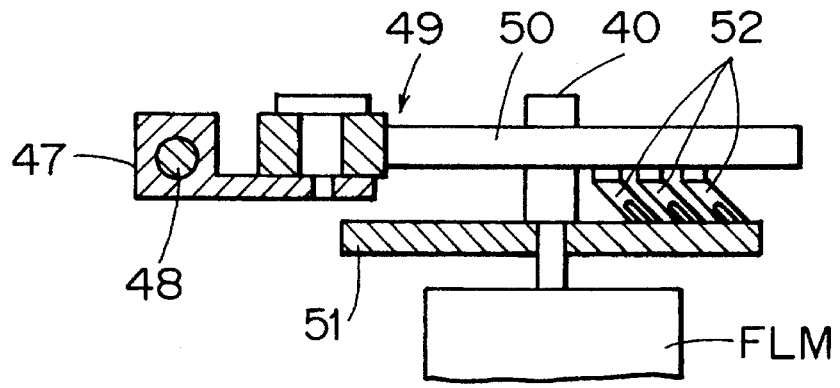
FIG. 16 is a sectional view taken along line XVI—XVI of FIG. 15.

Referring to FIG. 16, the zooming cam mechanism 49 includes a cam plate 50 on which a plurality of contacts 52 are provided for contacting with a zooming encoder board 51 so that an amount of movement of the discharge tube XE relative to the diffusing plate 33, that is, an amount of zooming operation, can be detected by detection of a change of a contacting pattern of the contacts 52 with the zooming encoder board 51 which is caused by rotation of the cam plate 50 driven by the flash motor FLM.

Subsequently, operation of the camera will be described. Prior to such description, an outline thereof will be described in connection with the photographing area Fp described hereinabove.

Figure 18:
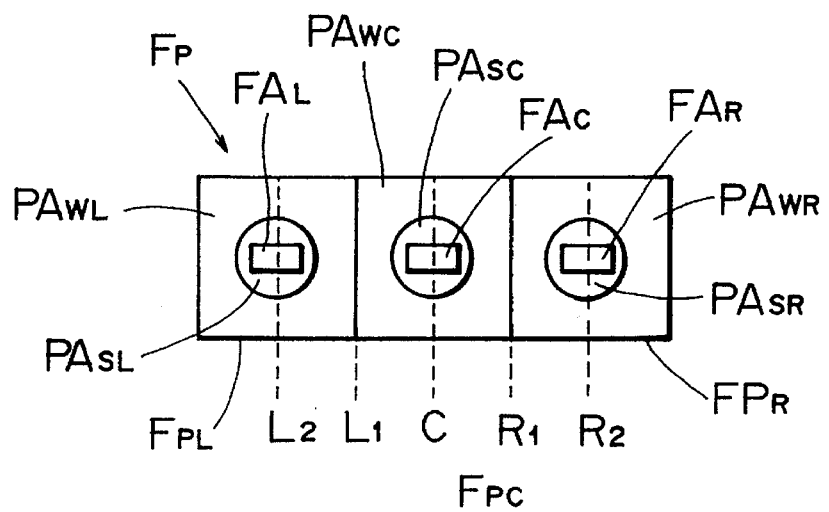
FIG. 18 is a diagrammatic front elevational view of a photographing area.

As described hereinabove, the photographing area Fp of the camera has a panorama size which is great in horizontal dimension comparing with a vertical dimension so that many subjects may be included in a photograph over a wide angle of field. Accordingly, in order to allow fine control in response to situations of such many subjects, the photographing area Fp is horizontally divided into three areas including a left photographing are $Fp_L$, a central photographing area $Fp_C$ and a right photographing area $Fp_R$. Then, in-focus condition detecting portions or areas including a left in-focus condition detecting area $Fp_L$, a central in-focus condition detecting area $FA_C$ and a right in-focus condition detecting area $FA_R$ are set at central portions of the photographing areas $Fp_L$, $Fp_C$ and $Fp_R$, respectively, as illustrated in FIG. 18. Further, spot light measuring portions or areas including a left spot light measuring area $PA_{SL}$, a central spot light measuring area $PA_{SC}$ and a right spot light measuring area $PA_{SR}$ and peripheral light measuring portions of areas including a left peripheral light measuring area $PA_{WL}$, a central peripheral light measuring area $PA_{WC}$ and a right peripheral light measuring area $PA_{WR}$ are set for the photographing areas $Fp_L$, $Fp_C$ and $Fp_R$, respectively. Further, a measuring area for adjusting the flashlight is determined as an entire area for each of the photographing areas $Fp_L$, $Fp_C$ and $Fp_R$.

Then, the swinging operation and the zooming operation of the flash apparatus 1 are controlled in response to information of distances to and brightness values of subjects of the individual photographing areas $Fp_L$, $Fp_C$ and $Fp_R$ obtained from the in-focus condition detecting areas $FA_L$, $FA_C$ and $FA_R$ and the light measuring areas $PA_{SL}$, $PA_{SC}$, $PA_{SR}$, $PA_{WL}$, $PA_{WC}$ and $PA_{WR}$ so that flashlight photographing may be performed in conformity with situations of the subjects in the photographing area Fp.

While detailed contents of control in flashlight photographing are hereinafter described, an outline thereof will be described just below. In particular, the flash apparatus 1 is normally positioned such that the center of irradiation thereof is directed to the center C of the photographing area Fp in the leftward and rightward directions and the irradiation range is the entire photographing area Fp. Then, in case one of the subjects included in the three photographing areas $Fp_L$, $Fp_C$ and $Fp_R$ is very near to the camera, the irradiation direction of the flash apparatus 1 is diverted away from the subject in order to prevent over exposure of the subject. On the contrary, in case one of the subjects included in the three photographing areas $Fp_L$, $Fp_C$ and $Fp_R$ is spaced so far from the camera that flashlight may not reach the subject or is in a partially backlighted condition, the irradiation direction of the flash apparatus 1 is displaced toward the subject and the irradiation angle is decreased to raise the energy concentration when necessary.

It is to be noted that lines $L_2$, $L_1$, $R_1$ and $R_2$ indicate directions in which the irradiation center directed when the irradiating direction of the flash apparatus 1 is displaced leftwardly or rightwardly from the center C of the photographing area Fp as described hereinabove. In particular, the irradiating direction can be changed to two different steps in each of the leftward and rightward directions.

Figure 29:
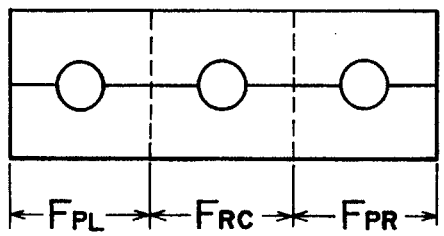
FIGS. 29 and 30 are front elevational views similar to FIG. 18 but showing different forms of photographing area.
Figure 30:
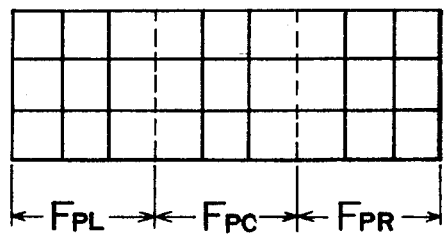
Figure 31:
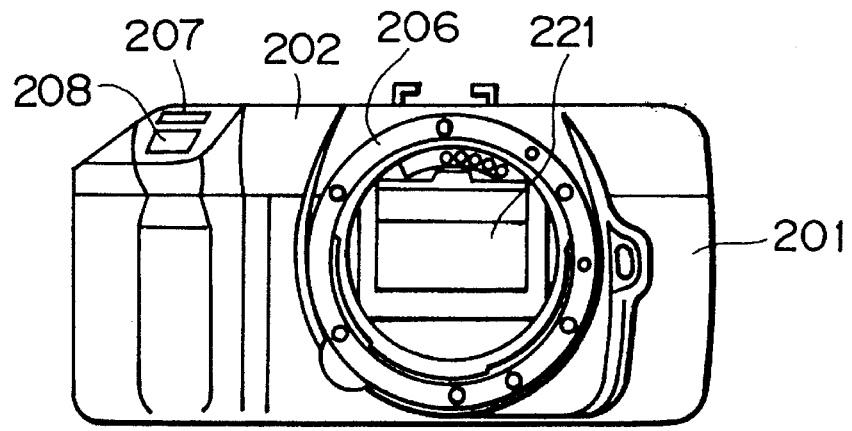
FIGS. 31, 32, 33 and 34 are a front elevational view, a rear elevational view, a top plan view and a bottom plan view, respectively, of another camera in which a modified automatic focusing module is incorporated.

Further, when the photographing are Fp is divided into a plurality of divisional areas, it may be divided into an arbitrary number of divisional areas arbitrary contours different from such left, central and right divisional areas as described above. Further, when light measuring areas are set for the three divisional areas, each of the photographing areas $Fp_L$, $Fp_C$ and $Fp_R$ may be divided into three upper, central and lower light measuring areas so that a total of 9 light measuring areas may be included in the photographing area Fp as seen in FIG. 29, or else each of the photographing areas $Fp_L$, $Fp_C$ and $Fp_R$ may be divided into light measuring areas so that a total of 27 light measuring areas may be included in the photographing area Fp as seen in FIG. 30.

Figure 17:
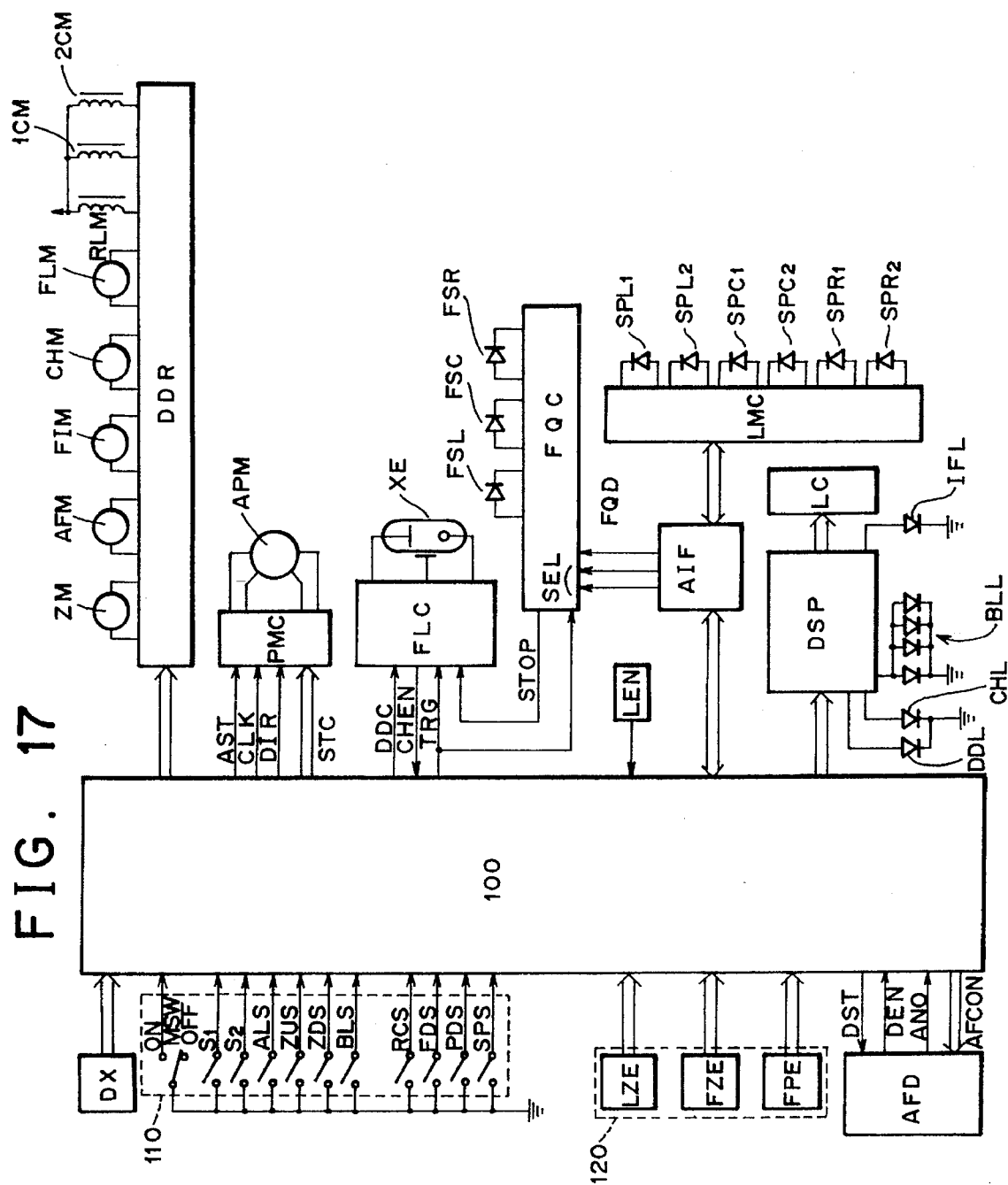
FIG. 17 is a block diagram of a control circuit of the camera of FIG. 1.

Referring now to FIG. 17, there is shown in block diagram an electric control circuit of the camera described above. The electric circuit includes a CPU (central processing unit) 100 for controlling operation of the entire camera.

The electric circuit further includes a film sensitivity reading circuit DX including pairs of contacts exposed in a magazine chamber in which a film magazine is to be accommodated. When the contacts are contacted with a DX code provided on a film magazine, the film sensitivity reading circuit DX reads information of a sensitivity, a number of frames and so forth of the film and delivers such information to the CPU 100.

The electric circuit further includes a plurality of switches 110 provided at various portions of the camera. Each of the switches 110 is grounded at an end thereof and is pulled up at the other end thereof in the CPU 100 so that an open or closed state thereof is detected by the CPU 100.

The switches 110 include a main switch MSW which is connected alternatively to an open side terminal or a closed side terminal in response to the operating member described hereinabove. A light measuring switch $S_1$ is closed upon a depressing operation of the release button 4 described hereinabove to a first or half depth. In response to closing of the light measuring switch $S_1$, a light measuring operation and an automatic focusing operation are started. A release switch $S_2$ is closed upon depressing operation of the release button 4 to a second or full depth greater than the first depth. In response to closing of the release switch $S_2$, a release operation for the exposure to light of a film F is started.

A locking switch ALS is closed upon depressing operation of the AE/AF locking button 8 described hereinabove. A zoom-up switch ZUS and a zoom-down switch ZDS are closed upon depressing operation of the zoom-up key 5 and the zoom-down key 6 described hereinabove, respectively. A backlight switch BLS is closed upon depressing operation of the backlight button 11 described hereinabove.

A rear lid switch RCS is operated in response to opening or closing motion of the rear lid of the camera such that it is open while the rear lid is in a closed condition but it is closed when the rear lid is opened. A film detecting switch FDS is open when a film F is present behind the opening frame 15 but is closed when no film F is present. A magazine detecting switch PDS is closed when a film magazine is accommodated in the magazine chamber of the camera. A frame counting switch SPS repeats on/off operations in response to rotation of a sprocket wheel when a film F is fed.

The electric circuit of the camera further includes a plurality of encoders 120 including a lens encoder LZE which delivers, in response to zooming of the photographing optical system 2, a signal representative of a focal length of the photographing optical system 2 then in a plurality of bits to the CPU 100. A flash zooming encoder FZE delivers, in response to zooming of the flash apparatus 1, a signal representative of an irradiation angle of the flash apparatus 1 in a plurality of bits to the CPU 100. A flash swinging encoder FPE delivers, in response to swinging motion of the flash apparatus 1, a signal representative of an irradiating direction of the flash apparatus 1 in a plurality of bits to the CPU 100.

The electric circuit further includes an in-focus condition detecting light receiving circuit AFD which performs accumulation, using light which has passed through the photographing optical system 2, by means of a CCD (charge coupled device) for detecting a deviation of the photographing optical system 2 from an in-focus position with respect to a subject in accordance with a known phase difference detecting method. Then, the in-focus condition detecting light receiving circuit AFD receives, from the CPU 100, various control signals AFCON in addition to a light reception starting signal DST for starting an in-focus condition detecting light receiving operation. On the other hand, the in-focus condition detecting light receiving circuit AFD delivers to the CPU 100 a light reception ending signal DEN and analog light reception signals ANO for the individual in-focus condition detecting areas $FA_L$, $FA_C$ and $FA_R$.

The electric circuit of the camera further includes a decoder driver DDR which performs, in response to a control signal from the CPU 100, driving and stopping of a zooming motor ZM for changing the focal length of the photographing optical system 2, a focusing motor AFM for focusing the photographing optical system 2, a film motor FIM for performing winding and rewinding of a film F, a charging motor CHM for charging the shutter 17 or the flash motor FLM for performing swinging and zooming of the flash apparatus 1 and also performs energization and deenergization of a release magnet RLM for starting a release operation, a first blade magnet 1CM for moving the first blade 17A of the shutter 17 or a second blade magnet 2CM for moving the second blade 17B of the shutter 17.

An aperture driving circuit PMC controls operation of a stepping motor APM for the driving of an aperture diaphragm to perform an opening or closing operation of the aperture diaphragm. The aperture driving circuit PMC receives from the CPU 100 an aperture reducing starting signal AST for starting an aperture reducing operation, a clock signal CLK for defining a driving timing of the stepping motor APM, a direction instructing signal DIR for instructing a driving direction of the stepping motor APM, and a step number signal STC for defining a number or aperture reducing steps.

A flash circuit FLC causes emission of flashlight by way of the discharge tube XE of the flash apparatus 1. The flash circuit FLC receives from the CPU 100 a boosting controlling signal DDC for starting or stopping a charging operation to the main capacitor 19 described hereinabove and a trigger signal TRG which is developed at a point of time when movement of the first blade 17A of the shutter 17 comes to an end. On the other hand, the flash circuit FLC delivers a charging completion signal CHEN to the CPU 100 at a timing when the main capacitor 19 is charged up to a preset voltage, An integrating circuit FQC is provided for adjusting flashlight. The integrating circuit FQC receives such trigger signal TRG as described above and accumulates output currents of three light adjusting light receiving elements $FS_L$, $FS_C$ and $FS_R$ which are provided for the three photographing areas $Fp_L$, $Fp_C$ and $Fp_R$ described hereinabove, respectively, and receive reflected light from a face of a film F. At a timing when the accumulation amount of the integrating circuit FQC reaches a predetermined light adjusting amount, the integrating circuit FQC delivers a light emission stopping signal STOP to the flash circuit FLC. The integrating circuit FQC receives, by way of an interface circuit AIF, a selection signal SEL representing which one of the three light adjusting light receiving elements $FS_L$, $FS_C$ and $FS_R$ described hereinabove should be used and an analog setting signal FQD for setting such light adjusting amount as described hereinabove in response to a sensitivity of a film F or a photographing condition.

A light measuring circuit LMC receives output currents from 6 light receiving elements $SPL_1$, $SPL_2$, $SPC_1$, $SPC_2$, $SPR_1$ and $SPR_2$ corresponding to the light measuring areas $PA_{SL}$, $PA_{SC}$, $PA_{SR}$, $PA_{WL}$, $PA_{WC}$ and $PA_{WR}$ described hereinabove and delivers and receives light measurement information to and from the CPU 100 by way of the interface circuit AIF.

A lens encoder LEN delivers, in response to movement of the rear lens group 2B of the photographing optical system 2 upon focusing operation, to the CPU 100 a number of pulse signals corresponding to an amount of movement of the rear lens group 2B.

A display controlling circuit DSP controls, in response to a control signal from the CPU 100, operation of a liquid crystal display circuit LC for performing displaying of the film counter and so forth of the liquid crystal display section 10 described hereinabove. The display controlling circuit DSP further controls lighting and extinction of an in-focus condition displaying LED (light emitting diode) IFL and a charging displaying LED DDL in the viewfinder and also controls lighting and extinction of a backlight LED BBL of the liquid crystal display section 10.

Subsequently, operation of the camera will be described in detail with reference to the flow charts of FIGS. 20a to 26.

Figure 20B:
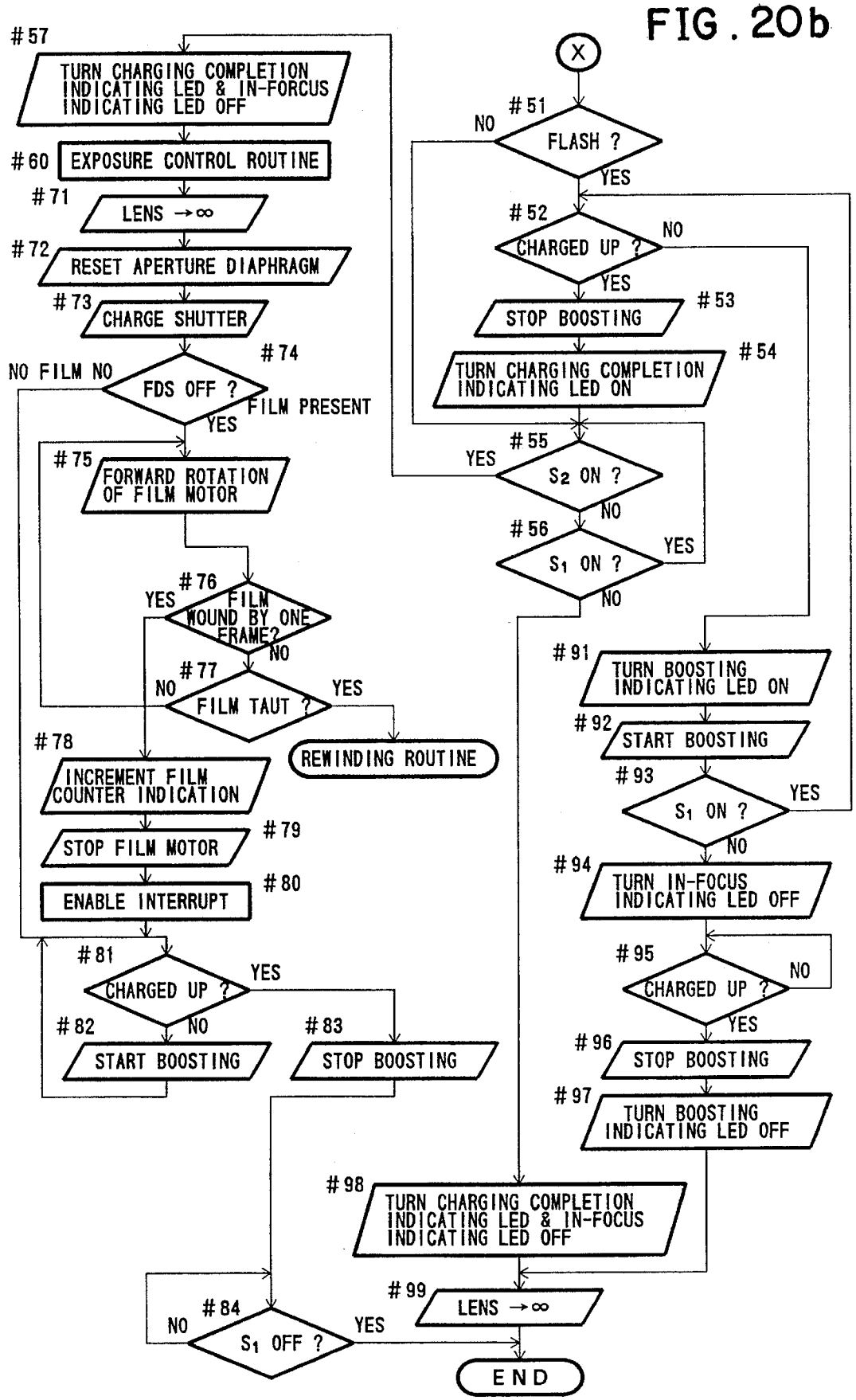

Referring first to FIGS. 20a and 20b, there is shown a main routine for controlling general operation of the camera. The present routine is started in response to any one of a closing operation of the light measuring switch $S_1$ while the main switch MSW in a closed state, a closing operation of the zoom-up switch ZDS, a closing operation of the backlight switch BLS and a closing operation or an opening operation of the rear lid switch RCS whether the main switch MSW is in an open state or a closed state.

Referring first to FIG. 20a, after starting of the main routine, a boosting operation is stopped first at step #1. The step #1 is provided to cope with any of such operations of the switches as described just above which may be performed during a boosting operation which is performed, after completion of any of several operations which will be hereinafter described one after another, in order to prepare for a next flash photographing operation.

Subsequently, it is judged at step #2 or at steps #2 and #15 whether the main routine has been started in response to a change in state of the rear lid switch RCS. In case the rear lid switch RCS is opened, that is, in case the rear lid is closed, the control sequence advances from step #2 to step #3 at which it is judged whether or not a film magazine is present in the magazine chamber of the camera. If a film magazine is present, then the film motor FIM is driven to rotate in a film winding direction at step #5, and then at step #6, a number of opening and closing operations of the frame counting switch SPS is counted until the film F is wound up by a distance corresponding to three frames. After completion of such counting, the film motor FIM is stopped at step #7, and then an indication of "1" is provided on the film counter at step #8, whereafter the control sequence advances to step #11. Such operations as described above are initial loading.

On the other hand, in case it is judged at step #3 that no film magazine is present, the control sequence advances directly to step #11 skipping the steps #5 to #8 for the initial loading described above. At step #11, it is judged whether or not the main capacitor 19 is in a charged up condition. If the main capacitor 19 is not in a charged up condition, then a boosting operation is started at step #12, and then it is waited steps #11 and 12 that the main capacitor 19 is charged up, that is, put into a fully charged condition. On the other hand, in case it is judged at step #15 that the rear lid switch RCS is closed, that is, in case the rear lid is opened, a rewinding completion warning which has been put into a displayed condition upon completion of preceding rewinding of the film F is cancelled at step #16, thereby completing execution of the program.

In case it is judged at steps #2 and #15 that the main routine has not been started in response to a change in state of the rear lid switch RCS, a state of the main switch MSW is checked subsequently at step #21. If the main switch MSW is in an open state, then execution of the program is ended, but on the contrary if the main switch MSW is in a closed state, then it is judged at step #22 whether or not rewinding of the film F has been completed. Such judgment is performed by checking a rewinding completion flag which is set upon completion of rewinding of a film. If rewinding of the film F has been completed, then execution of the program is ended.

If rewinding of the film F has not been completed at step #22, then a state of the light measurement switch $S_1$ is checked at step #25. If the main routine has been started in response to closing of the light measurement switch $S_1$, then a state of the locking switch ALS is checked at step #26. If the locking switch ALS is in a closed state, then a locking flag ALF is set to "1" at step #27, but on the contrary if the locking switch ALS is in an open state, then the locking flag ALF is reset to "0" at step #28.

After then, a subroutine for executing an automatic focusing operation, that is, an AF routine, is called at step #30, and then another subroutine for setting exposure conditions and operating conditions of the flash apparatus 1, that is, an AE routine, is called at step #40. The two subroutines will be hereinafter described in detail.

Referring now to FIG. 20b, after the control sequence returns from the AE routine, it is judged at step #51 whether or not emission of flashlight is necessary. Such judgment is performed by checking a flash flag which is set in response to a result of detection of a subject brightness in the AE routine when emission of flashlight is necessary. In case emission of flashlight is necessary, it is judged subsequently at step #52 whether or not the main capacitor 19 is in a charged up state. If the main capacitor 19 is in a charged up state, the boosting operation is stopped at step #53 and then the charging completion indicating LED CHL is lit at step #54, whereafter the control sequence advances to step #55. In case it is judged at step #51 that emission of flashlight is unnecessary, the control sequence advances directly to step #55 skipping the steps #52 to #54.

At step #55, a state of the release switch $S_2$ is checked, and if the release switch $S_2$ is in an open state, a state of the light measurement switch $S_1$ is checked subsequently at step #56. Then, if the light measurement switch $S_1$ is in a closed state, then the control sequence returns to step #55 to wait closing of the release switch $S_2$. If it is judged at step #56 that the light measurement switch $S_1$ is in an open state, then the charging completion indicating LED CHL and the in-focus condition indicating LED IFL are extinguished at step #98, and then the rear lens group 2B of the photographing optical system 2 is moved, at step #99, to a reference position at which the photographing optical system 2 is focused infinitely (such movement may be hereinafter referred to as lens resetting), thereby completing execution of the program.

On the other hand, in case it is judged at step #52 that the main capacitor 19 is not in a charged up state, the boosting indicating LED DDL is lit at step #91 and then a boosting operation is started at step #92, whereafter a state of the light measurement switch $S_1$ is checked at step #93. Then, if the light measurement switch $S_1$ is in a closed state, a loop of the steps beginning with the step #52 is repeated until charging of the main capacitor 19 is completed.

If it is judged at step #93 that the light measurement switch $S_1$ is in an open state, then the in-focus condition indicating LED IFL is extinguished at step #94, and then it is waited at step #95 that the main capacitor 19 is put into a charged up state in order to prepare for a next operation, whereafter the boosting operation is stopped at step #96 and then the boosting indicating LED DDL is extinguished at step #97. After then, lens resetting is performed at step #98, thereby stopping execution of the program.

On the other hand, in case it is judged at step #55 that the release switch $S_2$ is in a closed state, the control sequence advances to a flow for a release operation. In particular, since a viewfinder image goes out of sight as a result of upward movement of the main mirror 18 upon a release operation, both of the charging completion indicating LED CHL and the in-focus condition indicating LED IFL are extinguished first at step #57. Then, a subroutine for executing exposure of the film F to light, that is, an exposure control routine, is called at step #60. Details of the subroutine will be hereinafter described.

After actual photographing is completed in the exposure control routine, lens resetting is performed at step #71, and then the aperture diaphragm is reset to an open state #72, whereafter the shutter 17 is charged at step #73, and then presence or absence of a film F is judged at step #74. In case a film F is present, the film motor FIM is subsequently driven in its film winding direction at step #75. Then, while opening and closing operations of the frame counting switch SPS are counted at step #76 until winding of the film F by one frame distance is completed, it is checked at step #77 whether or not a taut condition of the film takes place. Detection of such taut condition can be performed by detection of an increase in load to the film motor FIM or in torque to the sprocket wheel or by detection of lapse of a preset interval of time after starting of a winding operation.

In case no taut condition is judged at step #77, the control sequence returns to step #75 to continue the winding operation of the film F. If a taut condition of the film F is detected at step #77, then the control sequence advances to a rewinding routine of FIG. 21 to perform rewinding of the film F. When it is detected at step #76 that the film F has been wound by one frame distance, the indication of the film counter is incremented by one at step #78, and then the film motor FIM is stopped at step #79. Then, timer interrupt is enabled at step #80, whereafter the control sequence advances to step #81.

On the other hand, in case it is judged at step #74 that no film is present, since this is the case wherein a photographing operation is tried without loading a film into the camera, the control sequence advances directly to step #81 skipping the steps #75 to #80 for winding of a film described above.

At step #81, it is detected whether or not the main capacitor 19 is in a charged up state. If the main capacitor 19 is not in a charged up state, then a boosting operation is started at step #82 in order to prepare for a next operation, and then the control sequence returns to step #81 to wait that charging of the main capacitor 19 is completed. If it is judged at step #81 that the main capacitor 19 is in a charged up state, then the boosting operation is stopped at step #83, and then it is waited at step #84 that the light measurement switch $S_1$ is opened, thereby completing execution of the program.

Figure 21:
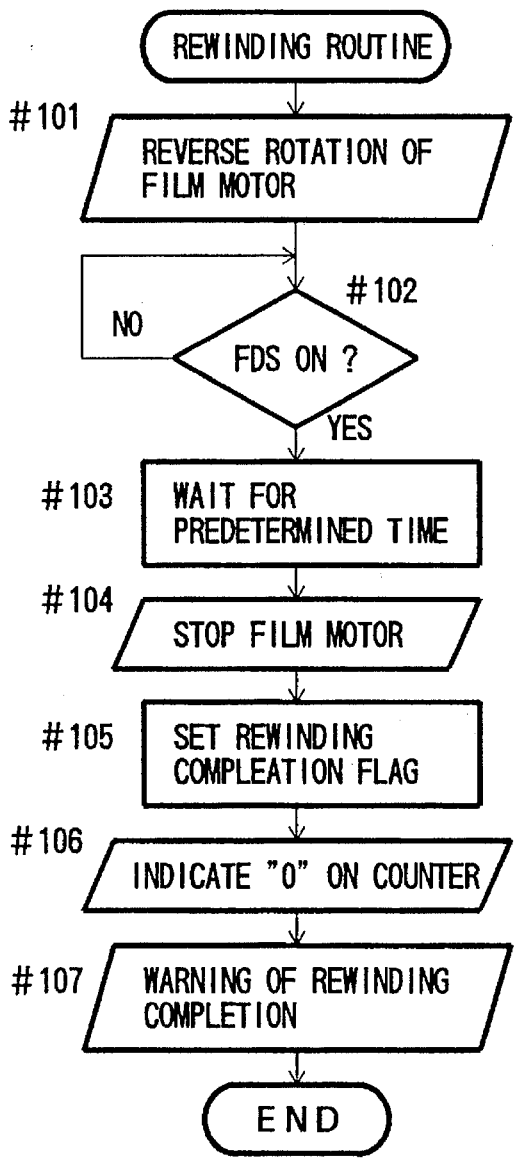

In the rewinding routine shown in FIG. 21 to which the control sequence advances when a taut state of the film F is detected at step #77, the film motor FIM is first driven in its rewinding direction at step #101, and then it is waited at step #102 that the film detecting switch FDS is closed, that is, the film F is disengaged from the rear portion of the opening frame 15. After the film detecting switch FDS is closed, it is waited, at step #103, for a fixed interval of time necessary for an end portion of the film F to be rewound into the film magazine, and then the film motor FIM is stopped at step #104.

After then, the rewinding completion flag is set at step #105 and then the indication of the film counter is changed to "0" at step #106. After then, it is displayed at step #107 that rewinding of the film F is completed, thereby completing execution of the program. It is to be noted that the indication of completion of rewinding described above can be achieved by causing the film counter, which has, for example, the indication of "0", to blink. Naturally, such indication may be effected in a different form, for example, by lighting a different LED.

Referring back to FIG. 20a, in case it is judged at step #25 of the main routine that the main routine has not been started in response to closing of the light measuring switch S₁, it is subsequently judged at step #111 or at steps #111 and #121 whether or not the main routine has been started in response to closing of either of the zoom switches ZUS and ZDS.

Then, if it is judged at step #111 that the main routine has been started in response to closing of the zoom-up switch ZUS, then it is judged at step #112 whether or not the photographing optical system 2 is at its telephoto side end, that is, at a greatest focal length presenting position thereof. If the photographing optical system 2 is at the telephoto side end, since it cannot effect zooming to the telephoto side any more, the control sequence advances to step #115 without executing anything. On the other hand, in case it is judged at step #112 that the photographing optical system 2 is not at the telephoto side end, the zooming motor ZM is driven in a direction toward the telephoto side end at step #113. Such driving of the zooming motor ZM is continued until the zoom-up switch ZUS is released or the photographing optical system 2 reaches the telephoto side end. If opening of the zoom-up switch ZUS, that is, cancellation of the depressing operation of the zoom-up button 5, is detected, then the control sequence advances to step #115 at which the zooming motor ZM is stopped, thereby completing execution of the program.

On the other hand, if it is judged at step #121 that the main routine has been started in response to closing of the zoom-down switch ZDS, then it is judged at step #122 whether or not the photographing optical system 2 is at a wide side end, that is, at its smallest focal length presenting position. If the photographing optical system 2 is at the wide side end, then since it cannot effect zooming to the wide side end any more, the control sequence advances to step #115 without doing anything. On the other hand, if it is judged at step #122 that the photographing optical system 2 is not at the wide side end, then the zooming motor ZM is driven in a direction toward the wide side end at step #123. Such driving of the zooming motor ZM is continued until the zoom-down switch ZDS is opened or the photographing optical system 2 reaches the wide side end. If opening of the zoom-down switch ZDS, that is, cancellation of the depressing operation of the zoom-down button 6, is detected at step #124, then the control sequence advances to step #115 at which the zooming motor ZM is stopped, thereby completing execution of the program.

On the other hand, in case it is judged at steps #111 and #112 that the main routine has been started but not in response to closing of either of the zoom switches ZUS and ZDS, it is determined that the backlight switch BLS has been closed, and the backlight LED BLL is lit first at step #131, and then it is waited at step #132 that the backlight switch BLS is opened. If opening of the backlight switch BLS is detected, then a timer for keeping the backlight element in a lit condition for several seconds is started at step #133, thereby ending execution of the program.

Figure 22:
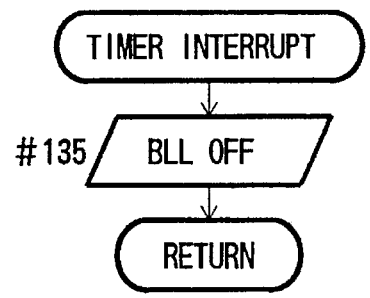

When the timer counts up, a timer interruption takes place. When such interruption takes place, the backlight LED BLL is extinguished at step #135 as seen in FIG. 22, whereafter the control sequence returns to an original routine from which the control sequence has entered the routine of FIG. 22.

Figure 23:
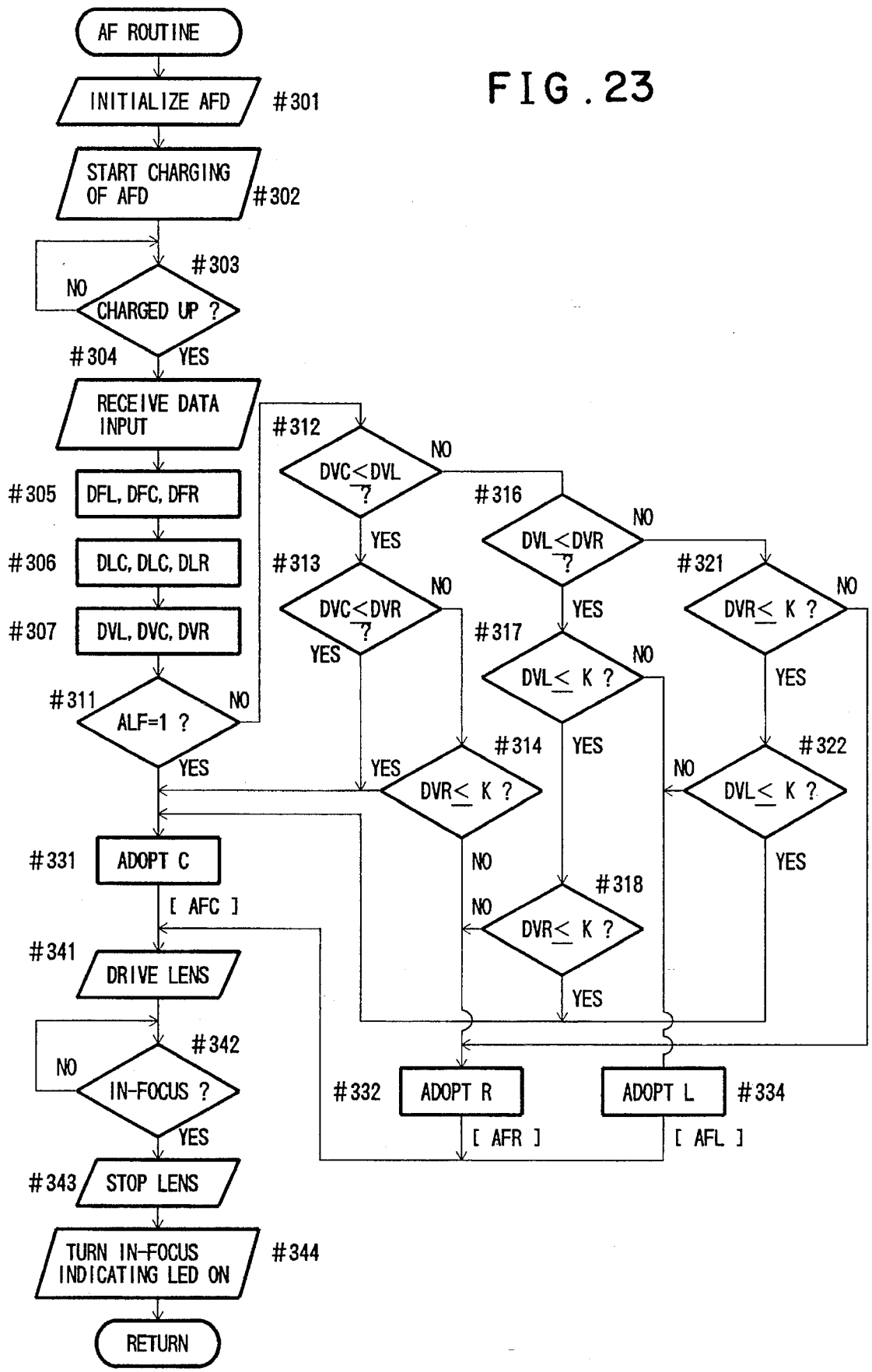

Referring now to FIG. 23, the AF routine which is called at step #30 of the main routine described above is shown in more detail. After the routine is called, the in-focus condition detecting light receiving circuit AFD is initialized first at step #301 to discharge an accumulated charge of the CCD for the detection of an in-focus condition. Then, accumulation for the in-focus condition detection of the in-focus condition detecting light receiving circuit AFD is started at step #302, and then completion of such accumulation is waited at step #303. After completion of such accumulation, light reception signals for the individual in-focus condition detecting areas $FA_L$, $FA_C$ and $FA_R$ are received from the in-focus condition detecting light receiving circuit AFD at step #304.

Subsequently, defocus amounts $DF_L$, $DF_C$ and $DF_R$ from the in-focus positions for the individual in-focus condition detecting areas $FA_L$, $FA_C$ and $FA_R$ are determined from the thus received light reception signals at step #305. Then at step #306, the defocus amounts $DF_L$, $DF_C$ and $DF_R$ are converted into lens driving amounts $DL_L$, $DL_C$ and $DL_R$ for the individual in-focus condition detecting areas $FA_L$, $FA_C$ and $FA_R$ in accordance with current focal length information of the photographing optical system 2 based on a signal from the lens zoom encoder LZE. Further at step #307, subject distance values $D_{UL}$, $D_{UC}$ and $D_{UR}$ which represent distances to subjects included in the in-focus condition detecting areas $FA_L$, $FA_C$ and $FA_R$ in accordance with the APEX system are determined for the individual in-focus condition detecting areas $FA_L$, $FA_C$ and $FA_R$ from information of a current position of the photographing optical system 2 and the lens driving amounts $DL_L$, $DL_C$ and $DL_R$ determined at preceding step #306.

Subsequently, a main subject as an object for focusing is determined at steps #311 to #334 using the thus determined subject distance values $D_{UL}$, $D_{UC}$ and $D_{UR}$. In such determination of a subject, normally one of subjects which is nearest to the camera is determined as a main subject. However, if a subject included in the left or right in-focus condition detecting area $FA_L$ or $FA_R$ is positioned within a predetermined distance (for example, 1 m) from the camera, such subject is not determined as a main subject. This is intended to eliminate such possibility that, because the photographing area Fp of the camera has a horizontally elongated contour as described hereinabove and accordingly it is so difficult for a photographer to sufficiently confirm a subject at a horizontal end of the photographing area Fp that the photographer may not be aware of a body other than an aimed subject when such body is present very near to the camera, the camera may be focused upon any other body than the aimed subject.

In such determination of a main subject, the locking flag ALF is first checked at step #311. If the locking flag ALF is in a set state, that is, equal to "1", it is determined that a subject included in the central in-focus condition detecting area $FA_C$ is aimed at, and the control sequence advances to step #331 at which the central lens driving amount $DL_C$ is determined as a focusing control driving amount DL (which will be hereinafter referred to as center selection AFC). In case the locking flag ALF is not in a set state equal to "1", the subject distance values $D_{UL}$, $D_{UC}$ and $D_{UR}$ of the in-focus condition detecting areas $FA_L$, $FA_C$ and $FA_R$ are successively compared with each other at steps #312, #313 and #316.

In case the central subject distance value $D_{UC}$ is the smallest among them, that is, in case the central subject is the nearest to the camera (steps #312 and #313), the central subject should be selected as a main subject, that is, as center selection AFC, and the control sequence advances to step #331 at which the central lens driving amount $DL_C$ is determined as a focusing control driving amount DL.

In case the central subject distance value $D_{UC}$ is equal to or lower than the left subject distance value $D_{UL}$ (step #312) but the right subject distance value $D_{UR}$ is lower than the central subject distance value $D_{UC}$ (step #313), that is, in case the right subject is the nearest to the camera, the right subject distance value $D_{UR}$ is compared at step #314 with a limit distance value K corresponding to the predetermined distance (for example, 1 m) mentioned hereinabove. If the right subject distance value $D_{UR}$ is equal to or lower than the limit distance value K, then since the right subject is positioned nearer to the camera than the predetermined distance, the right subject is not determined as a main subject, but the center selection AFC should be made. Accordingly, the control sequence advances to step #331 at which the central lens driving amount $DL_C$ is determined as a focusing control driving amount DL. On the contrary if the right subject distance value $D_{UR}$ is higher than the limit distance value K, then since the right subject is the nearest to the camera but is spaced by a distance greater than the predetermined distance, the right subject should be selected as a main subject (hereinafter referred to as right selection AFR) and the control sequence advances to step #332 at which the right lens driving amount $DL_R$ is determined as a focusing control driving amount DL.

On the other hand, in case the left subject distance value $D_{UL}$ is lower than the central subject distance value $D_{UC}$ (step #312) and besides is equal to or lower than the right subject distance value $D_{UR}$ (step #316), that is, in case the left subject is the nearest to the camera, the left subject distance value $D_{UL}$ is subsequently compared with the limit distance value K at step #317. If the left subject distance value $D_{UL}$ is equal to or lower than the limit distance value K, then since the left subject is positioned nearer to the camera than the predetermined distance, the right subject distance value $D_{UR}$ is compared with the limit distance value K subsequently at step #318. If the right subject distance value $D_{UR}$ is equal to or lower than the limit distance value K, since also the right subject is positioned nearer to the camera than the predetermined distance, neither of the left and right subjects is determined as a main subject and central selection AFC should be made, and consequently, the control sequence advances to step #331 at which the central lens driving amount $DL_C$ is determined as a control driving amount DL. On the contrary if the right subject distance value $D_{UR}$ is higher than the limit distance value K at step #318, right selection AFR should be made and consequently the control sequence advances to step #332 at which the right lens driving amount $DL_R$ is determined as a control driving amount DL. On the other hand, if the left subject distance value $D_{UL}$ is higher than the limit distance value K at step #317, the left subject should be determined as a main subject (hereinafter referred to as left selection AFL) and consequently the control sequence advances to step #334 at which the left lens driving amount $DL_L$ is determined as a control driving amount DL.

Finally, in case the left subject distance value $D_{UL}$ is lower than the central subject distance value $D_{UC}$ (step #312) but the right subject distance value $D_{UR}$ is lower than the left subject distance value $D_{UL}$ (step #316), that is, in case the right subject is the nearest to the camera, the right subject distance value $D_{UR}$ is compared with the limit distance value K subsequently at step #321. If the right subject distance value $D_{UR}$ is equal to or lower than the limit distance value K, then since the right subject is positioned nearer to the camera than the predetermined distance, the left subject distance value $D_{UL}$ is compared with the limit distance value K subsequently at step #322. If the left subject distance value $D_{UL}$ is equal to or lower than the limit distance value K, then since the left subject is positioned nearer to the camera than the predetermined distance, neither of the left and right subjects should be determined as a main subject and central selection AFC should be made, and consequently, the control sequence advances to step #331 at which the central lens driving amount $DL_C$ is determined as a control driving amount DL. On the contrary if the left subject distance value $D_{UL}$ is higher than the limit distance value K at step #322, left selection AFL should be made and the control sequence advances to step #334 at which the left lens driving amount $DL_L$ is determined as a control driving amount DL. On the other hand, in case the right subject distance value $D_{UR}$ is higher than the limit distance value K at step #321, right selection AFR should be made and the control sequence advances to step #332 at which the right lens driving amount $DL_R$ is determined as a control driving amount DL.

After a control driving amount DL is determined at any of the steps #331, #332 and #334, the focusing motor AFM is driven at step #341 using such control driving amount DL to move the rear lens group 2B of the photographing optical system 2, and it is waited at step #342 that an in-focus condition of the photographing optical system 2 is reached. Here, an "in-focus" condition is determined by judging whether or not lens driving by the control driving amount has been completed, or else, another focusing operation may be performed to confirm whether or not an in-focus condition is reached actually. Then, after an in-focus condition is determined, the focusing motor AFM is stopped at step #343, and then the in-focus condition indicating LED IFL is extinguished at step #344, whereafter the control sequence returns to the original routine in which the present AF routine has been called.

Referring now to FIGS. 24a, 24b, 25a and 25b, the AE routine which is called at step #40 of the main routine is shown. In the present routine, a control aperture value Av and a control shutter speed value Tv for the exposure control are determined, and also light emitting conditions of the flash apparatus 1 is set. Thus, prior to proceeding description of the AE routine, such light emitting conditions are listed collectively in Table 2 below.

TABLE 2

| Focal Length (mm) | Light Distribution Characteristics (mm) | | | Limit to Hand Shaking |
|---|---|---|---|---|
| [f] | f3/3 | f2/3 | f1/3 | (second) |
| I    24–30   | 24  | 35  | 70  | 1/30 |
| II   31–35   | 35  | 50  | 105 | 1/45 |
| III  46–65   | 50  | 70  | 105 | 1/60 |
| IV   66–90   | 70  | 105 | —   | 1/80 |
| V    90–105  | 105 | —   | —   | 1/100 |

While the conditions listed in Table 2 above vary the irradiating angle of the flash apparatus 1 in response to the focal length f of the photographing optical system 2, since the light distribution characteristic of the flash apparatus 1 is changed to three steps, values of the irradiation angle to be set are given for the individual light distribution characteristics. The camera is constructed such that the value of the focal length f is divided into five regions of I to V and it is judged to which one of the regions the current focal length f belongs. Thus, in the following description, the marks I to V indicated in Table 2 above are used. Further, in the light distribution characteristics, the light distribution of f3/3 denotes that a range corresponding to the entire photographing area Fp is determined as an irradiation range; the light distribution of f2/3 denotes that a range corresponding to two photographing areas is determined as an irradiation range; and the light distribution of f1/3 denotes that a range corresponding to only one photographing area is determined as an irradiation range.

From Table 2 given above, it can be seen that, for example, in the light distribution of f3/3 wherein the entire area of the photographing area Fp is determined as an irradiation range, the irradiating angle of the flash apparatus 1 is reduced so that it may correspond to a gradually increasing focal length as the focal length f of the photographing optical system 2 increases, but as for a change in light distribution characteristic, for example, in case the photographing optical system 2 is in the focal length region II, when the light distribution characteristic is f3/3, then the irradiating angle corresponds to the focal length of 35 mm, but as the light distribution characteristic changes to f2/3 and then to f1/3 so that the irradiation range may be decreased, the irradiation angle of the flash apparatus 1 is reduced so that it may correspond to the focal length of 50 mm and then of 105 mm. It is to be noted that the mark "—" indicates that no irradiation of flashlight of a reduced irradiation angle takes place in the focal length region to which the mark is applied. Further, a shutter speed corresponding to a limit hand shaking shutter speed value Tvf at which hand shaking takes place is indicated for each of the focal length regions.

After the AE routine shown in FIGS. 24a, 24b, 25a and 25b is called, light measurement data of the six light measuring areas $PA_{SL}$, $PA_{SC}$, $PA_{SR}$, $PA_{WL}$, $PA_{WC}$ and $PA_{WR}$ are first read at step #401 from the light measuring circuit LMC by way of the interface circuit AIF. Then at step #402, error correction with open light measurement are executed for such light measurement data to obtain brightness values $Bv_{L1}$, $Bv_{C1}$, $Bv_{R1}$, $Bv_{L2}$, $Bv_{C2}$ and $Bv_{R2}$ for the individual areas.

Subsequently, the locking flag ALF is checked at step #403. If the locking flag is in a set state equal to "1", then an exposure value Ev is determined at step #411 using the central spot brightness value $Bv_{C1}$. Then, using a shutter speed value which is obtained by subtraction of an open aperture value $Av_0$ from the thus determined exposure value Ev, it is judged at step #412 whether or not there is the possibility that hand shaking may take place. If there is no possibility that hand shaking may take place, a control shutter speed value Tv and a control aperture value Av are determined at step #417 by natural light calculation in accordance with an ordinary program, whereafter the control sequence returns to the original routine.

On the other hand, if it is judged at step #412 that there is the possibility that hand shaking may take place, then light emission conditions are set at step #413 and #414 in order to subsequently effect emission of flashlight. In this instance, since the camera may be swung leftwardly or rightwardly because it is in an AE/AF locked condition, no limit is applied to the light distribution and the light distribution characteristic is set to f3/3 at step #413 and then the irradiating direction is set to C at the center at step #414. After then, the hand shaking shutter speed value Tvf is determined as a control shutter speed value Tv at step #415, and then the open aperture value $Av_0$ is adopted as a control aperture value Av at step #416, whereafter the control sequence advances to step #491 shown in FIG. 24b at which the film sensitivity value Sv is set as it is as light adjusting data without correcting the same. After then, the locking flag ALF is checked at step #492. In this instance, since the locking flag ALF is in a set state equal to "1", the central photographing area $Fp_C$ is selected at step #493 as a light receiving area for the light adjustment (hereinafter referred to as central light adjustment selection BrC), and then the flash flag is set at step #494, whereafter the control sequence returns to the original routine.

Referring back to FIG. 24a, in case it is judged at step #403 that the locking flag is not in a set state equal to "1", it is judged subsequently at step #421 whether or not left selection AFL is made.

In the case of left selection AFL, it is judged subsequently at steps #422 and #423 whether or not the left photographing area $Fp_L$ is in a backlighted condition. In particular, the left spot brightness value $Bv_{L1}$ is subtracted from the left peripheral brightness value $Bv_{L2}$ at step #422, and then it is judged at step #423 whether or not a brightness difference value a thus obtained is higher than a fixed value (for example, "3") $\alpha\theta$ for the judgment of a backlighted condition.

If it is judged that the brightness difference value a is equal to or lower than the fixed value $\alpha\theta$ and accordingly the left photographing area $Fp_L$ is not in a backlighted condition, then all of the brightness values are averaged, at step #424, with stress laid to the left spot brightness value $Bv_{L1}$ to determine a control brightness value Bv. While such calculation is not described in detail because it is well known in the art, an average calculation is performed, for example, setting the weighting coefficient for the left spot brightness value $Bv_{L1}$ to "2" and setting the weighting coefficient for the other brightness values to "1". Subsequently, a control exposure value Ev is determined using the thus obtained control brightness value Bv at step #425. Then, it is judged at step #426 whether or not there is the possibility that hand shaking may take place, similarly as at step #412 described hereinabove. If there is no possibility off hand shaking, a natural light calculation is performed at step #417 and then the control sequence returns to the original routine, but if there is the possibility of hand shaking, the control sequence advances to step #431.

On the other hand, if it is judged at step #423 that the brightness difference value $\alpha$ is higher than the fixed value $\alpha\theta$ and accordingly the the left photographing area $Fp_L$ is in a backlighted condition, then all of the brightness values except the left spot brightness value $Bv_{L1}$ are averaged to determine a control brightness value Bv at step #427. Subsequently, a control exposure value Ev is determined at step #428 using the thus determined control brightness value By, and then the possibility or no possibility of hand shaking is judged at step #429. Then, if it is judged that there is no possibility of hand shaking, the control sequence advances similarly to step #431.

In a flow beginning with step #431, since left selection AFL is made, setting for controlling light emitting conditions of the flash apparatus 1 is performed so that, when the right photographing area $Fp_R$ includes some body positioned excessively near to the camera, over exposure may not take place with the body.

First, the right subject distance value $D_{UR}$ is compared at step #431 with a proximate distance value K' corresponding to a distance (for example, 1.2 m) from the camera at which there is the possibility that over exposure may take place with a body. It is to be noted that the proximate distance value K' may be equal to or different from the limit distance value K described hereinabove. In case the right subject distance value $D_{UR}$ is equal to or lower than the proximate distance value K', that is, in case there is the possibility that over exposure may take place with the subject in the right photographing area $Fp_R$, the focal length f of the photographing optical system 2 is checked at step #432 or steps #432 and #441.

If the photographing optical system 2 is in the focal length region V, then since the light distribution characteristic cannot be changed as seen from Table 1 above, the light distribution is set to f3/3 at step #433, and then the irradiating direction is set to $L_1$ at step #434 in order to displace the irradiating direction leftwardly a little from the center to decrease an amount of flashlight to the right subject, whereafter the control sequence advances to step #415.

On the other hand, if the photographing optical system 2 is in the focal length region IV (steps #432 and #441), the light distribution is set to f2/3 at step #442 to reduce the irradiation area and then the irradiating direction is set to $L_1$ at step #434 to displace the irradiating direction leftwardly a little, whereafter the control sequence advances to step #415.

In case it is judged at steps #432 and #441 that the photographing optical system 2 is in one of the focal length regions I to III, a control aperture value Av is determined at step #443 by an APEX calculation for the flash using the left subject distance value $D_{UL}$ and an illuminance value Iv' of flashlight when the light distribution characteristic is set to f2/3. Then, the thus determined control aperture value Av is compared with the open aperture value $Av_0$ at step #444.

If the control aperture value Av is lower than the open aperture value $Av_0$, then since the light distribution characteristic of f2/3 will not allow a sufficient amount of light to be provided to the left subject, an APEX calculation for the flash is performed at step #445 to determine a control aperture value Av using the central subject distance value $D_{UC}$ and an illuminance value Iv' of flashlight when the light distribution characteristic is set to f2/3. Then, a value obtained by addition of a predetermined value (for example, "3") k to the thus determined control aperture value Av is compared with the open aperture value $Av_0$ at step #446.

Such comparison at step #446 is performed in order to determine whether or not flashlight in the light distribution characteristic of f2/3 contributes to the central subject. If flashlight presents no predetermined contribution, then the irradiation angle is further reduced because it has been judged at step #444 that the light distribution characteristic of f2/3 will not allow a sufficient amount of light to be provided to the left subject. The criterion then is that the control aperture value Av determined at step #445 is smaller by more than a fixed value (for example, 3EV in the case described hereinabove) than the open aperture value $Av_0$. In particular, when the illuminance of flashlight in the light distribution characteristic of f2/3 is so low with respect to the distance to the central subject that the aperture must be opened by an amount at least equal to a predetermined number of steps (for example, 3 steps in the case described hereinabove) from the open aperture in order to assure appropriate exposure for the central subject, it is determined that there is no predetermined contribution of flashlight to the central subject.

If it is judged at step #446 that flashlight in the light distribution characteristic of f2/3 contributes to the central subject, then the control sequence advances to step #442, but on the contrary if no contribution is judged, then the light distribution characteristic is changed to f1/3 at step #447, and then the illuminating direction is set to $L_2$ for the leftmost direction at step #448, whereafter the control sequence advances to step #415.

On the other hand, in case it is judged at step #431 that the right subject distance value $D_{UR}$ is higher than the proximate distance value K', that is, the right photographing area $Fp_R$ does not include a body which will cause over exposure, it is judged subsequently at step #451 whether or not the photographing optical system 2 is in the focal length region V.

If the photographing optical system 2 is in the focal length region V, then since the irradiation angle cannot be reduced, the light distribution characteristic is set to f3/3 at step #456, and then the irradiating direction is set to C at the center at step #457, whereafter the control sequence advances to step #415. On the other hand, if the photographing optical system 2 is not in the focal length region V, then a control exposure value Av is determined at step #452 by an APEX calculation for the flash using the left subject distance value $D_{UL}$ and an illuminance value Iv of flashlight in the light distribution characteristic of f3/3. Then, the thus determined control aperture value Av is compared with the open aperture value $Av_0$.

If the control aperture value Av is equal to or higher than the open aperture value $Av_0$, then since a sufficient amount of light can be provided to the left subject in the light distribution characteristic of f3/3, the control sequence advances to step #456. On the contrary if the control aperture value Av is lower than the open aperture value $Av_0$, then since a sufficient amount of light cannot be provided to the left subject in the light distribution characteristic of f3/3, a control aperture value Av is determined at step #454 by an APEX calculation for flashlight using the right subject distance value $D_{UR}$ and an illumination value Iv of flashlight in the light distribution characteristic of f3/3, and then at step #455, using the thus determined control aperture value Av, it is judged whether or not flashlight in the light distribution characteristic of f3/3 contributes to the right subject, similarly as at step #448 described above.

If it is judged that flashlight in the light distribution characteristic of f3/3 contributes to the right subject, the control sequence advances to step #458, but on the contrary if no contribution is judged, then the control sequence advances to the flow beginning with step #441 in which similar operation to that described above is executed in order to effect judgment for further decrease of the irradiation angle.

Now, after the control sequence advances to step #415 from step #434, #448 or #457, a control shutter speed value Tv and a control aperture value Av are set at steps #415 and #416, respectively, as described hereinabove, and then the control sequence advances to the flow beginning with step #491 shown in FIG. 24b to set light adjustment data. However, since the locking flag ALF has not been set to "1" in the flow described above, the control sequence now advances, depending upon judgment at subsequent step #492, to step #472 at which the left photographing area $Fp_L$ is selected as a light adjusting light receiving area (hereinafter referred to as left light adjustment selection BFL). After then, the flash flag is set at step #473, whereafter the control sequence returns to the original routine.

Figure 24A:
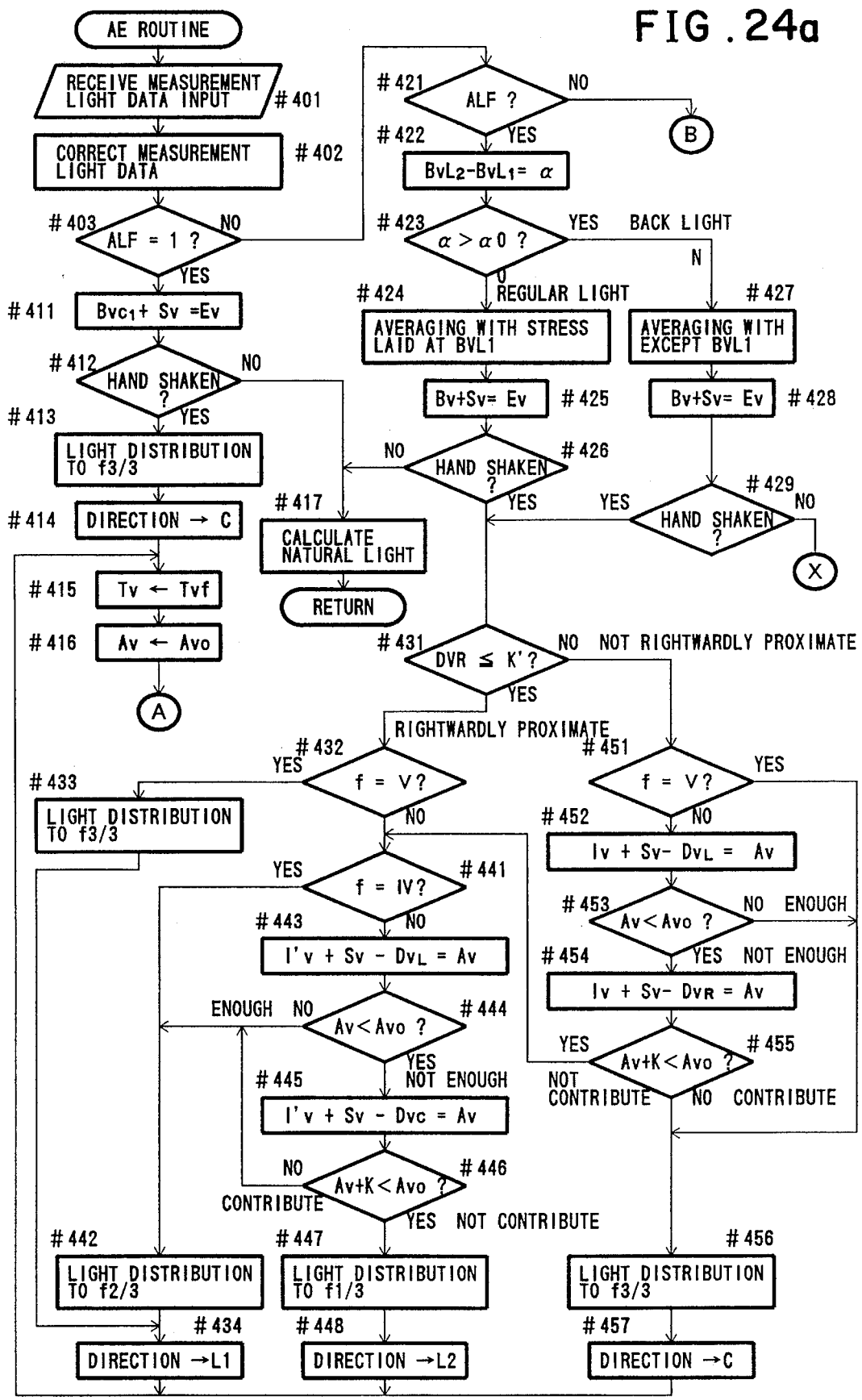

Referring back to step #429 of FIG. 24a, if it is judged at step #429 that there is no possibility of hand shaking, then this means that the left photographing area $Fp_L$ is in a bright backlighted condition. In this instance, the control sequence advances to a backlight routine beginning with step #461 shown in FIG. 24b.

In the backlight routine for coping with such bright backlighted condition, flashlight is emitted basically in the light distribution characteristic of f1/3, but when such light distribution characteristic cannot be selected or flashlight does not contribute to a main subject, exposure control is executed in accordance with spot light measurement and no flashlight is emitted.

Figure 24B:
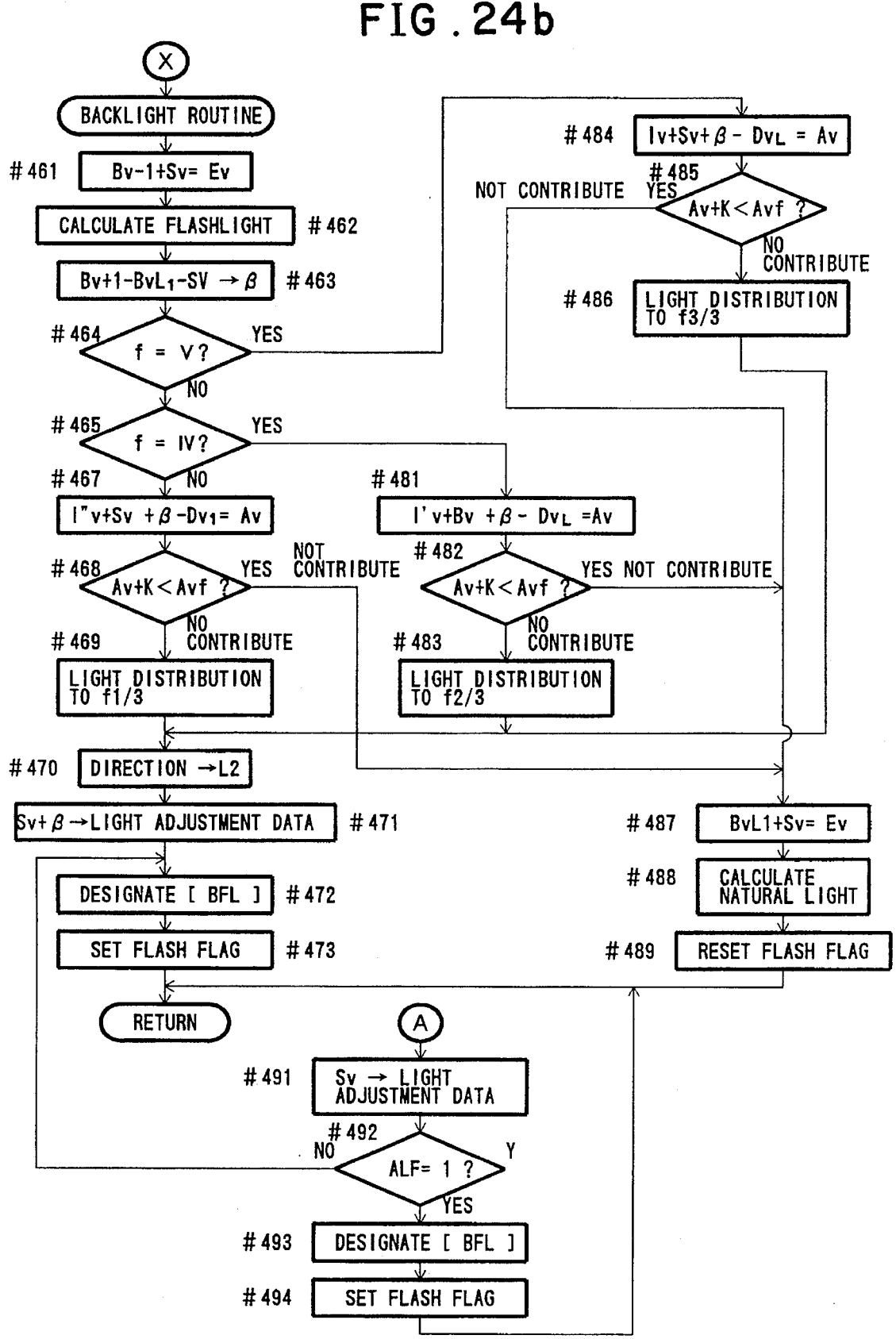

Referring to FIG. 24b, after the backlight routine is entered, a control exposure value Ev at which the peripheral area presents over exposure by 1EV is determined using the control brightness value Bv determined at step #427. Then, using the thus determined control exposure value Ev, a control shutter speed Tv and a control aperture value Av are determined at step #462 by an APEX calculation for the flash. Subsequently, since peripheral light is received, because such peripheral light is intense, by the light adjustment light receiving element in addition to reflected light from the left subject as the main subject when flashlight is irradiated upon the main subject, a correction amount β with which a light adjustment amount to be compared in a light adjusting operation is to be corrected to eliminate a possible influence of such peripheral light is determined at step #463 using the left spot brightness value $Bv_{L1}$.

Subsequently, the focal length f of the photographing optical system 2 is checked at step #464 or steps #464 and #465. If the photographing optical system 2 is in the focal length region V, then a control aperture value Av is determined at step #484 by an APEX calculation for the flash using the correction amount β, the left subject distance value $D_{UL}$ and the illuminance value Iv of flashlight in the light distribution characteristic of f3/3. Then, using the thus determined control aperture value Av and the flash control aperture value Avf determined at step #462, it is judged at step #485 whether or not flashlight in the light distribution characteristic of f3/3 contributes to the left subject.

If it is judged that flashlight in the light distribution characteristic of f3/3 does not contribute to the left subject, then since it is useless to emit flashlight, a control exposure value Ev is determined at step #487 using the left spot brightness value $Bv_{L1}$. Subsequently, a control shutter speed Tv and a control aperture value Av are determined at step #488 using the thus determined control exposure value Ev, and then the flash flag is reset at step #489, whereafter the control sequence returns to the original routine.

If it is judged at step #485 that flashlight in the light distribution characteristic of f3/3 contributes to the left subject, then since the photographing optical system 2 is in the focal length region V and accordingly the irradiation angle of flashlight cannot be reduced, the light distribution characteristic is set to f3/3 at step #486, and then the irradiating direction is set, at stet #470, to $L_2$ for the leftmost direction in order for the left subject to be supplied with sufficient light. Then, a value obtained by addition of the correction amount β to the film sensitivity value Sv is set as light adjustment data at step #471, and then the left photographing area $Fp_L$ is selected as a light adjusting light receiving area at step #472. After then, the flash flag is set at step #473, whereafter the control sequence returns to the original routine.

On the other hand, if it is judged at step #465 that the photographing optical system 2 is in the focal length region IV, then a control aperture value Av is determined at step #481 by an APEX calculation for the flash using the correction amount β, the left subject distance value $D_{UL}$ and the illuminance value Iv' of flashlight in the light distribution characteristic of f2/3. Then, using the thus determined control aperture value Av and the flash control aperture value Avf determined at step #462, it is judged at step #482 whether or not flashlight in the light distribution characteristic of f2/3 contributes to the left subject.

If it is judged that flashlight in the light distribution characteristic of f2/3 does not contribute to the left subject, then since it is useless to emit flashlight, the control sequence advances to step #487 in order to stop emission of flashlight similarly as in the case described above. On the contrary if it is judged that flashlight in the light distribution characteristic of f2/3 contributes to the left subject, then since the photographing optical system 2 is in the focal length region IV and the irradiation angle of flashlight can be reduced to that in the light distribution characteristic of f2/3, the light distribution characteristic is changed to f2/3 at step #483, whereafter the control sequence advances to step #470.

Finally, if it is judged at steps #464 and #465 that the photographing optical system 2 is in one of the focal length regions I to III, then a control aperture value Av is determined at step #467 by an APEX calculation for the flash using the correction amount β, the left subject distance value $D_{UL}$ and an illuminance value Iv" of flashlight in the light distribution characteristic of f1/3. Then, using the thus determined control aperture value Av and the flash control aperture value Avf determined at step #462, it is judged at step #468 whether of not flashlight in the light distribution characteristic of f1/3 contributes to the left subject.

If it is judged that flashlight in the light distribution characteristic of f1/3 does not contribute to the left subject, then since it is useless to emit flashlight, the control sequence advances to step #487 in order to stop emission of flashlight similarly as in the case described above, but on the contrary if it is judged that flashlight in the light distribution characteristic of f1/3 contributes to the left subject. then since the photographing optical system 2 is in one of the focal length regions I to III and the irradiation angle of flashlight can be reduced to that in the light distribution characteristic of f1/3, the light distribution characteristic is set to f1/3 at step #469, whereafter the control sequence advances to step #470.

Figure 25A:
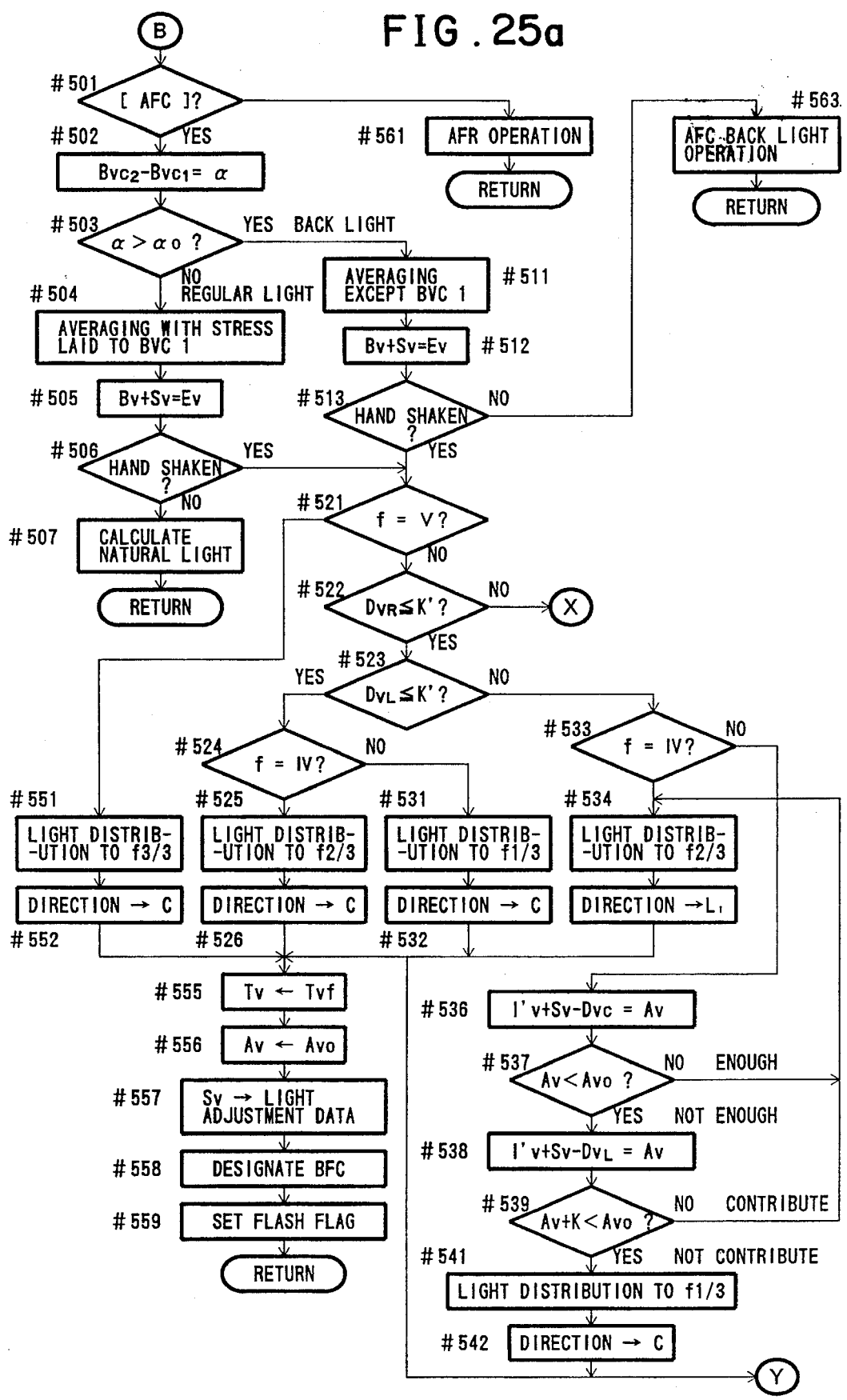

Referring back to step #421 of FIG. 24a, if it is judged at step #421 that left selection AFL is not made, the control sequence advances into the flow of FIG. 25a beginning with step #501. Referring to FIG. 25a, at step #501, it is judged whether or not center selection AFC is made. In case the judgment is not center selection AFC, right selection AFR should be made, and consequently, a subroutine for executing setting for exposure control and flash control for the right selection AFR, that is, an AFR operation routine, is called at step #561, whereafter the control sequence returns to the original routine. The AFR operation routine includes a substantially same flow of operations as in the flow of operations for the left selection AFL beginning with step #422 described hereinabove except that a subject as an object for operation is changed from the left to the right. Thus, description of the AFR operation routine is omitted herein to avoid redundancy.

On the contrary, if the center selection AFC is judged at step #501, then backlight judgment is executed for the central subject as an object at steps #502 and #503 and then a control exposure value Ev is determined in accordance with a result of such judgment and the possibility of hand shaking is checked at steps #504 to #506 and #511 to #513 similarly as at steps #422 to #429 and #427 for the left selection AFL described hereinabove. If the central subject is in a regularly lighted condition and there is no possibility of hand shaking, a natural light calculation is executed at step #507, whereafter the control sequence returns to the original routine.

On the contrary, if the central subject is in a backlighted condition and there is no possibility of hand shaking, then a subroutine for executing setting for a backlighted condition in the center selection AFC, that is, an AFC backlight operation routine, is called at step #563, whereafter the control sequence returns to the original routine. Such AFC backlight operation routine includes a substantially same flow of operations as in the flow of operations at steps #461 to #488 in the backlight routine for the left selection AFL described hereinabove except that a subject as an object for operation is changed from the left to the center and the irradiating direction is changed to C at the center. Thus, description of the AFC backlight operation routine is omitted herein to avoid redundancy.

On the other hand, in case there is the possibility of hand shaking in either of a regularly lighted condition and a backlighted condition, it is judged subsequently at step #521 whether or not the photographing optical system 2 is in the focal length region V. If the photographing optical system 2 is in the focal length region V, then since reduction of the irradiation angle of flashlight is not allowed, the light distribution is set to f3/3 at step #551, and then the irradiating direction is set to C at the center at step #552. Then, the hand shaking shutter speed value Tvf is adopted as a control shutter speed value Tv at step #555, and then the open aperture value $Av_0$ is adopted as a control aperture value Av at step #556. Further, at step #557, the film sensitivity value Sv is adopted as it is as light adjustment data without correcting the same, and then central light adjustment selection BFC is designated at step #558 and the flash flag is set at step #559, whereafter the control sequence returns to the original routine.

If it is judged at step #521 that the photographing optical system 2 is not in the focal length region V, then the right subject distance value $D_{UR}$ and/or the left subject distance value $D_{UL}$ are successively compared with the proximate distance value K' at steps #522 and/or #523 to judge whether or not there is the possibility that over exposure may take place with the right subject or the left subject.

In case both of the right subject distance value $D_{UR}$ and the left subject distance value $D_{UL}$ are equal to or lower than the proximate distance value K', that in case both of the left subject and the right subject are excessively near to the camera, the irradiation angle must necessarily be reduced as low as possible in order to eliminate over exposure, and consequently, it is subsequently judged at step #524 whether or not the photographing optical system 2 is in the focal length region IV.

If the photographing optical system 2 is in the focal length region IV, then since the light distribution characteristic of f1/3 cannot be adopted, the light distribution characteristic is set to f2/3 at step #525 and the irradiating direction is set to C at the center at step #526, whereafter the control sequence advances to step #555. On the other hand, if the photographing optical system 2 is in one of the focal length regions I to III, then the light distribution characteristic is set to f1/3 at step #531 and then the irradiating direction is set to C at the center at step #532, whereafter the control sequence advances to step #555.

Subsequently, in case the right subject distance value $D_{UR}$ is equal to or lower than the proximate distance value K' (step #522) but the left subject distance value $D_{UL}$ is higher than the proximate distance value K', that is, in case the right photographing area $Fp_R$ includes a body for which over exposure may possibly take place, it is subsequently judged at step #533 whether or not the photographing optical system 2 is in the focal length region IV.

If the photographing optical system 2 is in the focal length region IV, then the light distribution characteristic is set to f2/3 at step #534 and the irradiating direction is set to $L_1$ at the left at step #535 in order to displace the irradiation area leftwardly, whereafter the control sequence advances to step #555.

If it is judged at step #533 that the photographing optical system 2 is in one of the focal length regions I to III, then a control aperture value Av is determined at step #536 by an APEX calculation for the flash using the central subject distance value $D_{UC}$ and the illuminance value Iv' of flashlight when the light distribution characteristic is set to f2/3. Then, the thus determined control aperture value Av is compared with the open aperture value $Av_0$ at step #537.

If the control aperture value Av is equal to or higher than the open aperture value $Av_0$, then since a sufficient amount of light can be provided to the central subject in the light distribution characteristic of f2/3, the control sequence advances to step #534. On the contrary if the control aperture value Av is lower than the open aperture value $Av_0$, then since a sufficient amount of light can be provided to the central subject in the light distribution characteristic of f2/3, an APEX calculation for the flash is executed at step #538 using the left subject distance value $D_{UL}$ and the illuminance value Iv' of flashlight when the light distribution characteristic is set to f2/3 to determine a control aperture value Av, and then using the control aperture value Av, it is judged at step #539 whether or not flashlight in the light distribution characteristic of f2/3 contributes to the left subject.

If it is judged that flashlight in the light distribution characteristic of f2/3 contributes to the left subject, then the control sequence advances to step #534, but on the contrary if it is judged that flashlight does not contribute, then the light distribution characteristic is changed to f1/3 at step #541, and then the irradiating direction is set to C at the center at step #542, whereafter the control sequence advances to step #555.

Figure 25B:
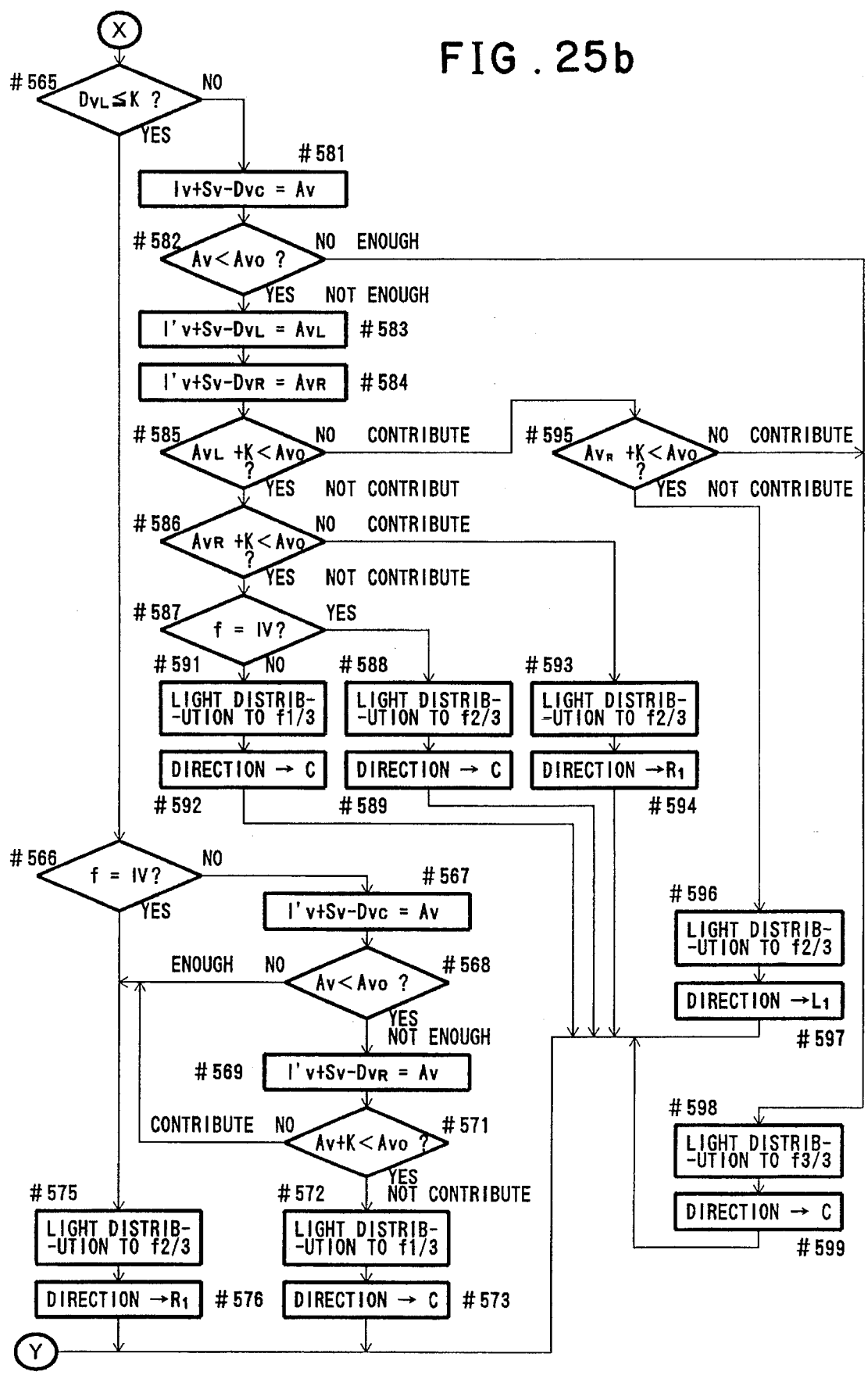

On the other hand, in case the right subject distance value $D_{UR}$ is higher than the proximate distance value K' (step #522) but the left subject distance value $D_{UL}$ is equal to or lower than the proximate distance value K' (step #565 in FIG. 25b), that is, in case the left photographing area $Fp_L$ includes a body for which over exposure may take place, the control sequence advances to a flow beginning with step #566 shown in FIG. 25b. However, operations in the flow from step #566 to step #576 are substantially same as the steps #533 to #542 described hereinabove except that the irradiating direction when the light distribution characteristic is set to f2/3 is set to $R_1$ at the right at step #576 and that the right subject distance value $D_{UR}$ is used in an APEX calculation for the flash at step #569 in place of the left subject distance value $D_{UL}$. Accordingly, detailed description of such operations is omitted herein to avoid redundancy.

Finally, in case both of the right subject distance value $D_{UR}$ and the left subject distance value $D_{UL}$ are higher than the proximate distance value K' (steps #522 and #565), that is, in case neither the right photographing area $Fp_R$ nor the left photographing area $Fp_L$ includes a body for which over exposure may take place, a control aperture value Av is determined at step #581 of FIG. 25b by an APEX calculation for the flash using the central subject distance value $D_{UC}$ and the illuminance value Iv of flashlight when the light distribution characteristic is set to f3/3. Then, referring to FIG. 25b, the thus determined control aperture value Av is compared with the open aperture value $Av_0$ at step #582.

If the control aperture value Av is equal to or higher than the open aperture value $Av_0$, then since a sufficient amount of light can be provided to the central subject in the light distribution characteristic of f3/3, the light distribution characteristic is set to f3/3 at step #598 and then the irradiating direction is set to C at the center at step #599, whereafter the control sequence advances to step #555 shown in FIG. 25a. On the contrary if the control aperture value Av is lower than the open aperture value $Av_0$, then since a sufficient amount of light cannot be provided to the central subject in the light distribution characteristic of f2/3. APEX calculations for the flash are executed successively at steps #583 and #584 using the left and right subject distance values $D_{UL}$ and $D_{UR}$ and the illuminance value Iv' of flashlight when the light distribution characteristic is set to f2/3 to determine left and right control aperture values $Av_L$ and $Av_R$, respectively. Then, using the control aperture values $Av_L$ and $Av_R$, it is judged at steps #585, #586 and #595 whether or not flashlight in the light distribution characteristic of f3/3 contributes to the left and/or right subjects.

In case flashlight in the light distribution characteristic of f3/3 contributes to both of the left and right subjects (steps #585 and #595), it is not preferable to reduce the irradiation angle, and accordingly, the light distribution characteristic is set to f3/3 at step #598 and the irradiating direction is set to C at the center at step #599, whereafter the control sequence advances to step #555 shown in FIG. 25a.

In case flashlight in the light distribution characteristic of f3/3 contributes to the left subject but does not contribute to the right subject (steps #585 and #595), the light distribution characteristic is set to f2/3 at step #596 and the irradiating direction is set to $L_1$ at the left at step #597, whereafter the control sequence advances to step #555 of FIG. 25a.

Meanwhile, if flashlight in the light distribution characteristic of f3/3 does not contribute to the left subject (step #585) but contributes to the right subject (step #586), the light distribution characteristic is set to f2/3 at step #593 and the irradiating direction is set to $R_1$ at the right at step #594 in order to reduce and displace the irradiation range of flashlight to the right side, whereafter the control sequence advances to step #555 of FIG. 25a.

Further, in case flashlight in the light distribution characteristic of f3/3 contributes to neither of the left and right subjects (steps #585 and #586), the irradiation angle should be reduced so as to increase flashlight to the central subject, and in this instance, it is first judged at step #587 whether or not the photographing optical system 2 is in the focal length region IV. If the photographing optical system 2 is in the focal length region IV, then since the light distribution characteristic of f1/3 is not applicable, the light distribution characteristic is changed to f2/3 at step #588 and then the irradiating direction is set to C at the center at step #589, whereafter the control sequence advances to step #555 shown in FIG. 25a. On the other hand, in case the photographing optical system 2 is in one of the focal length regions I to III (step #587), the light distribution characteristic is set to f1/3 at step #591 and the irradiating direction is set to C at the center at step #592, whereafter the control sequence advances to step #555 of FIG. 25b.

Figure 26:
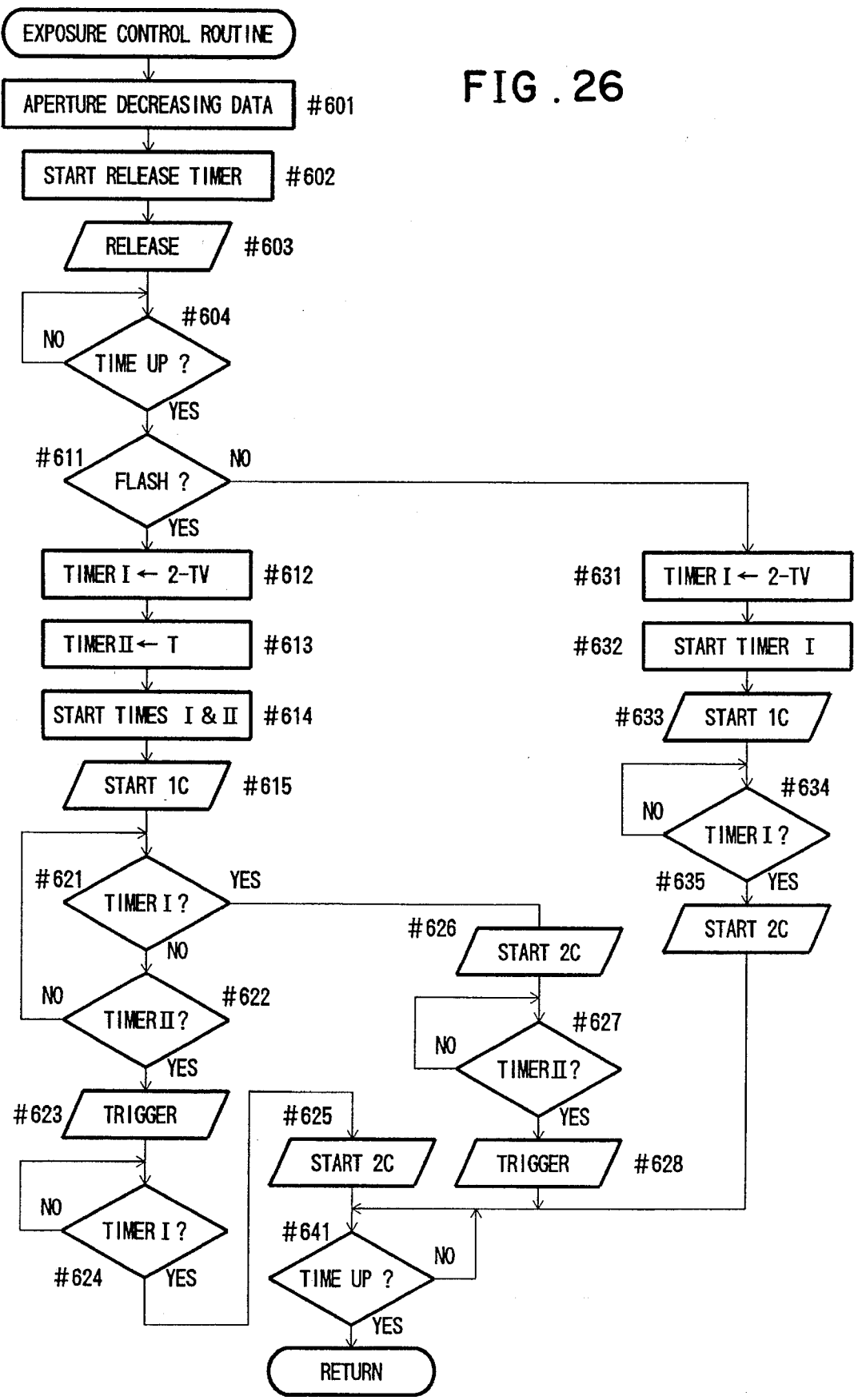

Referring now to FIG. 26, the exposure control routine which is called at step #60 of the main routine is shown. After the present routine is called, the open aperture value $Av_0$ is subtracted from the control aperture value Av to determine aperture reducing data for the aperture at step #601, and then the release timer for defining an ending timing of upward movement of the main mirror and reduction in aperture is started at step #602. Then, the release magnet RLM is energized at step #603 to start upward movement of the main mirror in order to start a release operation, and then it is waited at step #604 that a counting operation of the release timer comes to an end to stop the upward movement of the main mirror and the aperture reducing operation.

After completion of the upward movement of the main mirror and the aperture reducing operation, the flash flag is checked at step #611 to judge whether or not flashlight photographing should be performed, In case flashlight photographing should be performed, a value $2^{-Tv}$ corresponding to the control shutter speed value Tv is placed at step #612 into a first timer provided for defining a shutter speed, and then a time T until the shutter 17 comes to a fully open position after starting opening operation thereof is placed at step #613 into a second timer provided for defining a trigger timing. After then, the first and second timers are started at step #614, and then movement of the first blade 17A of the shutter 17 is started at step #615.

After then, it is waited at steps #621 and #622 that the counting operation of either one of the first and second timers comes to an end. If the second timer completes its counting operation first (step #622), then a trigger signal TRG is delivered to the flash circuit FLC at step #623, and then it is waited at step #624 that the counting operation of the first timer comes to an end. Then, when the counting operation of the first timer comes to an end, movement of the second blade 17B of the shutter 17 is started at step #625. Then, after it is waited at step #641 that such movement is completed, the control sequence returns to the original routine.

If the counting operation of the first timer comes to an end first in the loop of the steps #621 and #622, then movement of the second blade 17B of the shutter 17 is started at step #626, and then it Is waited at step #627 that the counting operation of the second timer comes to an end. Then, when the counting operation of the second timer comes to an end, a trigger signal TRG is delivered to the flash circuit FLC at step #628. Then, after it is waited at step #641 that much movement is completed, the control sequence returns to the original routine.

On the other hand, in case it is judged at step #611 that no flashlight photographing should be performed, a value $2^{-Tv}$ corresponding to the control shutter speed Tv is placed at step #631 into the first timer provided for defining a shutter speed, and then the first timer is started at step #632. Then, movement of the first blade 17A of the shutter 17 is started at step #633, and then it is waited at step #634 that the counting operation of the first timer comes to an end. After the counting operation of the first timer comes to an end, movement of the second blade 17B of the shutter 17 is started at step #635, and then it is waited at step #641 that such movement is completed, whereafter the control sequence returns to the original routine.

Figure 19:
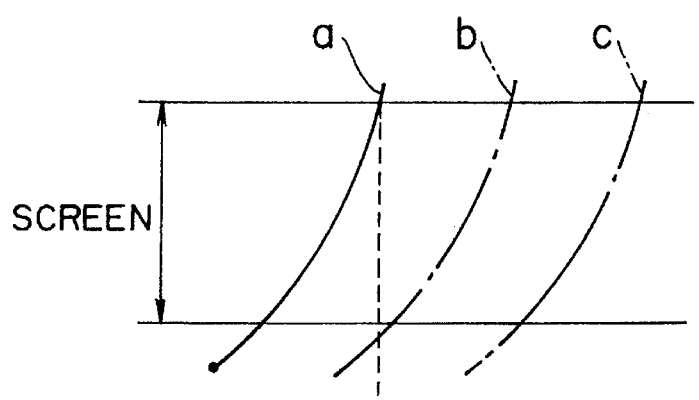
FIG. 19 is a time chart illustrating operation of the shutter of the camera of FIG. 1.

A manner of movement of the shutter 17 illustrated in FIG. 19. Referring to FIG. 19, a curve a illustrates movement of the first blade 17A. Meanwhile, curves b and c each illustrates movement of the second blade 17B. The curve b illustrates such movement at the shutter speed of, for example, 1/500 second in ordinary flashlight photographing.

In this instance, movement of the second blade 17B is started at a timing earlier than trigger timing indicated by a broken line in FIG. 19. Such movement depends upon the flow of steps #626 to #628 in the flow chart of FIG. 26. The curve c illustrates movement of the second blade 17B at the shutter speed of, for example, 1/30 second in flashlight photographing in a slow synchronization mode. In this instance, movement of the second blade 17B is started at a timing later than the trigger timing. Such movement depends upon the flow of steps #623 to #625 in the flow chart of FIG. 26.

Several alterations or modifications to the embodiment described above will be described subsequently.

First, while in the embodiment described above the flash apparatus 1 is mounted for pivotal motion between the operative position and the inoperative position on the body of the camera, the flash apparatus 1 may otherwise be mounted fixedly on the camera body the operative upright position in which it can emit flashlighy therefrom. Alternatively, the flash apparatus 1 may be formed as a separate member which can be removably mounted on a camera or the like. In this instance, subject information from a photographing screen may be obtained from detecting means on the camera side and transmitted from the camera side to the flash apparatus 1, or alternatively, such means for detecting subject information may be provided on the flash apparatus 1.

Further, while in the embodiment described above the changing range of the irradiating direction of the flash apparatus 1 remains within the range of the photographing area Fp, the flash apparatus 1 may be modified such that the irradiating direction can be changed to a direction outside the photographing area Fp so that bounce emission of light may be available. Further, the irradiating direction need not be changed stepwise but may be changed continuously, and the changing angle of the irradiating direction may be varied suitably.

Also, while in the embodiment described hereinabove the irradiating direction of the flash apparatus 1 is changed in a plane along a major side of the photographing area Fp, alternatively or additionally the irradiating direction may be changed in a plane along a minor side of the photographing area Fp, or otherwise the irradiating direction may be changed to an arbitrary direction by way of a universal coupling or the like. It is to be noted that the photographing area Fp is not limited to a photographing area of the panorama size described hereinabove in connection with the embodiment but may be a photographing area of 24×36 mm of the standard size or any other size.

Furthermore, while in the embodiment described hereinabove the irradiating angle is changed in combination with the irradiating direction, such irradiating angle changing mechanism may be omitted when the present invention is reduced to practice. Further, even where such construction for the changing of the irradiating angle is employed, only the irradiating direction may be changed in response to subject information from the photographing area Fp without changing the irradiating angle of the light emitting portion 1B.

Besides, while in the embodiment described hereinabove the irradiating direction of the light emitting portion 1B is changed in response to both of distribution information of brightness of subjects in the photographing area Fp and distribution information of distances to such subjects, the irradiating direction of the light emitting portion 1B may otherwise be changed in response to only one of such brightness distribution information and distance distribution information.

Further, the light emitting portion 1B may otherwise be provided by a plural number such that changing control of the irradiating direction is executed independently or collectively for such light emitting portions. Further, a plurality of such flash apparatus 1 may be built in the camera. In this instance, irradiating direction changing control may be executed independently or collectively for such flash apparatus.

Finally, any other means than such means of the phase difference detecting type as described hereinabove may be employed for the detection of a distance to a subject. For example, detection of a distance and detection of an in-focus condition may be effected by means of a distance measuring instrument of the active type.

Referring now to FIGS. 31 to 34, there is shown another camera in which a modified AF module is incorporated. The camera here is a single lens reflex camera adapted to receive an ordinary 35 mm size film therein and feed such film in a horizontal direction. The camera includes a camera body 201 on which an upper cover 202, a lower cover 203, a rear lid 204 and so forth are mounted. A viewfinder eye-piece portion 205 is provided on a rear face of the camera body 201 while a mount seat plate 206 for removably mounting an interchangeable lens (not shown) thereon is provided on a front face of the camera body 201.

As seen from FIGS. 31 to 34, while the camera is a single lens reflex camera, the upper cover 202 and the lower cover 203 have upper and lower faces positioned substantially in flush with upper and lower ends of the mount seat plate 206 such that a pentagonal prism accommodating portion may not project upwardly from the camera body 201, and besides, the camera has a comparatively small overall height. A main switch 207, a release button 208, a display panel 209 and so forth are provided on an upper face of the upper cover 202.

Figure 35:
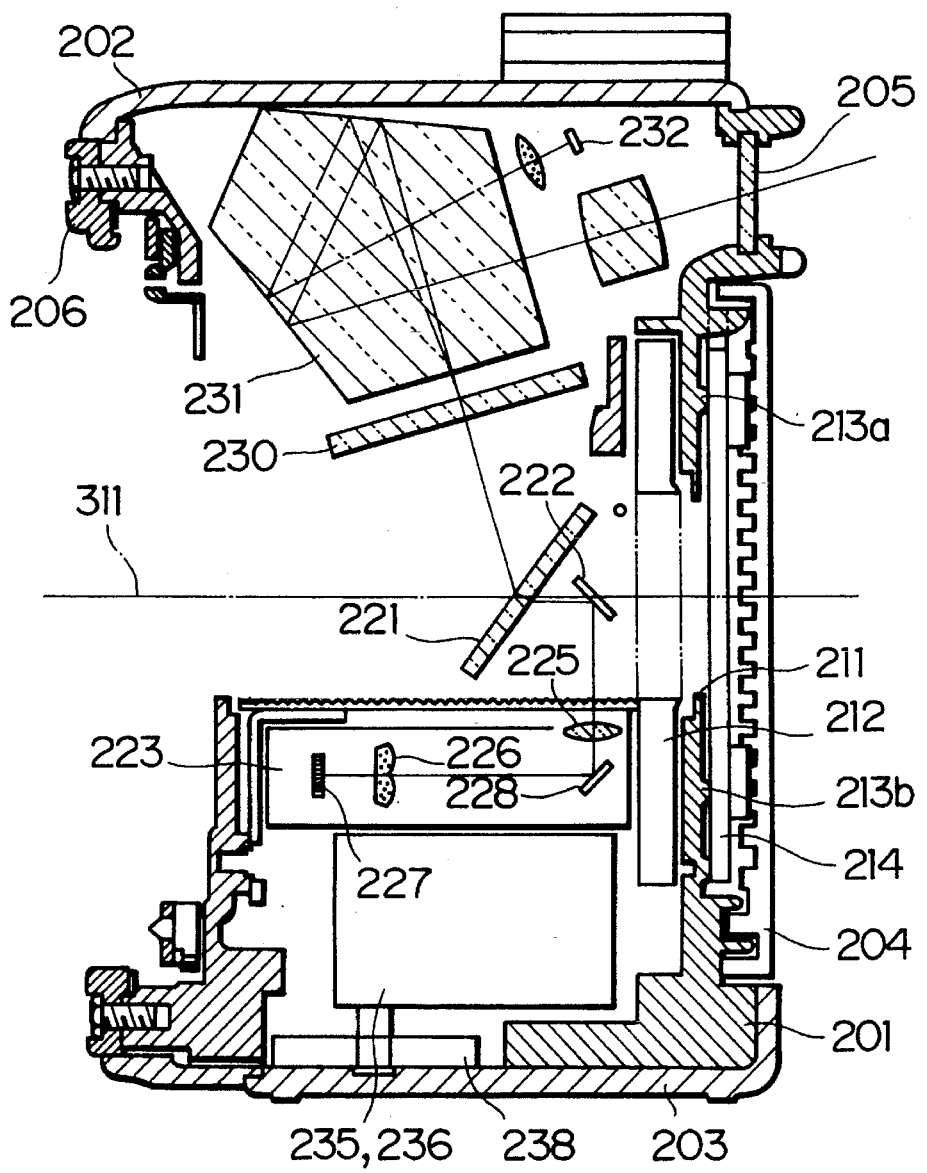
FIG. 35 is a vertical sectional view of the camera of FIG. 31.

Referring now to FIG. 35, a focus detecting device (hereinafter referred to as distance measuring module) 223 for detecting a position of a photographing lens not shown in accordance with a phase difference detecting method by TTL (through the lens) light measurement is installed in the camera body 201 such that the longitudinal direction thereof is directed in forward and rearward directions of the camera. The camera body 201 further has a special screen frame 211 formed at a location thereof opposing to a face of a film loaded in position in the camera such that at least part of an exposeable area of the film in a vertical direction may be sectioned by the special screen frame 211 so as to prevent the part of the film from being exposed to light. A shutter unit 212 is disposed in front of the special screen frame 211. The camera body 201 further has formed thereon a pair of film rails 213a and 213b for contacting with upper and lower edge portions of a film to guide feeding motion of the film and a film pressing plate 214 for resiliently pressing a film against the film rails 213a and 213b.

The camera includes a main mirror 221 and a sub mirror 222 disposed on a path of light introduced into the camera through the photographing lens, that is, on an optical axis 311 of the camera, for pivotal motion to open or close an exposure face of a film. Light reflected by the sub mirror 222 is introduced into the distance measuring module 223. The distance measuring module 223 includes a condenser lens 225 disposed adjacent a film equivalent plane on which an image of incidence light is formed, a separator lens 226 for dividing such image, and an image pickup element 227 constituted from a CCD or the like for re-forming the image via the separator lens 226. A module mirror 228 is provided to change or bend a path of such light. The condenser lens 225 is located below a lower edge of an exposure area defined by the special screen frame 211 in the vertical direction of the camera but above a lower edge of an exposeable area of a film itself.

A focus plate 230 and a pentagonal prism 231 which constitute a viewfinder optical system are located at an upper location in the camera body 201 such that reflected light from the main mirror 221 may be introduced to the viewfinder eye-piece portion 205 by way of the focus plate 230 and the pentagonal prism 231. Further, in order to effect in-finder light measurement, a light receiving element 332 is provided such that it can measure reflected light from the pentagonal prism 231. Due to the constructions that an exposure area is defined by the special screen frame 211 which intercepts light to upper and lower portions of a standard screen frame and that the sub mirror 222 can be disposed at a rear location and accordingly the main mirror 221 can be disposed at a rear location, the focus plate 220 and the pentagonal prism 231 can be located at rather lower locations (in the arrangement shown in FIG. 35, they are shown mounted such that forward portions thereof are located a little downwardly), and consequently, such a profile that a portion of the upper cover 202 adjacent the pentagonal prism 231 is projected upwardly as in a conventional single lens reflex camera can be eliminated without increasing the overall vertical dimension of the camera. Besides, the upper cover 202 can be mounted at a same height as an upper end of the mount seat plate 206.

A distance measuring (AF) motor 235 and a charging motor 236 for charging the shutter and so forth are disposed in a spacing in the camera body 201 below the distance measuring module 223. Such disposition is allowed by the construction that the condenser lens 225 of the light measuring module 223 is disposed above the lower edge of the exposeable area of a film itself as described hereinabove. Consequently, effective utilization of a spacing is achieved, and the camera can be made compact in the vertical direction.

Figure 36:
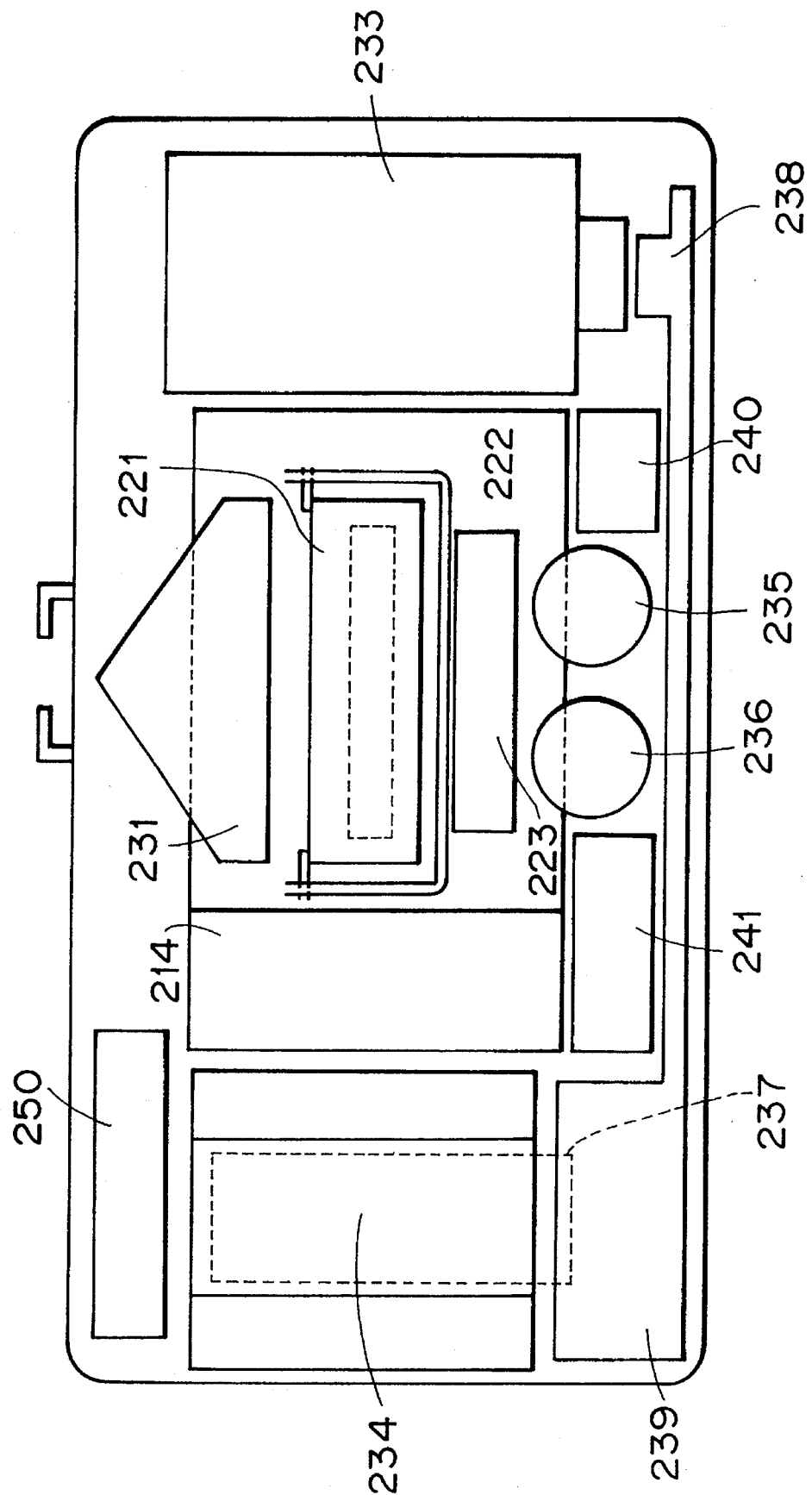
FIG. 36 is a schematic illustration of the camera of FIG. 31 showing an arrangement of various components as viewed from the front.

Various components of the camera are disposed in such a manner as illustrated in FIG. 36. Referring to FIG. 36, the camera has a film magazine chamber 233, a spool 234 for winding up a film after exposure, a film winding/rewinding motor 237, a rewinding mechanism 238 including a train of gears not shown, a winding mechanism 239, an AF driving mechanism 240, a charging mechanism 241 and a control circuit 250. The distance measuring module 223 is of the type which can measure distances to a plurality of, for example, three, points in a leftward and rightward (horizontal) direction. The AF motor 235 and the charging motor 236 are disposed below the distance measuring module 223 while the AF driving mechanism 240 and the charging mechanism 241 are disposed on the horizontally opposite sides of the distance measuring module 223.

Figure 43:
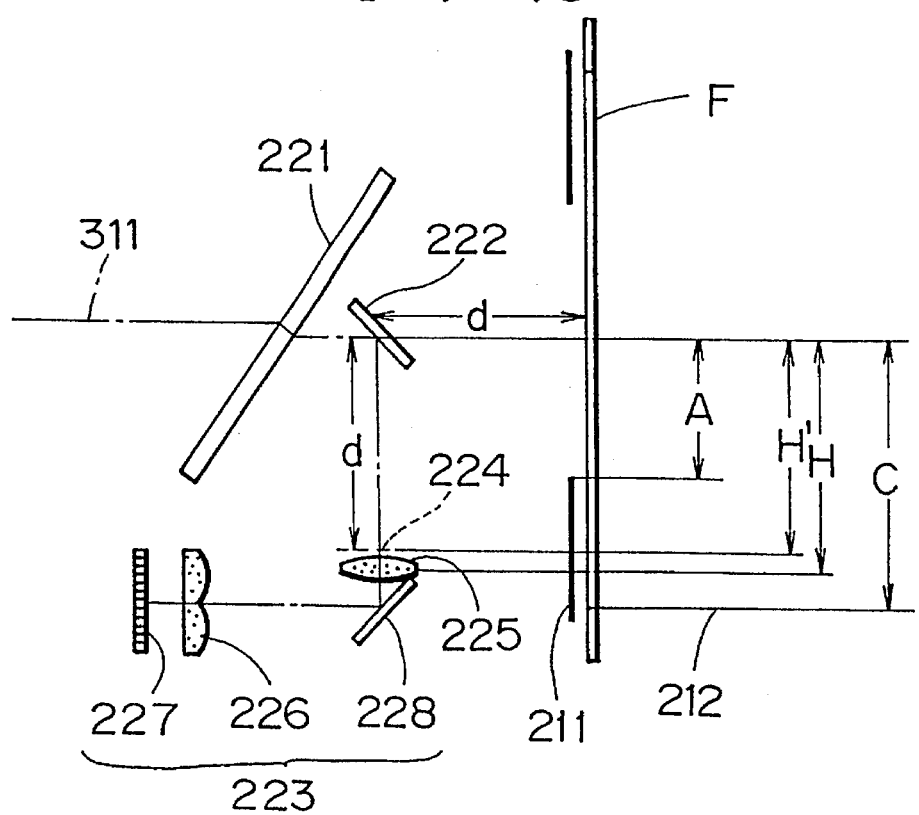
FIG. 43 is a diagrammatic representation illustrating an arrangement of a light measuring module.
Figure 44:
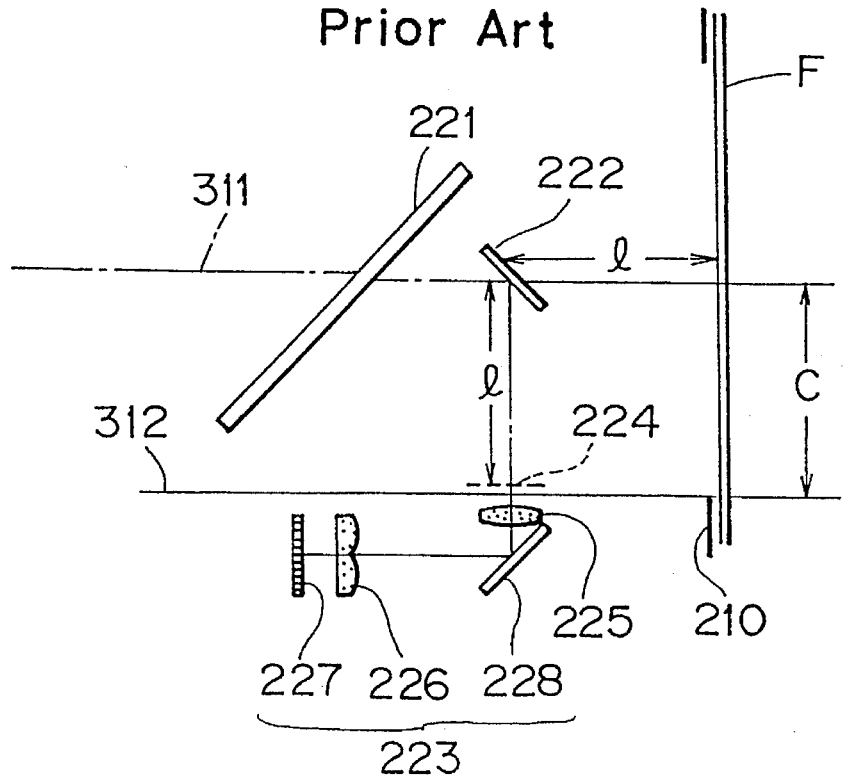
FIG. 44 is a similar view but illustrating a conventional arrangement of a light measuring module.

Such positional relationship of the condenser lens 225 as described above is illustrated in FIG. 32. Referring to FIG. 43, the location of the condenser lens 25 is set such that the following relationship may be satisfied $A < H < C$ where A is a distance from the optical axis 311 of the camera to the special screen frame 211, H is a distance to the condenser lens 225, and C is a distance to an exposeable area line 312 of an ordinary film F. It is to be noted that, in order for the condenser lens 225 to have a small diameter, since the condenser lens 225 must be located in the proximity of the film equivalent plane 224 as described above, the distance H has an approximate value to a distance H' from the optical axis 311 to the film equivalent plane 224. Meanwhile, the distance d between the sub mirror 222 and the film F is made equal to the distance d between the sub mirror 222 and the film equivalent plane 224.

The reason why such positional relationship is adopted is such as follows. In particular, otherwise if the distance H is smaller than the distance A, then the condenser lens 225 will eclipse light which passes the photographing lens upon exposure. On the other hand, if the distance H is greater than the distance C, then since the sub mirror 222 is spaced by a distance greater than the distance C from the plane of the film F, an unnecessary or useless spacing is increased. Thus, with the camera, the sub mirror 222 can be disposed at a rear location of the camera, that is, in the proximity of the film F while the distance measuring module 223 can be disposed at an upper location comparing with a conventional camera.

Consequently, the depth and the height of the camera can be decreased.

Figure 37:
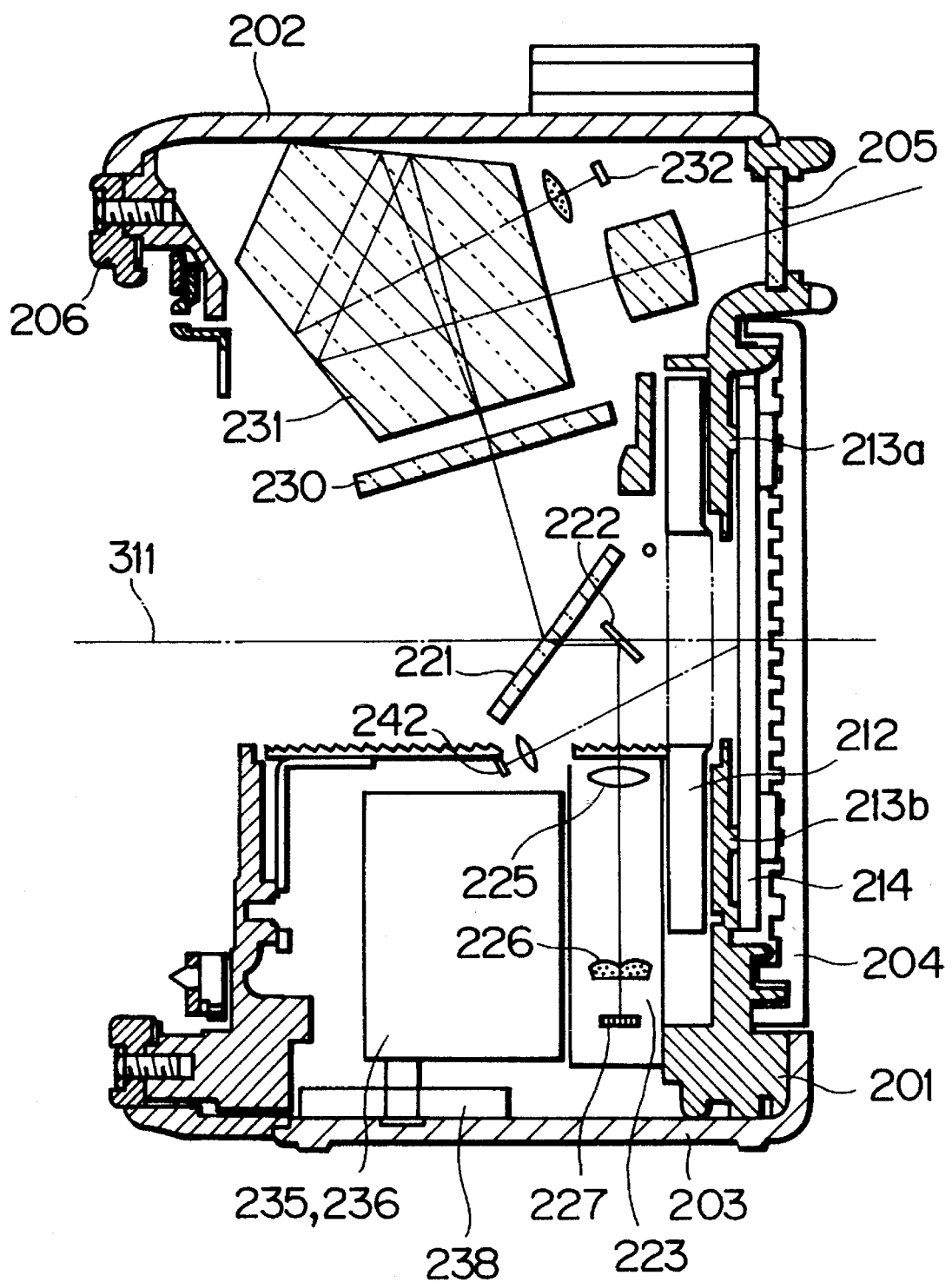
FIG. 37 is a vertical sectional view similar to FIG. 35 but showing a modification to the camera of FIG. 31.

FIG. 37 shows a modified arrangement of the components of the camera shown in FIGS. 31 to 36. In the modified camera, the distance measuring module 223 is disposed in a vertical direction and the AF motor 235 and the charging motor 236 are disposed in front of the distance measuring module 223. The disposition of the distance measuring module 223 eliminates the necessity of the module mirror 228 described hereinabove and simplifies the construction of the camera as much. It is to be noted that the modified camera additionally includes a light receiving element 242 for measuring light on a face of a film when a flash apparatus is used.

Figure 38:
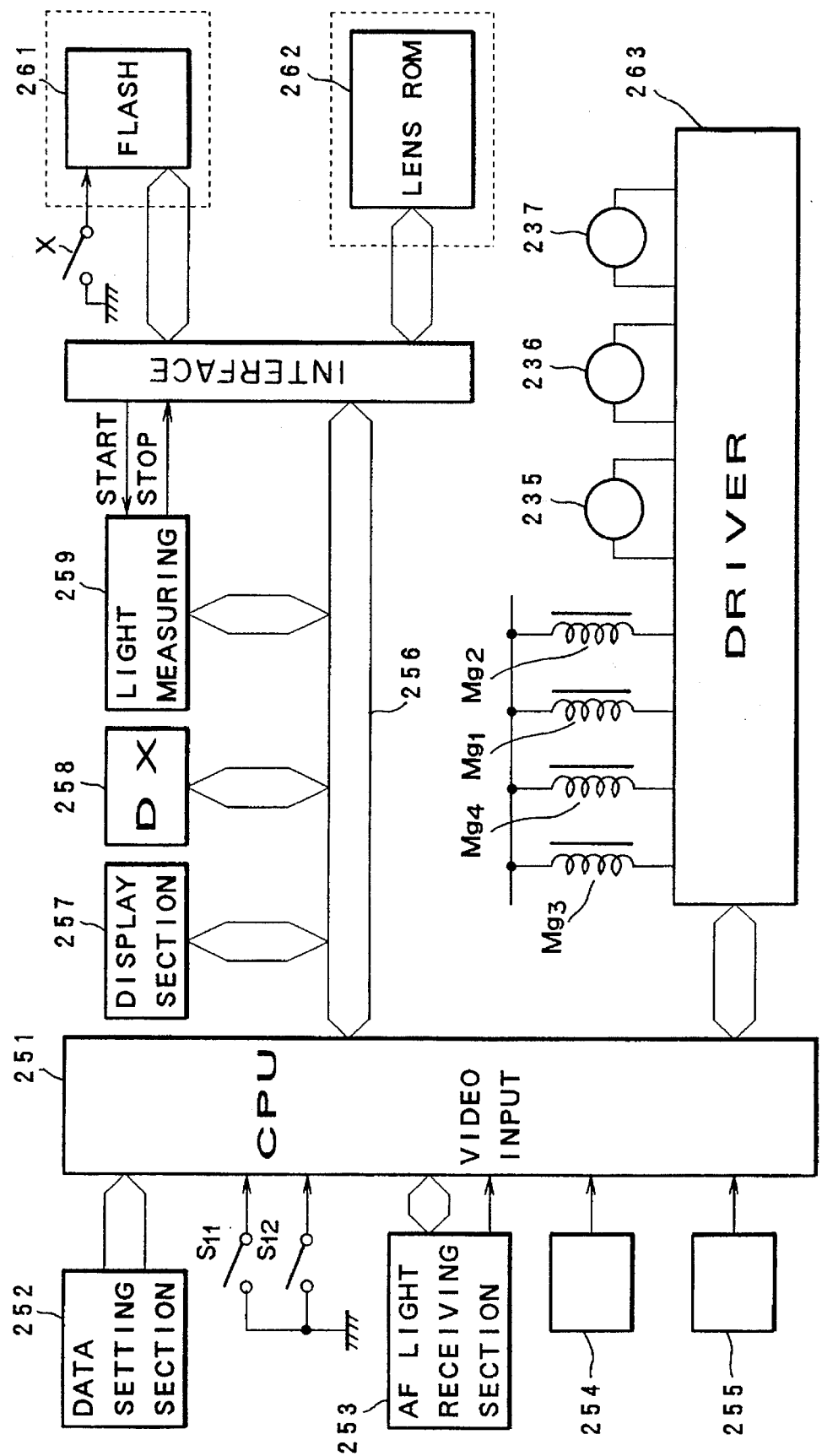
FIG. 38 is a block diagram of an electric circuit of the camera of FIG. 31.

FIG. 38 shows a control circuit of the camera shown in FIGS. 31 to 34. Referring to FIG. 38, the control circuit shown includes a control unit (hereinafter referred to as CPU) 251 which may be a microcomputer receives various information and controls the entire camera. A data setting section 252 is provided to input various setting data therethrough into the CPU 251. A light measuring and distance measuring switch $S_{11}$ is switched on when the release button 208 is depressed to a half depth, and when the switch $S_{11}$ is switched on, the control sequence of the CPU 251 starts interrupt processing of a light measurement and distance measurement sequence. A release switch $S_{12}$ is switched on when the release button 208 is depressed to its full depth. An AF light receiving section 253 transmits a distance measurement signal from the image pickup element 227 of the distance measuring module 223 to the CPU 251. An aperture encoder 254 generates a monitor signal for controlling driving of a motor not shown for an aperture diaphragm not shown To a photographing aperture value. A lens controlling encoder 255 generates a monitor signal for controlling an AF operation of the photographing lens.

Several elements are connected to the CPU 251 by way of a data bus 256 including a display section 257 including the display panel 209, a DX code reading section 258 for reading information of a film, and a light measuring section 259 including the light receiving elements 232 and 242 described hereinabove. A flash section 261 and a lens ROM (read only memory) 262 are also connected to the CPU 251 by way of an interface 260. Further, a magnet Mg1 for a leading blade of the shutter, another magnet Mg2 for a trailing blade of the shutter, a release magnet Mg3, an aperture stopping magnet Mg4, the AF motor 235, the shutter charging motor 236 and the film winding/rewinding motor 237 are connected to the CPU 251 by way of a driver 263.

Referring now to FIGS. 39 to 42, there is shown another modification to the camera shown in FIGS. 31 to 36. The modified camera is different from the camera of FIGS. 31 to 36 in that a flash apparatus is built in the camera body and a lens driving section is provided in an interchangeable lens section.

Figure 39:
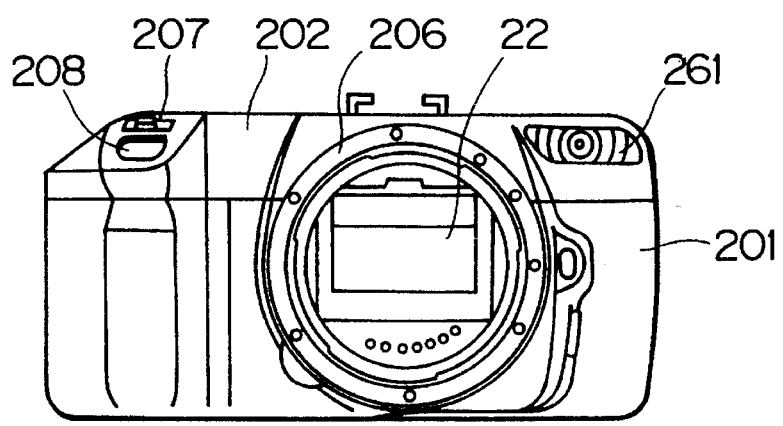
FIG. 39 is a front elevational view of another modified camera.
Figure 40:
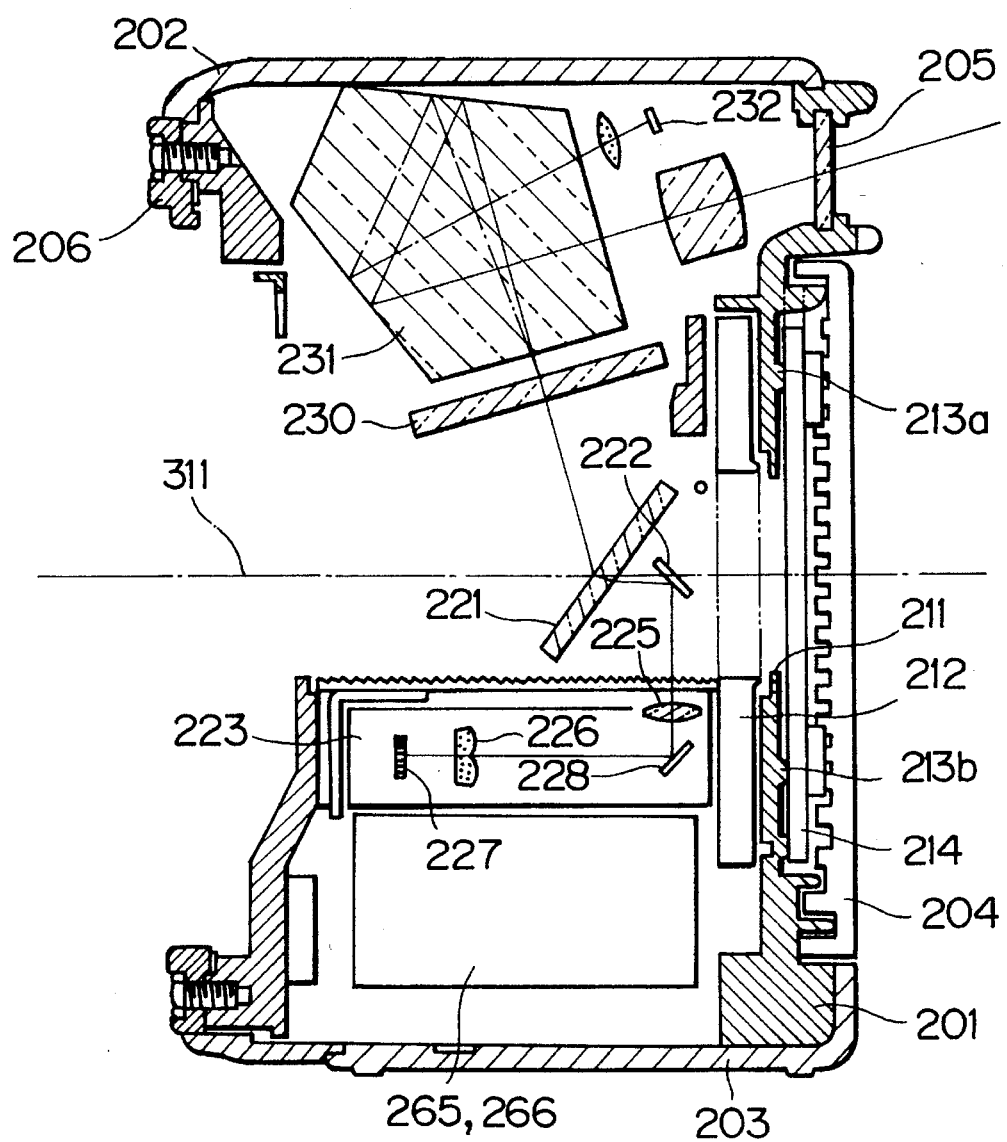
FIG. 40 is a vertical sectional view of the camera of FIG. 39.

In particular, a built-in flash apparatus 261 is disposed such that a light emitting portion thereof is exposed on a front face of the camera as seen in FIG. 39. Meanwhile, as shown in FIG. 40, a main capacitor 265 for the emission of flashlight and another capacitor 266 for the preliminary light emission for the countermeasure against a so-called red eye are disposed, in place of the AF motor and so forth in the camera shown in FIG. 35, in the camera body 201 below the distance measuring module 223. The location of the condenser lens 225 of the distance measuring module 223 is similar to that described hereinabove with reference to FIG. 43.

Figure 41:
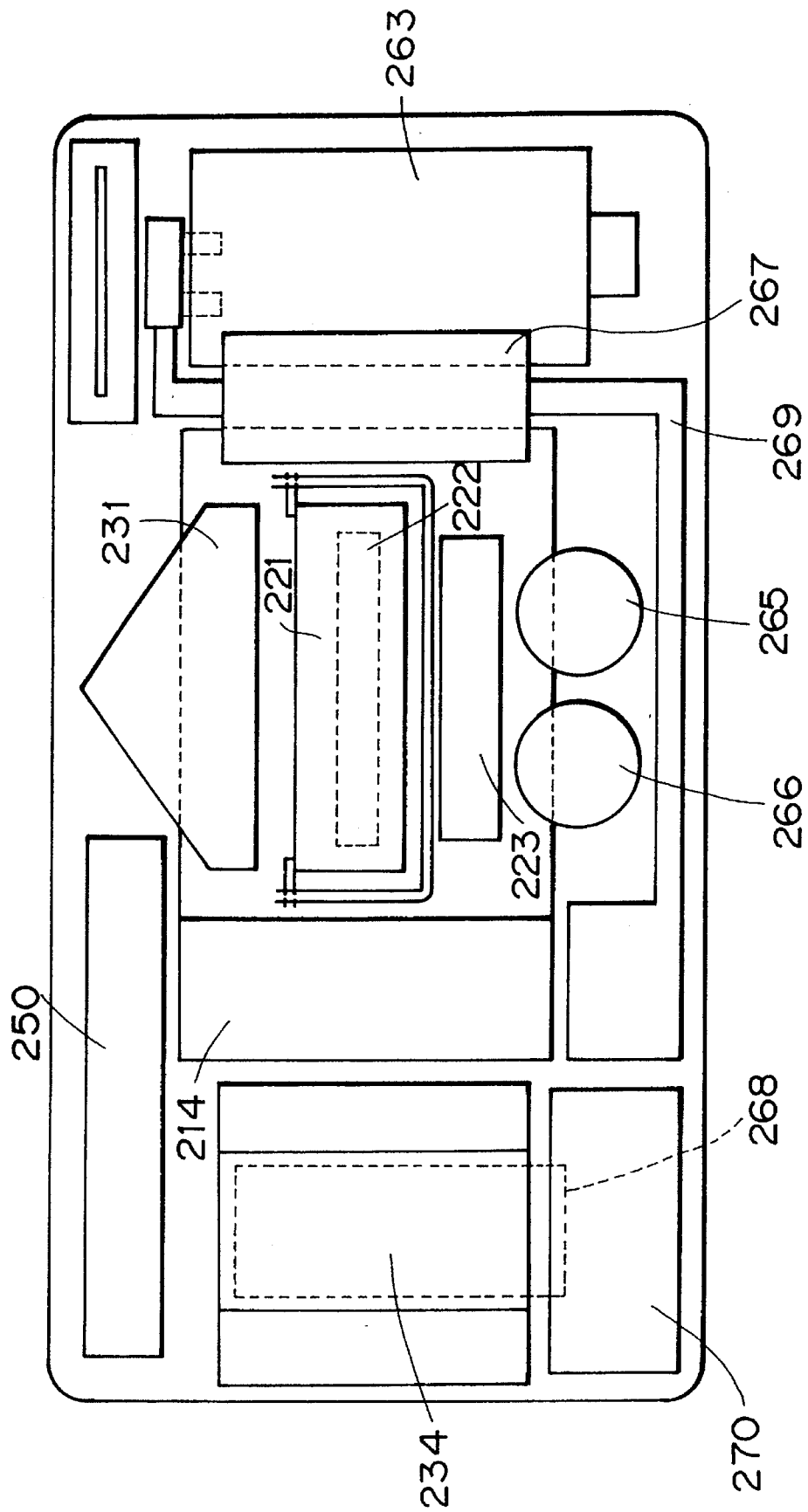
FIG. 41 is a schematic illustration of the camera of FIG. 39 showing an arrangement of various components.

Various components of the camera are disposed in such a manner as shown in FIG. 41. In particular, the main capacitor 265 and the preliminary light emission capacitor 266 are disposed below the distance measuring module 223. Such components of the camera further include a charging/rewinding motor 267, a film winding motor 268, a shutter charging mechanism 269 constituted from a train of gears and a winding mechanism 270.

Figure 42:
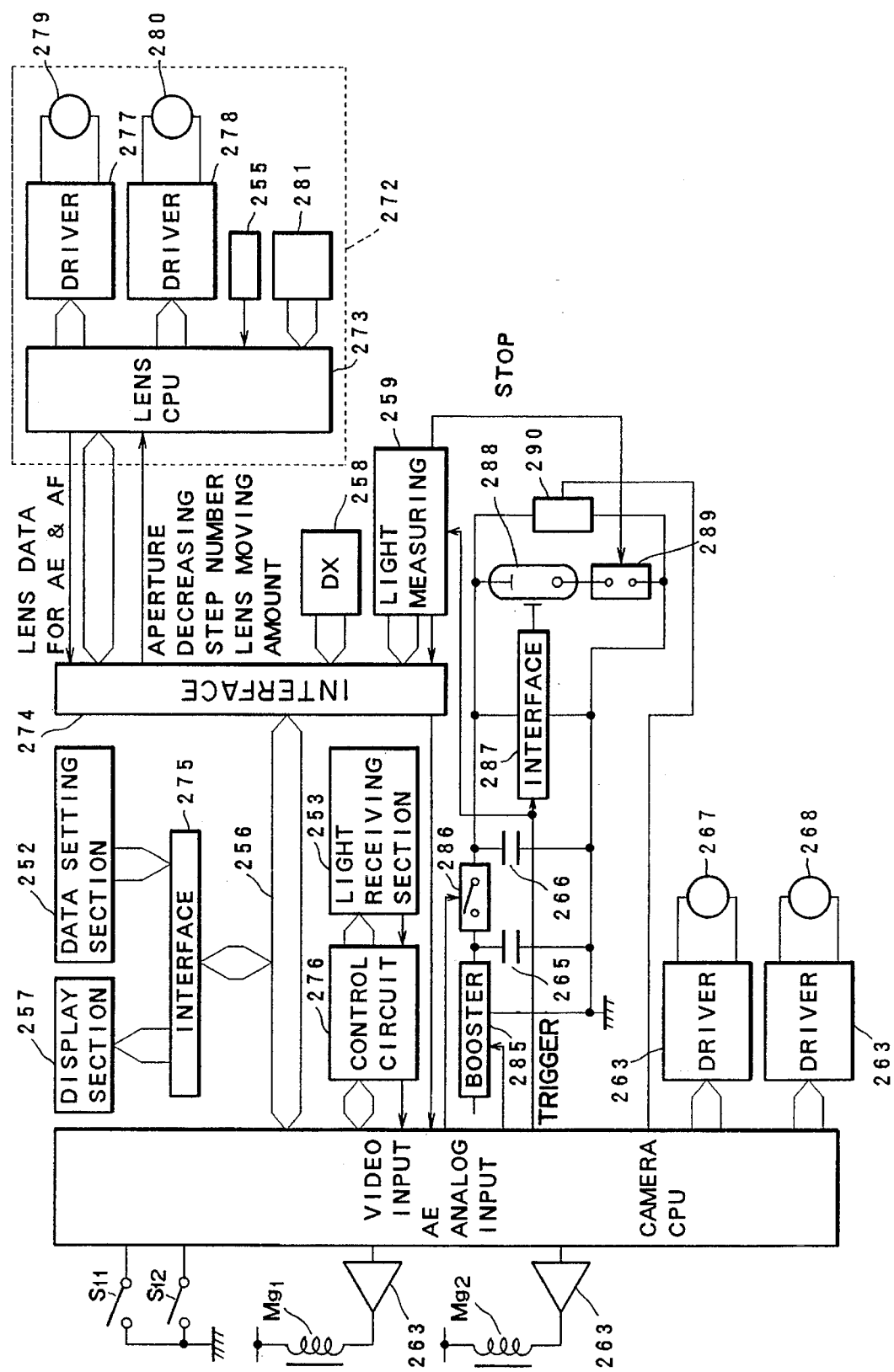
FIG. 42 is a block diagram of an electric circuit of the camera of FIG. 39.

The electric circuit of the camera has such a construction as shown in FIG. 42. Referring to FIG. 42, in addition to a camera CPU 271 on the camera body 201 side, a lens CPU 273 is provided separately in an interchangeable lens section 272. When the interchangeable lens section 272 is mounted on the mount seat plate 206, electric contact terminals of them are connected to each other so that the camera CPU 271 and the lens CPU 273 are connected to each other by way of the data bus 256 and an interface 274. The electric circuit further includes another interface 275 for the display section 257 and the data setting section 252 and a control circuit 276 for the light receiving section 253. A pair of drivers 277 and 278 are provided in the lens section 272 for an aperture controlling stepping motor 279 and a lens driving motor 280, respectively, and also a zooming encoder 281 is provided in the lens section 272. Meanwhile, the flash section includes a boosting circuit 285, a light emission starting switch 286, a light emission trigger circuit 287, a xenon tube 288, a light emission stopping switch 289 and a charging monitoring circuit 90. It is to be noted that like reference numerals denote like elements to those of the electric circuit of the camera shown in FIG. 38.

Various alterations and modifications can be made to the cameras shown in FIGS. 31 to 42. For example, as for an exposure area of a film, the special screen frame 211 for sectioning an exposeable area of a film to define a panorama area may be replaced by a suitable element which has an arbitrary contour for intercepting light to at least part of such exposeable area of a film in a vertical direction. Meanwhile, the condenser lens 225 may be replaced by any condensing lens, and for example, a Fresnel lens may be employed.

Having now fully described the invention, it will be apparent to one of ordinary skill in the art that many changes and modifications can be made thereto without departing from the spirit and scope of the invention as set forth herein.

What is claimed is:

1. A camera comprising:

a first circuit arrangement which detects which one of a plurality of individual areas into which a photographing area is divided includes a main subject;

a second circuit arrangement which detects backlighted conditions of the individual areas of the photographing area;

a third circuit arrangement which judges, in response to results of detection of said second circuit arrangement, a backlighted condition of one of the areas which is detected by said first circuit arrangement;

an arrangement which corrects exposure of the main subject for which a backlighted condition is judged by said third circuit arrangement; and a device which determines a reproducing area within one frame to a special horizontally elongated format in which a ratio of a horizontal direction size against a vertical direction size is more than three over two, wherein said first circuit arrangement detects said main subject only in an area along a horizontal direction within said horizontally elongated reproducing area.

* * * * *

UNITED STATES PATENT AND TRADEMARK OFFICE
CERTIFICATE OF CORRECTION

PATENT NO. : 5,515,133
DATED : May 7, 1996
INVENTOR(S) : Nobuyuki Taniguchi, et al.

Page 1 of 2

It is certified that error appears in the above-indentified patent and that said Letters Patent is hereby corrected as shown below:

On the Title page, item [57], Abstract, lines 2 & 11, change "screen" to --area--.

In col. 5, line 47, after "FIG." insert --2--.

In col. 8, line 46, change "aide" to --size--; after "dimension" insert --of--.

In col. 8, line 48, after "thereby" insert --to--.

In col. 8, line 50, after "condition" insert --is--.

In col. 9, line 16, change "In" to --in--.

In col. 9, line 18, change "min" to --mm--.

In col. 9, line 23, in the table heading, change "Fe" to --$F_s$--.

In col. 9, line 42, change "$\theta_1 X 45°$" to --$\theta_1 > 45°$--.

In col. 9, line 59, after "prism" insert --7B--.

In col. 12, line 58, change "are" to --area--.

In col. 12, line 61, change "$F_{pL}$" to -- $F_{AL}$ --.

In col. 13, line 1, change "of" to --or--.

In col. 13, line 37, after "center" insert --is--.

In col. 13, line 43, change "are" to --area--.

In col. 13, line 45, after "areas" insert --of--.

In col. 15, line 20, change "or" to --of--.

UNITED STATES PATENT AND TRADEMARK OFFICE
CERTIFICATE OF CORRECTION

PATENT NO. : 5,515,133

DATED : May 7, 1996

INVENTOR(S) : Nobuyuki Taniguchi, et al.

It is certified that error appears in the above-indentified patent and that said Letters Patent is hereby corrected as shown below:

In col. 24, line 3, change "BrC" to --BFC--.

In col. 24, line 14, change "a" (second occurrence) to --$\alpha$--.

In col. 24, line 17, change "a" to --$\alpha$--.

In col. 24, line 32, change "off" to --of--.

In col. 24, line 45, change "By" to --$B_V$--.

In col. 32, line 26, change "Is" to --is--.

In col. 32, line 46, after "17" insert --is--.

In col. 32, line 53, after "than" insert --a--.

In col. 33, line 2, after "body" insert --in--.

In col. 33, line 3, change "flashlighy" to --flashlight--.

In col. 33, line 47, change "to-such" to --to such--.

Figure 32:
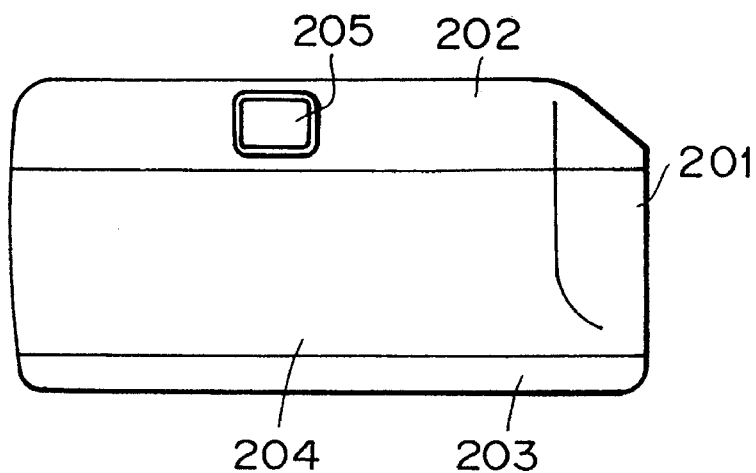
Figure 33:
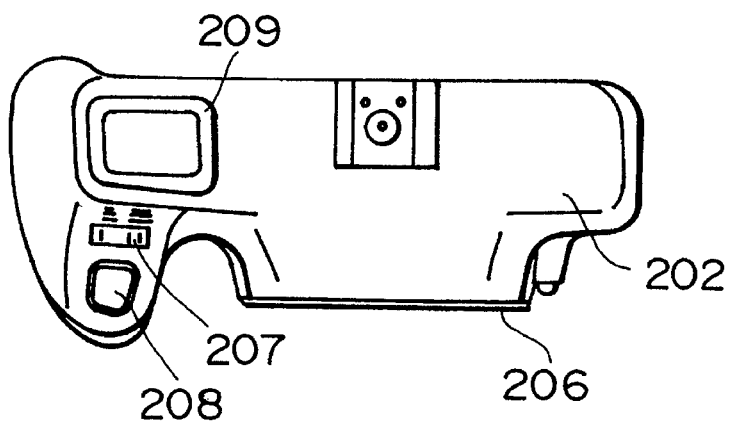
Figure 34:
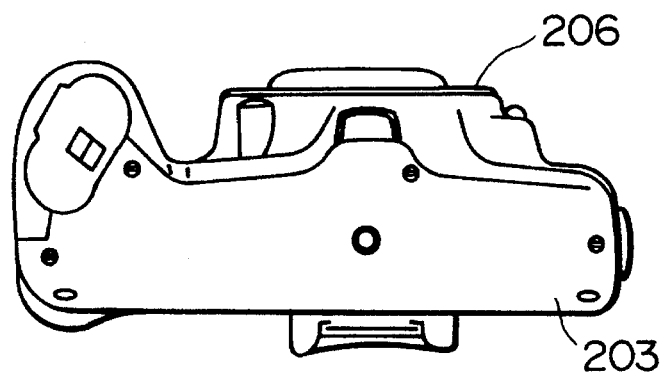

In col. 35, line 38, change "FIG. 32" to --FIG. 43--.

Signed and Sealed this

Twenty-fourth Day of September, 1996

*Attest:*

BRUCE LEHMAN

*Attesting Officer*   *Commissioner of Patents and Trademarks*